US011003391B2

(12) United States Patent
Kotzur et al.

(10) Patent No.: US 11,003,391 B2
(45) Date of Patent: May 11, 2021

(54) DATA-TRANSFER-BASED RAID DATA UPDATE SYSTEM

(71) Applicant: Dell Products L.P., Round Rock, TX (US)

(72) Inventors: Gary Benedict Kotzur, Austin, TX (US); William Emmett Lynn, Round Rock, TX (US); Kevin Thomas Marks, Georgetown, TX (US); Chandrashekar Nelogal, Round Rock, TX (US); James Peter Giannoules, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/586,311

(22) Filed: Sep. 27, 2019

(65) Prior Publication Data
US 2021/0096766 A1 Apr. 1, 2021

(51) Int. Cl.
 *G06F 11/00* (2006.01)
 *G06F 3/06* (2006.01)
 *G06F 11/10* (2006.01)

(52) U.S. Cl.
 CPC ......... *G06F 3/0659* (2013.01); *G06F 3/0604* (2013.01); *G06F 3/0689* (2013.01); *G06F 11/1076* (2013.01)

(58) Field of Classification Search
 None
 See application file for complete search history.

(56) References Cited

U.S. PATENT DOCUMENTS

| 7,783,779 | B1 * | 8/2010 | Scales | G06F 9/5077 709/240 |
| 8,700,842 | B2 | 4/2014 | Dinker | |
| 9,384,093 | B1 | 7/2016 | Aiello | |
| 2004/0133742 | A1 * | 7/2004 | Vasudevan | G06F 11/1096 711/114 |
| 2006/0041793 | A1 * | 2/2006 | Cherian | G06F 11/1088 714/47.1 |
| 2015/0089130 | A1 * | 3/2015 | Rose | G06F 3/0607 711/114 |
| 2015/0121169 | A1 * | 4/2015 | Iliadis | G06F 11/1076 714/766 |

* cited by examiner

*Primary Examiner* — Mujtaba M Chaudry
(74) *Attorney, Agent, or Firm* — Haynes and Boone, LLP

(57) ABSTRACT

A data-transfer-based RAID data update system includes a RAID storage controller device coupled to a host system and RAID storage devices. The RAID storage controller device receives a command that is associated with a data update on at least one of the RAID storage devices from the host system. The RAID storage controller device then determines, from a plurality of RAID data update techniques that are available to execute the command and perform the data update on the at least one of the RAID storage devices, a first RAID data update technique that is included in the plurality of RAID data update techniques and that requires the lowest number of data transfers to execute the command and perform the data update. The RAID storage controller device then causes the command to be performed using the first RAID data update technique to provide the data update.

20 Claims, 59 Drawing Sheets

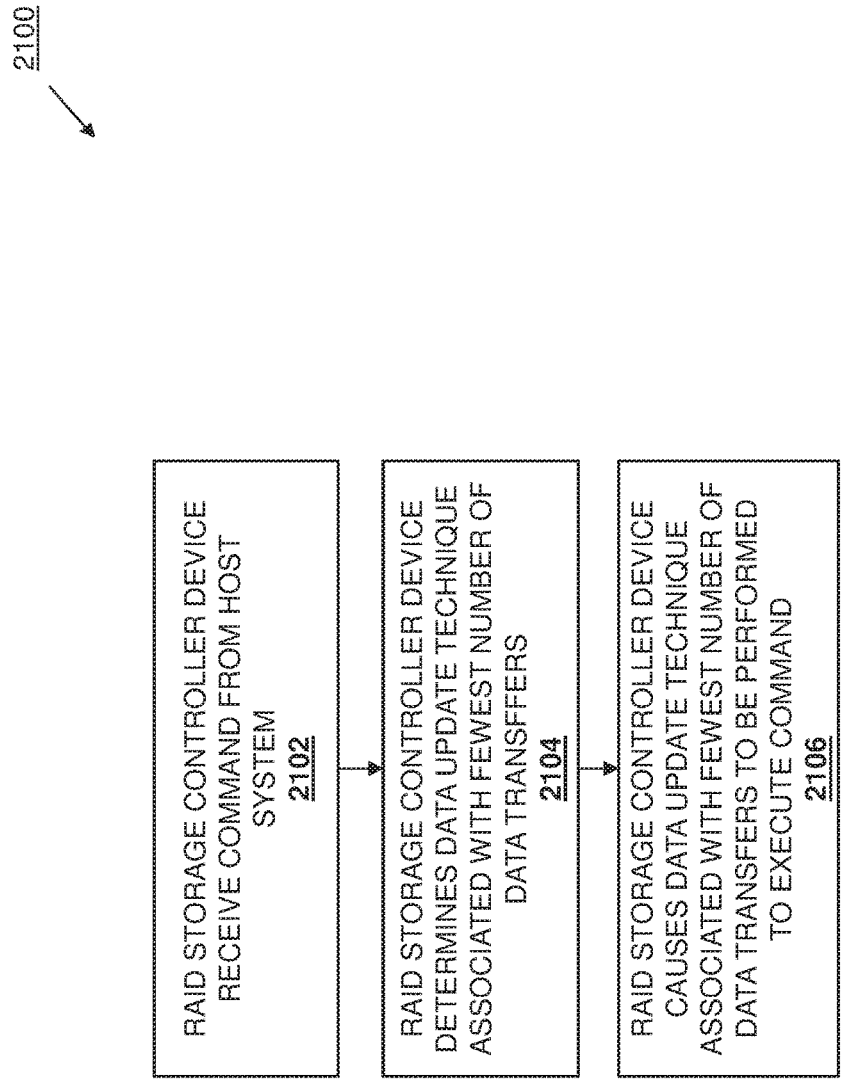

DATA-TRANSFER-BASED RAID DATA UPDATE SYSTEM

BACKGROUND

The present disclosure relates generally to information handling systems, and more particularly to minimizing data transfers in an information handling system when updating data.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems sometime utilize storage systems such as those provided by a Redundant Array of Independent Disks (RAID) storage system that includes a plurality of RAID storage devices. As will be appreciated by one of skill in the art, RAID storage systems are provided by a data storage virtualization technology that combines the physical RAID storage devices into one or more logical storage units for the purposes of data redundancy, performance improvements, and/or other benefits known in the art. For example, data in a RAID storage system may be distributed across the RAID storage devices using several different techniques that are referred to as "RAID levels" that provide different levels of redundancy and performance (e.g., RAID 0, RAID 1, RAID 5, RAID 6, and so on), with each RAID level providing a different balance among goals that include reliability, availability, performance, and capacity. However, the introduction of new storage technologies for use in RAID storage systems has been found to raise some issues.

For example, Non-Volatile Memory express (NVMe) storage devices (e.g., NVMe Solid State Drive (SSD) drives) utilize an open logical device interface specification for accessing its non-volatile storage media (e.g., provided by NAND flash memory devices) via a Peripheral Component Interconnect express (PCIe) bus to provide low latency, internal parallelism, and/or other benefits known in the art. However, NVMe storage devices present a challenge when utilized with RAID storage systems because the aggregate performance of the NVMe storage devices is typically much greater than the performance capabilities of the RAID storage controller provided for the RAID storage system (and that performance is even projected to be much greater than the performance capabilities of next-generation RAID storage controllers), which results in those RAID storage controllers being unable to manage more than a few NVMe storage devices (e.g., conventional RAID storage controllers are currently capable of managing approximately four NVMe storage devices). As such, the use of NVMe storage devices in RAID storage subsystems present RAID storage system scaling issues, as the RAID storage controllers cannot scale with more than a few NVMe storage devices. The inventors of the present disclosure have developed techniques (described in co-pending applications) that provide for the utilization of the RAID storage devices to assist in their own data updates in order to enhance the ability to scale RAID storage controllers with high performance RAID storage devices, but have found that doing so in some situations increases the number of data transfers required to accomplish the data update, providing for less efficient data update operations.

Accordingly, it would be desirable to provide a RAID storage system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Redundant Array Of Inexpensive Disks (RAID) storage controller engine that is configured to: receive, from a host system, a command that is associated with a data update on at least one of a plurality of RAID storage devices; determine, from a plurality of RAID data update techniques that are available to execute the command and perform the data update on the at least one of the plurality of RAID storage devices, a first RAID data update technique that is included in the plurality of RAID data update techniques and that requires the lowest number of data transfers to execute the command and perform the data update on the at least one of the plurality of RAID storage devices; and cause the command to be performed using the first RAID data update technique to provide the data update on the at least one of the plurality of RAID storage devices.

BRIEF DESCRIPTION OF THE DRAWINGS

FIG. 21 is a flow chart illustrating an embodiment of a method for performing data-transfer-based RAID data updates.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
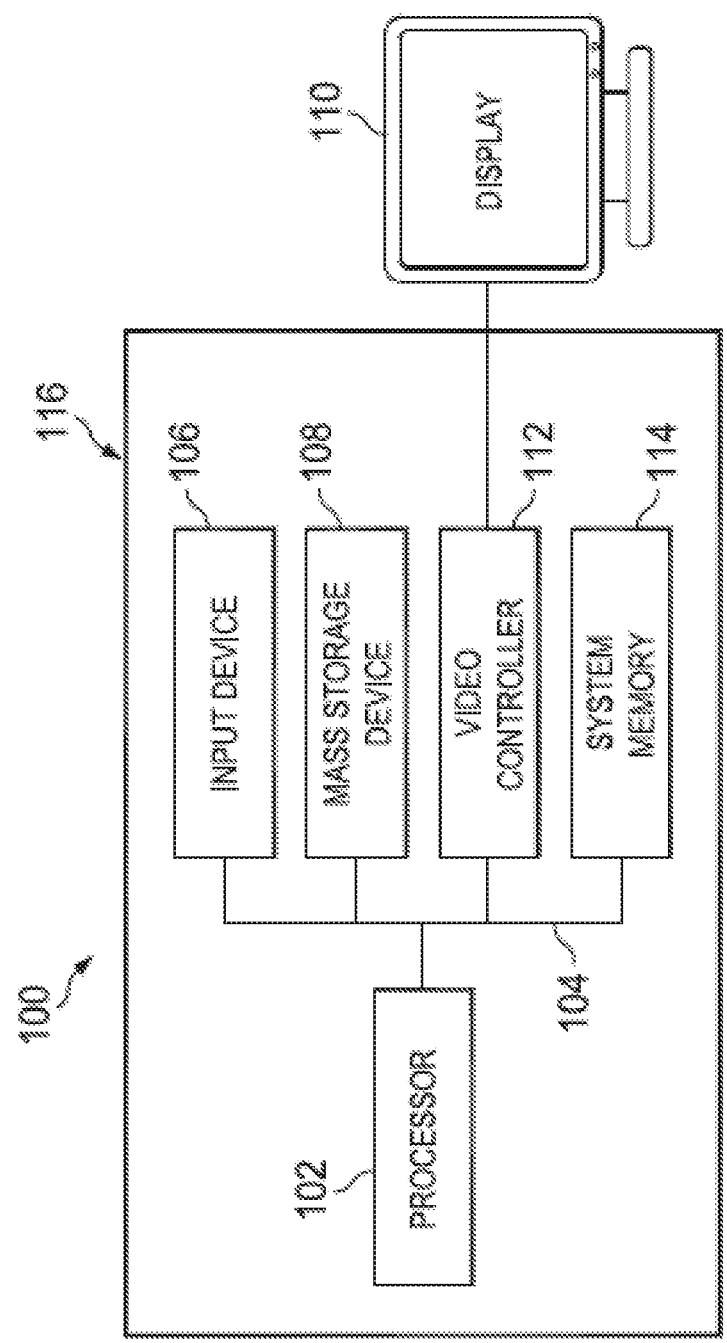
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
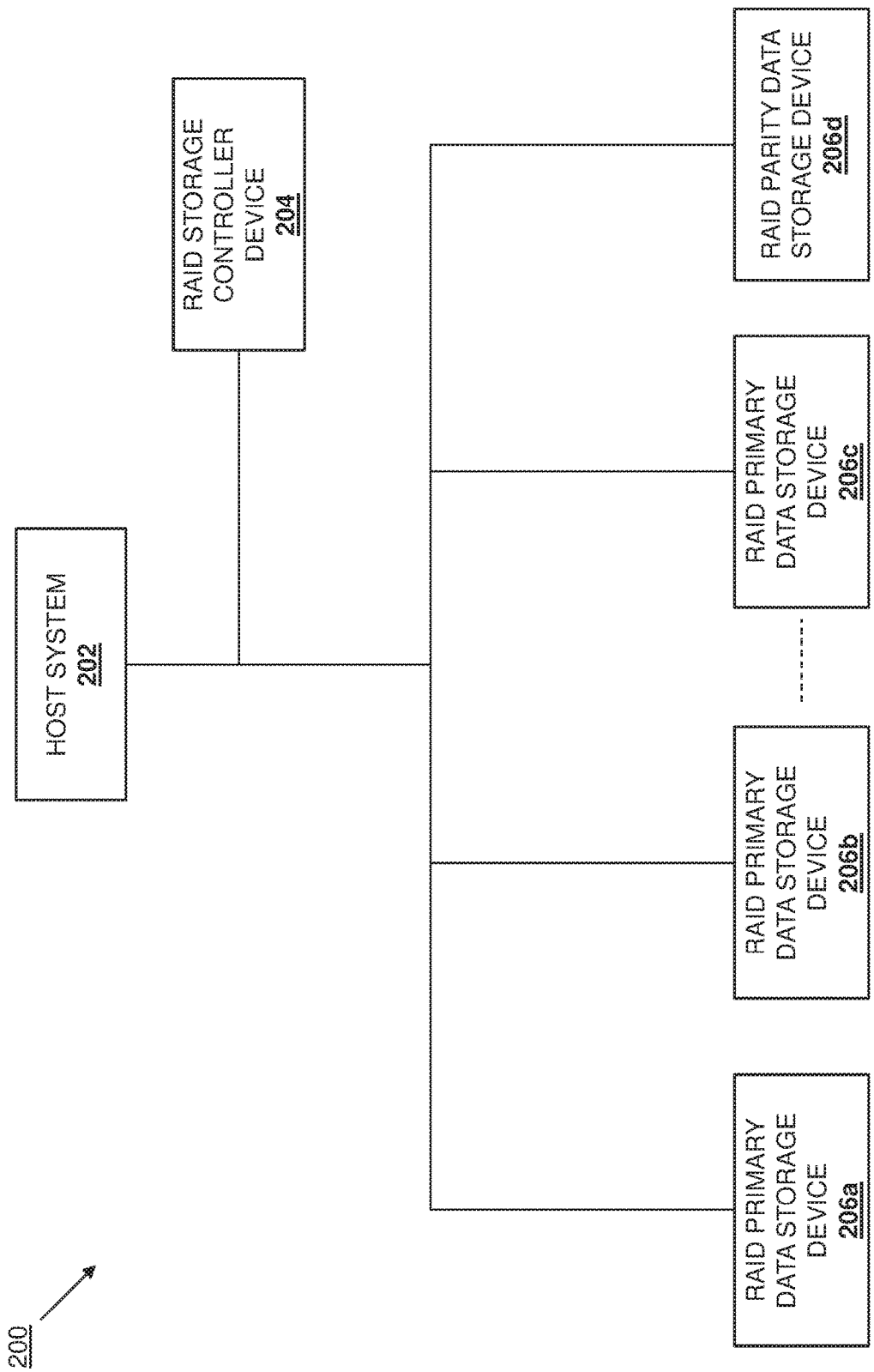
FIG. 2 is a schematic view illustrating an embodiment of a RAID storage system.

Referring now to FIG. 2, an embodiment of a Redundant Array of Independent Disks (RAID) storage system 200 is illustrated. In the illustrated embodiment, the RAID storage system 200 incudes a host system 202. In an embodiment, the host system 202 may be provided by the IHS 100 discussed above with reference to FIG. 1, and/or may include some or all of the components of the IHS 100. For example, the host system 202 may include server device(s), desktop computing device(s), a laptop/notebook computing device(s), tablet computing device(s), mobile phone(s), and/or any other host devices that one of skill in the art in possession of the present disclosure would recognize as operating similarly to the host system 202 discussed below. In the illustrated embodiment, the RAID storage system 200 also includes a RAID storage controller device 204 that is coupled to the host system 202 and that may be provided by the IHS 100 discussed above with reference to FIG. 1, and/or may include some or all of the components of the IHS 100. For example, the RAID storage controller device 204 may include any storage device/disk array controller device that is configured to manage physical storage devices and present them to host systems as logical units. In the discussion below, the RAID storage controller device 204 includes a processing system, and a memory system that is coupled to the processing system and that includes instructions that, when executed by the processing system, cause the processing system to provide a RAID storage controller engine that is configured to perform the functions of the RAID storage controller engines and RAID storage controller devices discussed below.

Furthermore, the RAID storage system 200 also includes a plurality of RAID storage devices that are illustrated in FIG. 2 as a plurality of RAID primary data storage devices 206a, 206b, and up to 206c, along with a RAID parity storage data device 206d, each of which is coupled to the host system 202 and the RAID storage controller system 204. However, as will be appreciated by one of skill in the art in possession of the present disclosure, any or all the plurality of RAID storage devices in the RAID storage system 200 illustrated in FIG. 2 may perform duals roles for different data stripes, with any particular RAID storage device operating as a RAID primary data storage device for one data stripe and a RAID parity data storage device for another data stripe. As will be appreciated by one of skill in the art in possession of the present disclosure, the RAID storage devices in the RAID storage system 200 of FIG. 2 are described as operating in a RAID 5 configuration, with the RAID primary data storage devices configured to store primary data (e.g., provided by the host system 202), and the RAID parity data storage device configured to store parity data that may be utilized to recover primary data when that primary data becomes unavailable on one of the RAID primary data storage devices.

However, while a few RAID storage devices in a particular configuration are illustrated, one of skill in the art in possession of the present disclosure will recognize that many more storage devices may (and typically will) be coupled to the RAID storage controller system 204 (e.g., in a datacenter) and may be provided in other RAID configurations while remaining within the scope of the present disclosure. In the embodiments discussed below, the RAID storage devices 206a-206d are described as being provided by Non-Volatile Memory express (NVMe) Solid State Drive (SSD) drives, but one of skill in the art in possession of the present disclosure will recognize that other types of storage devices with similar functionality as the NVMe SSD drives (e.g., NVMe PCIe add-in cards, NVMe M.2 cards, etc.) may be implemented according to the teachings of the present disclosure and thus will fall within its scope as well. While a specific RAID storage system 200 has been illustrated and described, one of skill in the art in possession of the present disclosure will recognize that the RAID storage system of the present disclosure may include a variety of components and component configurations while remaining within the scope of the present disclosure as well.

Figure 3:
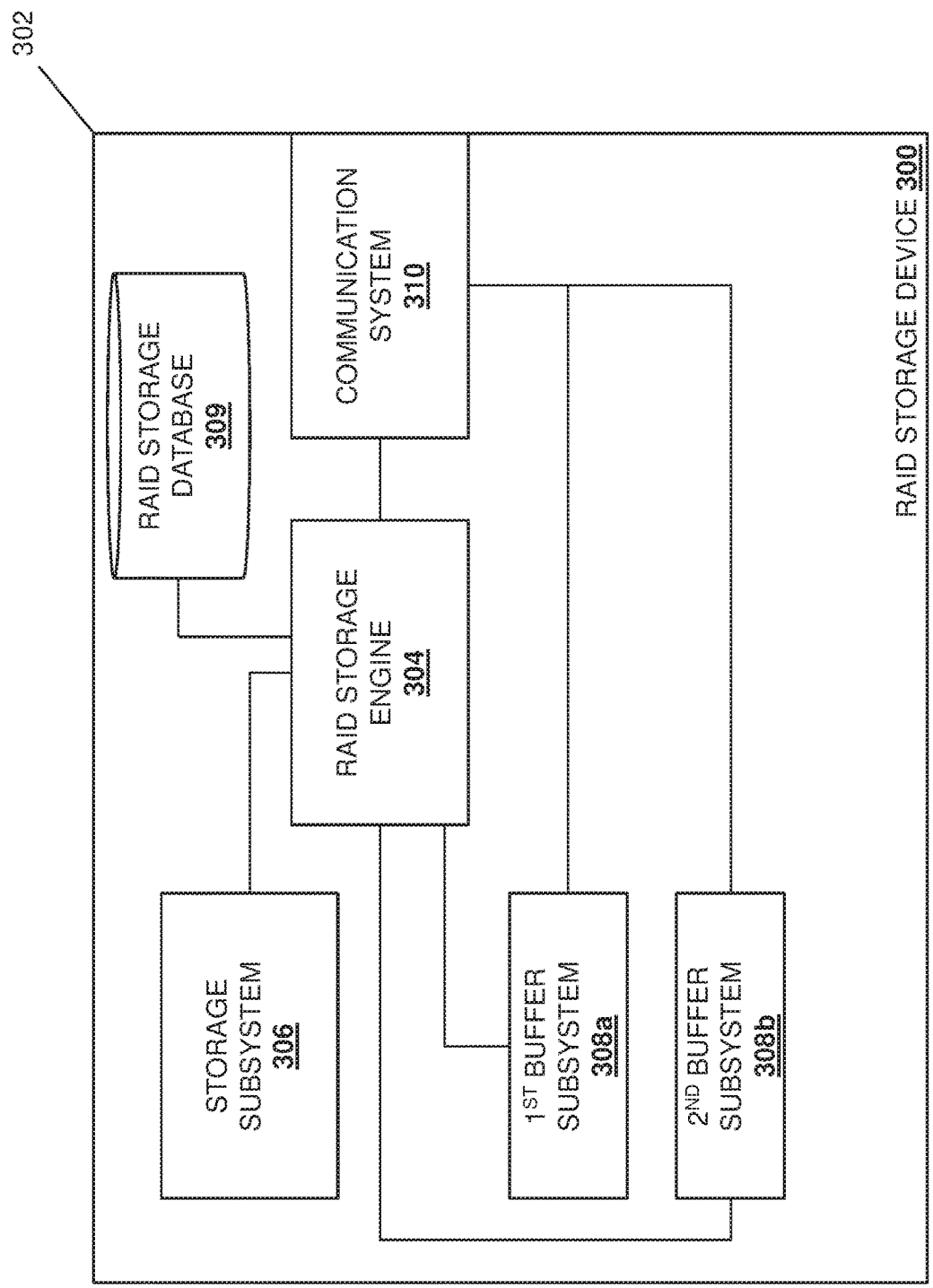
FIG. 3 is a schematic view illustrating an embodiment of a RAID storage device that may be provided in the RAID storage system of FIG. 2.

Referring now to FIG. 3, an embodiment of a RAID storage device 300 is illustrated that may provide any or all of the RAID primary data storage devices and the RAID parity data storage device discussed above with reference to FIG. 2. As such, the RAID storage device 300 may be provided by an NVMe SSD storage device, but one of skill in the art in possession of the present disclosure will recognize that other types of storage devices with similar functionality as the NVMe SSD storage devices (e.g., NVMe PCIe add-in cards, NVMe M.2 cards, etc.) may be provided according to the teachings of the present disclosure and thus will fall within its scope as well. In the illustrated embodiment, the RAID storage device 300 includes a chassis 302 that houses the components of the RAID storage device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a RAID storage engine 304 that is configured to perform the functionality of the RAID storage engines and/or RAID storage devices discussed below. While not illustrated, one of skill in the art in possession of the present disclosure will recognize that the RAID storage engine 304 may include, or be coupled to, other components such as a queues (e.g., the submission queues and completion queues discussed below) and/or RAID storage device components that would be apparent to one of skill in the art in possession of the present disclosure.

The chassis 302 may also house a storage subsystem 306 that is coupled to the RAID storage engine 304 (e.g., via a coupling between the storage subsystem 306 and the processing system). Continuing with the example provided above in which the RAID storage device 300 is an NVMe SSD storage device, the storage subsystem 306 may be provided by a flash memory array such as, for example, a plurality of NAND flash memory devices. However, one of skill in the art in possession of the present disclosure will recognize that the storage subsystem 306 may be provided using other storage technologies while remaining within the scope of the present disclosure as well. The chassis 302 may also house a first buffer subsystem 308a that is coupled to the RAID storage engine 304 (e.g., via a coupling between the first buffer subsystem 308a and the processing system). Continuing with the example provided above in which the RAID storage device 300 is an NVMe SSD storage device, the first buffer subsystem 308a may be provided by device buffer that is internal to the NVMe SSD storage device, not accessible via a PCIe bus connected to the NVMe SSD storage device, and conventionally utilized to initially store data received via write commands before writing them to flash media (e.g., NAND flash memory devices) in the NVMe SSD storage device. However, one of skill in the art in possession of the present disclosure will recognize that the first buffer subsystem 308a may be provided using other buffer technologies while remaining within the scope of the present disclosure as well.

The chassis 302 may also house a second buffer subsystem 308b that is coupled to the RAID storage engine 304 (e.g., via a coupling between the second buffer subsystem 308b and the processing system). Continuing with the example provided above in which the RAID storage device 300 is an NVMe SSD storage device, the second buffer subsystem 308b may be provided by a Controller Memory Buffer (CMB). However, one of skill in the art in possession of the present disclosure will recognize that the second buffer subsystem 308b may be provided using other buffer technologies while remaining within the scope of the present disclosure as well. The chassis 302 may also house a storage system (not illustrated, but which may be provided by the storage device 108 discussed above with reference to FIG. 1) that is coupled to the RAID storage engine 304 (e.g., via a coupling between the storage system and the processing system) and that includes a RAID storage database 309 that is configured to storage any of the information utilized by the RAID storage engine 304 as discussed below.

The chassis 302 may also house a communication system 310 that is coupled to the RAID storage engine 304 (e.g., via a coupling between the communication system 310 and the processing system), the first buffer subsystem 308a, and the second buffer subsystem 308b, and that may be provided by any of a variety of storage device communication technologies and/or any other communication components that would be apparent to one of skill in the art in possession of the present disclosure. Continuing with the example provided above in which the RAID storage device 300 is an NVMe SSD storage device, the communication system 310 may include any NVMe SSD storage device communication components that enable the Direct Memory Access (DMA) operations described below, the submission and completion queues discussed below, as well as any other components that provide NVMe SDD storage device communication functionality that would be apparent to one of skill in the art in possession of the present disclosure. While a specific RAID storage device 300 has been illustrated, one of skill in the art in possession of the present disclosure will recognize that RAID storage devices (or other devices operating according to the teachings of the present disclosure in a manner similar to that described below for the RAID storage device 300) may include a variety of components and/or component configurations for providing conventional RAID storage device functionality, as well as the functionality discussed below, while remaining within the scope of the present disclosure as well.

The present disclosure provides techniques to reduce the number of data transfers needed to perform a data update operation in a RAID storage system, while also attempting to offload many of those data update operations from the RAID storage controller device in that RAID storage system by having the RAID storage devices assist in performing those data update operations when doing so requires the fewest number of data transfers. As discussed in further detail below, there are several data update techniques that may be utilized in performing a data update in a RAID storage system depending on the data update scenario involved, including the RAID storage-device-assisted (partial or full stripe) data update operations, the RAID storage controller partial stripe data update operations, and the RAID storage controller full stripe data update operations detailed below. The inventors have discovered that the number of data transfers required to complete such data update operations depends on the number of RAID primary data storage devices having their primary data updated and/or the number of RAID storage devices in the RAID storage system, which allows the RAID storage controller device to be configured to identify the data update technique that is associated with the lowest number of data transfers for any particular data update command, and select that data update technique to perform the data update for the RAID storage system. As such, RAID storage devices in the RAID storage system can be utilized to assist in the data update when doing so is associated with the lowest number of data transfers, which allows those data update operations to be offloaded from the RAID storage controller device and enhances the ability to scale the RAID storage controller device with high performance RAID storage devices, while the RAID storage controller device may perform the data update when doing so is associated with the lowest number of data transfers to ensure efficient data update operations.

Figure 4:
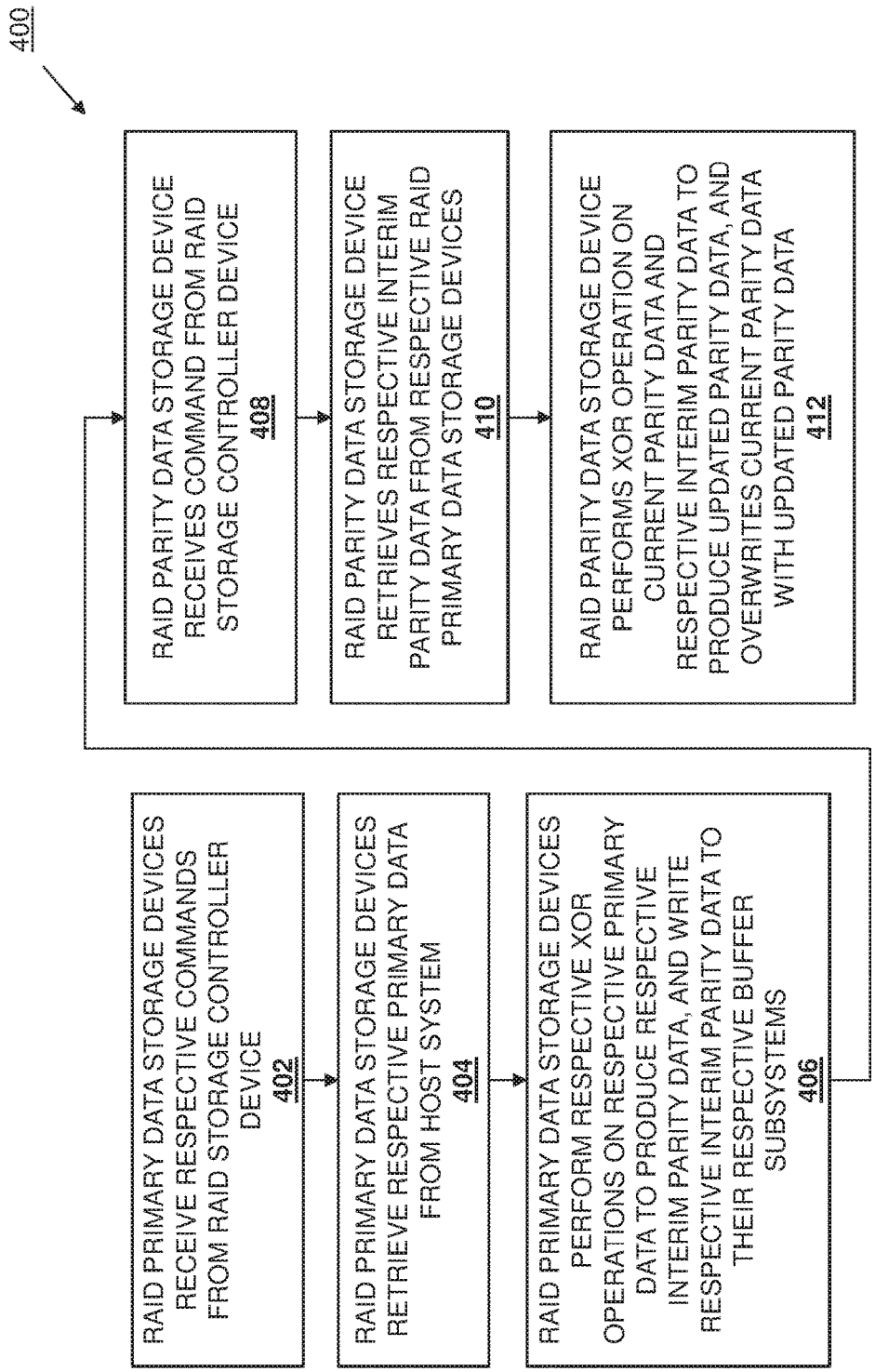
FIG. 4 is a flow chart illustrating an embodiment of a method for performing data update operations using RAID storage devices.

Referring now to FIG. 4, an embodiment of a method 400 for performing data update operations using RAID storage devices is illustrated. As discussed below, embodiments of the systems and methods of the present disclosure may provide for the performance of data update operations by the RAID storage devices that store that data. For example, the RAID storage controller device may send commands to each of the RAID primary data storage device(s) that is experiencing a data update and, in response to that command, each of those RAID primary data storage device(s) may operate to perform respective DMA operation(s) to retrieve their updated primary data, perform XOR operations on their current primary data and their updated primary data to produce interim parity data, and overwrite their current primary data with the updated primary data, The RAID storage controller device may then send a command to the RAID parity data storage device and, in response to that command, the RAID parity data storage device may perform DMA operation(s) to retrieve the interim parity data produced by each of the RAID primary data storage device(s), perform an XOR operation of that interim parity data and its current parity data to produce updated parity data, and overwrite its current parity data with the updated parity data. As such, in some embodiments of the present disclosure, data update operations may be offloaded from the RAID storage controller device, thus increasing the ability of the RAID storage controller device to scale with high performance RAID storage devices. Furthermore, one of skill in the art in possession of the present disclosure will recognize that the number of data transfers performed using such RAID storage-device-assisted data update techniques is 2n, where n is the number of RAID primary data storage devices experiencing a primary data update.

Figure 5:
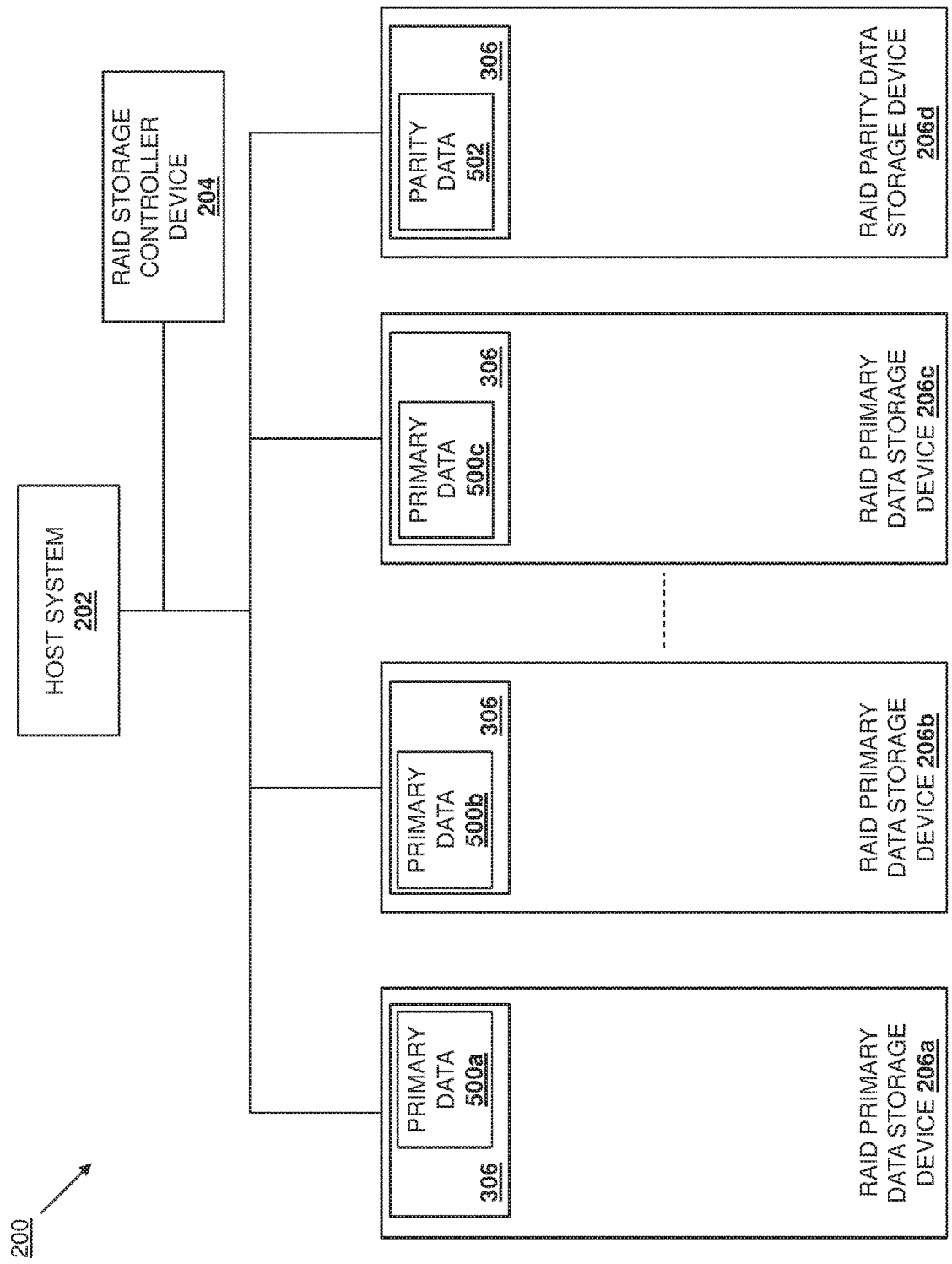
FIG. 5 is a schematic view illustrating an embodiment of the RAID storage system of FIG. 2 operating during the method of FIG. 4.

With reference to FIG. 5, the RAID storage system 200 is illustrated with the RAID primary data storage device 206a storing primary data 500a in its storage subsystem 306, the RAID primary data storage device 206b storing primary data 500b in its storage subsystem 306, and the RAID primary data storage device 206c storing primary data 500c in its storage subsystem 306. While only three RAID primary data storage devices are illustrated and described in the examples provided below, one of skill in the art in possession of the present disclosure will recognize that any number of RAID primary data storage devices may store primary data while remaining within the scope of the present disclosure as well. In addition, the RAID storage system 200 is also illustrated with the RAID parity data storage device 206d storing parity data 502 in its storage subsystem 306, and one of skill in the art in possession of the present disclosure will recognize that the parity data 502 may have been generated via an XOR operation performed on the primary data 500a-500c in the RAID primary data storage devices 206a-206c, and allows for the rebuilding of any primary data stored on any one RAID primary data storage device in the event that primary data/RAID primary data storage device becomes unavailable.

As will also be appreciated by one of skill in the art in possession of the present disclosure, and as discussed in some of the examples provided below, the primary/parity data storage configuration illustrated in FIG. 5 provides primary/parity for a single data strip, and different data strips may have different primary/parity data storage configurations (e.g., in a plurality of RAID storage devices provided in a RAID storage system, a first data stripe may include primary data on first, second, and third RAID storage devices and parity data on a fourth RAID storage device; a second data stripe may include primary data on the second, third, and fourth RAID storage devices and parity data on the first RAID storage device, etc.) As such, while a particular RAID storage system device and data configuration is illustrated for purposes of the examples below, one of skill in the art in possession of the present disclosure will recognize that a variety of device and data configurations will fall within the scope of the present disclosure as well.

Figure 6A:
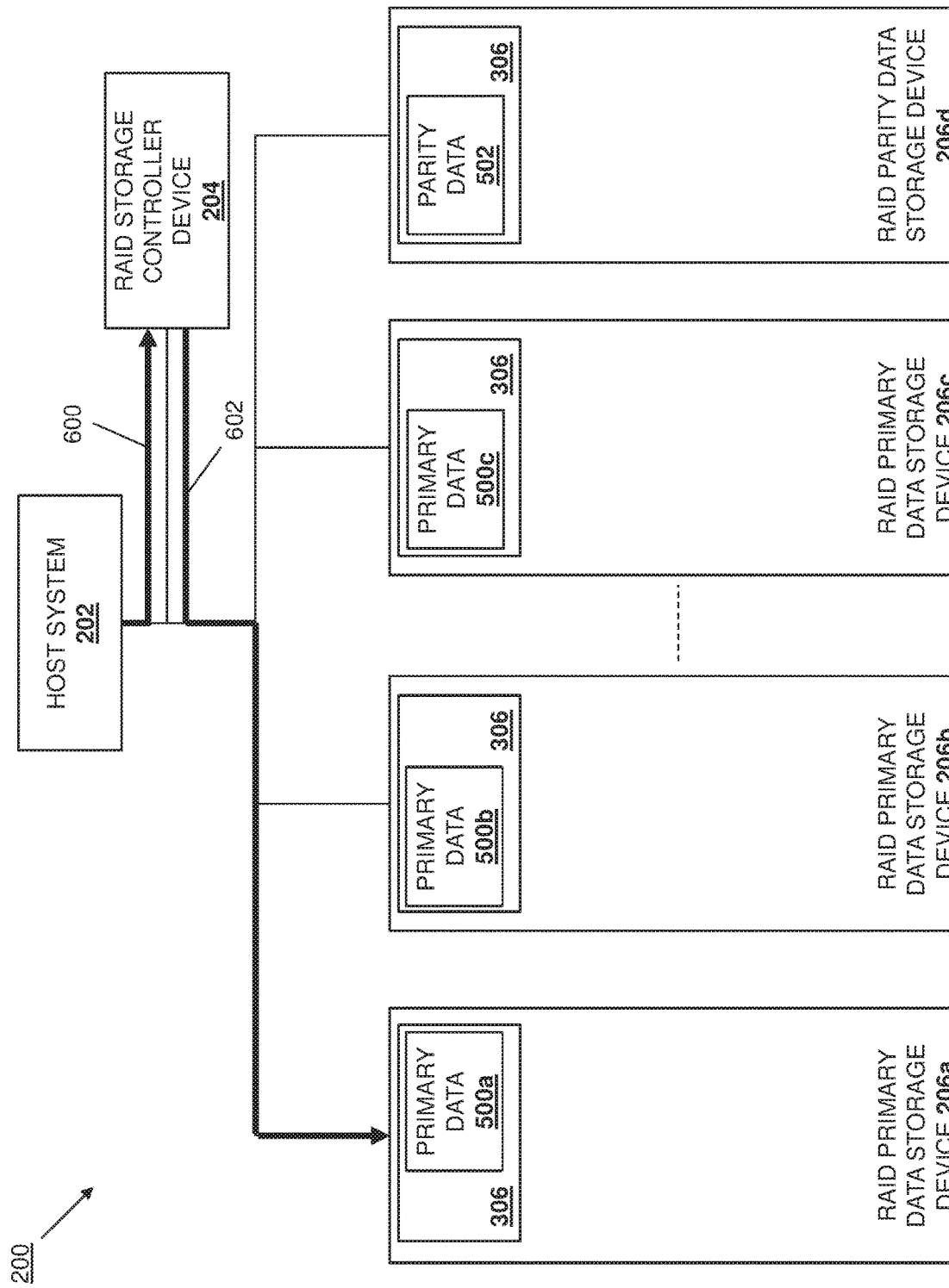
FIG. 6A is a schematic view illustrating an embodiment of the RAID storage system of FIG. 2 operating during the method of FIG. 4.

The method 400 begins at block 402 where RAID primary data storage devices receive respective commands from a RAID storage controller device. In an embodiment, at block 402, the RAID storage controller device 204 may generate and transmit commands to RAID primary data storage devices. With reference to FIG. 6A, the host system 202 may generate a write command 600 that instructs the writing of primary data that is located on the host system 200 to the RAID primary data storage devices 206a-206c, and may transmit that write command 600 to the RAID storage controller device 204. As will be appreciated by one of skill in the art in possession of the present disclosure, the generation and/or transmission of the write command 600 by the host system 202 to the RAID storage controller device 204 at block 402 may include a variety of control plane communications between the host system 202 and the RAID storage controller device 204 that have been omitted for clarity of discussion. As such, at block 402, the RAID storage controller device 204 may receive the write command 600 and, in response to that write command 600, may generate commands and transmit the commands to one or more of the RAID primary data storage devices 206a-c. The discussion below describes the RAID storage controller device 204 transmitting commands that cause data updates on all of the RAID storage devices (e.g., the RAID primary data storage devices 206a-206b and the RAID parity data storage device 206d), otherwise known as a "full stripe write". However, as discussed below, many embodiments of the present disclosure will only perform partial stripe writes (e.g., when the RAID storage controller device 204 transmits commands that cause data updates on only a subset of the RAID storage devices 206a-206d) according to the method 400, and thus at least one (and often more than one) of those commands will not be transmitted in most situations.

Figure 7A:
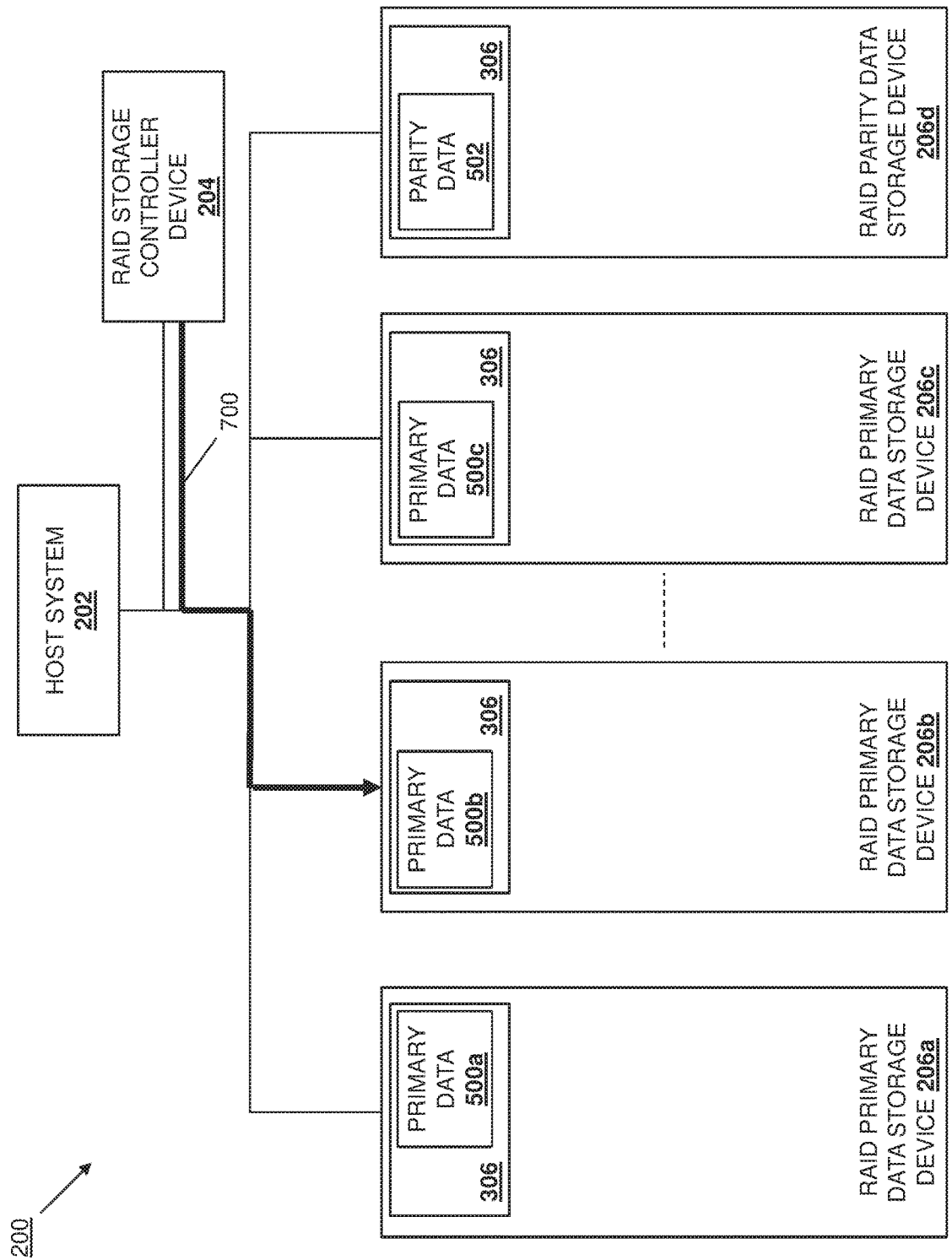
FIG. 7A is a schematic view illustrating an embodiment of the RAID storage system of FIG. 2 operating during the method of FIG. 4.
Figure 8A:
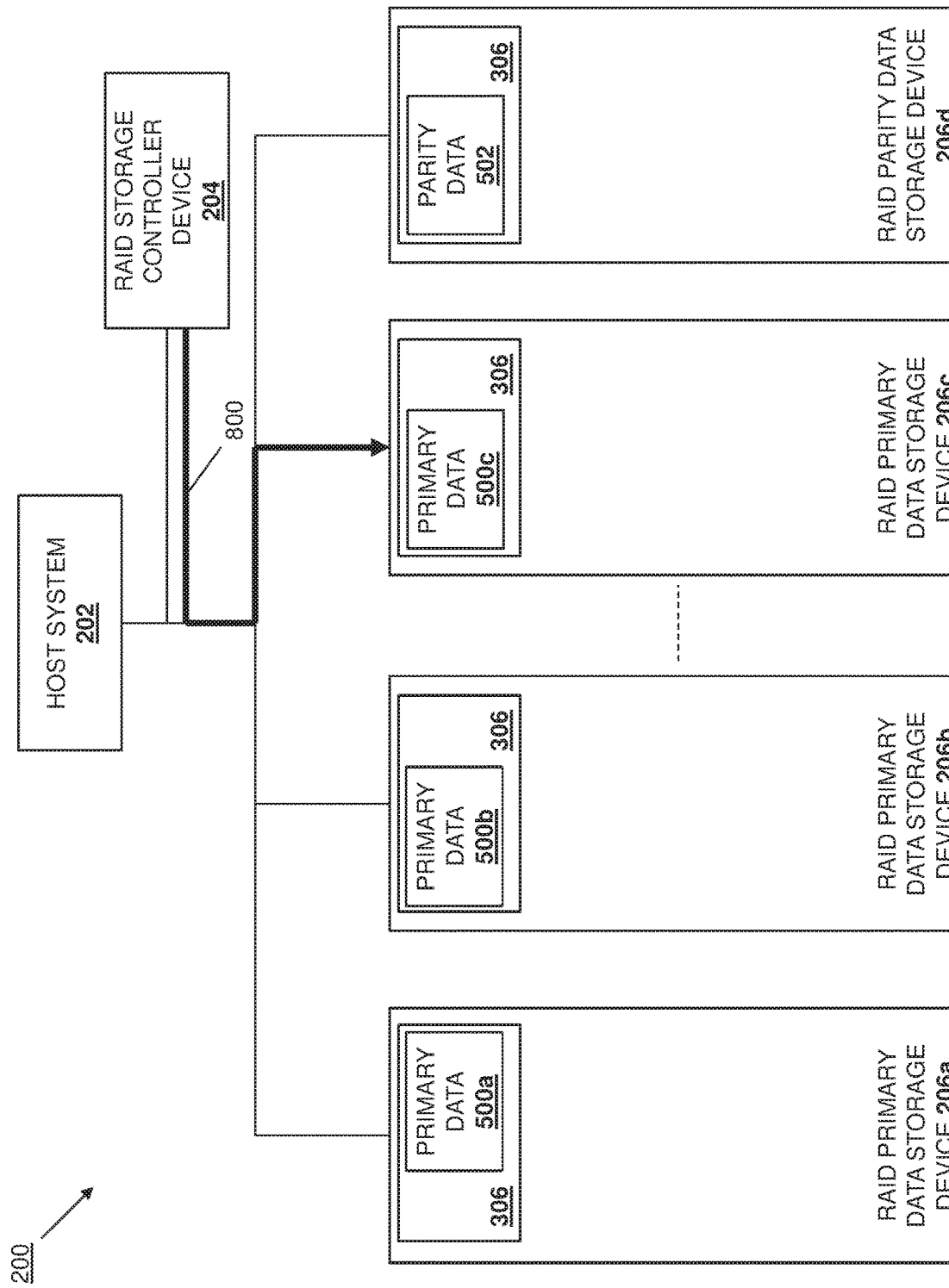
FIG. 8A is a schematic view illustrating an embodiment of the RAID storage system of FIG. 2 operating during the method of FIG. 4.

FIG. 6A illustrates the RAID storage controller device 204 transmitting a command 602 to the RAID primary data storage device 206a, while FIG. 7A illustrates the RAID storage controller device 204 transmitting a command 700 to the RAID primary data storage device 206b, and FIG. 8A illustrates the RAID storage controller device 204 transmitting a command 800 to the RAID primary data storage device 206c. As will be appreciated by one of skill in the art in possession of the present disclosure, the commands 602, 700, and 800 may be transmitted to the RAID primary data storage devices 206a, 206b, and 206c at substantially the same time, although sequentially transmission of the commands 602, 700, and 800 will fall within the scope of the present disclosure as well.

In some embodiments, the commands 602, 700, and 800 may be multi-operation commands like those described in U.S. patent application Ser. No. 16/585,296, filed on Sep. 27, 2019. For example, the commands 602, 700, and 800 may be NVMe WRITE WITH XOR multi-operation commands that are configured to cause the RAID primary data storage devices 206a, 206b, and 206c to perform the multiple operations described below. However, while described as providing multi-operation commands at block 402, one of skill in the art in possession of the present disclosure will recognize that the multiple operations performed by the RAID primary data storage device 206a, 206b, and 206c discussed below may be performed in response to respective commands transmitted by the RAID storage controller device 204 while remaining within the scope of the present disclosure as well. In a specific example, the transmission of the commands 602, 700, and 800 may include the RAID storage controller device 204 providing the commands 602, 700, and 800 in respective submission queues that are included in the communication systems 310 in the RAID primary data storage devices 206a/300, 206b/300, and 206c/300, and then ringing doorbells for the RAID primary data storage devices 206a/300, 206b/300, and 206c/300. However, one of skill in the art in possession of the present disclosure will recognize that the commands 602, 700, and 800 may be provided to the RAID primary data storage devices 206a, 206b, and 206c in a variety of manners that will fall within the scope of the present disclosure as well.

As such, in some examples the respective RAID storage engine 304 in the RAID primary data storage devices 206a/300, 206b/300, and 206c/300 may respond to the ringing of their doorbells by accessing the commands 602, 700, and 800, respectively, in the submission queue in their communication systems 310. In embodiments in which the commands 602, 700, and 800 are multi-operation commands, the respective RAID storage engine 304 in the RAID primary data storage devices 206a/300, 206b/300, and 206c/300 may identify the multiple operations instructed by those commands 602, 700, and 800 (as described in U.S. patent application Ser. No. 16/585,296, filed on Sep. 27, 2019.) However, while all of the RAID primary data storage devices 206a, 206b, and 206c are illustrated and described below as receiving the commands 602, 700, and 800 that causes them to update their primary data 500a, 500b, and 500c, one of skill in the art in possession of the present disclosure will recognize how only a subset of the RAID primary storage devices 206a, 206b, and 206c may receive the commands at block 402 (e.g., when a partial stripe write is being performed as discussed above) while remaining within the scope of the present disclosure as well.

Figure 6B:
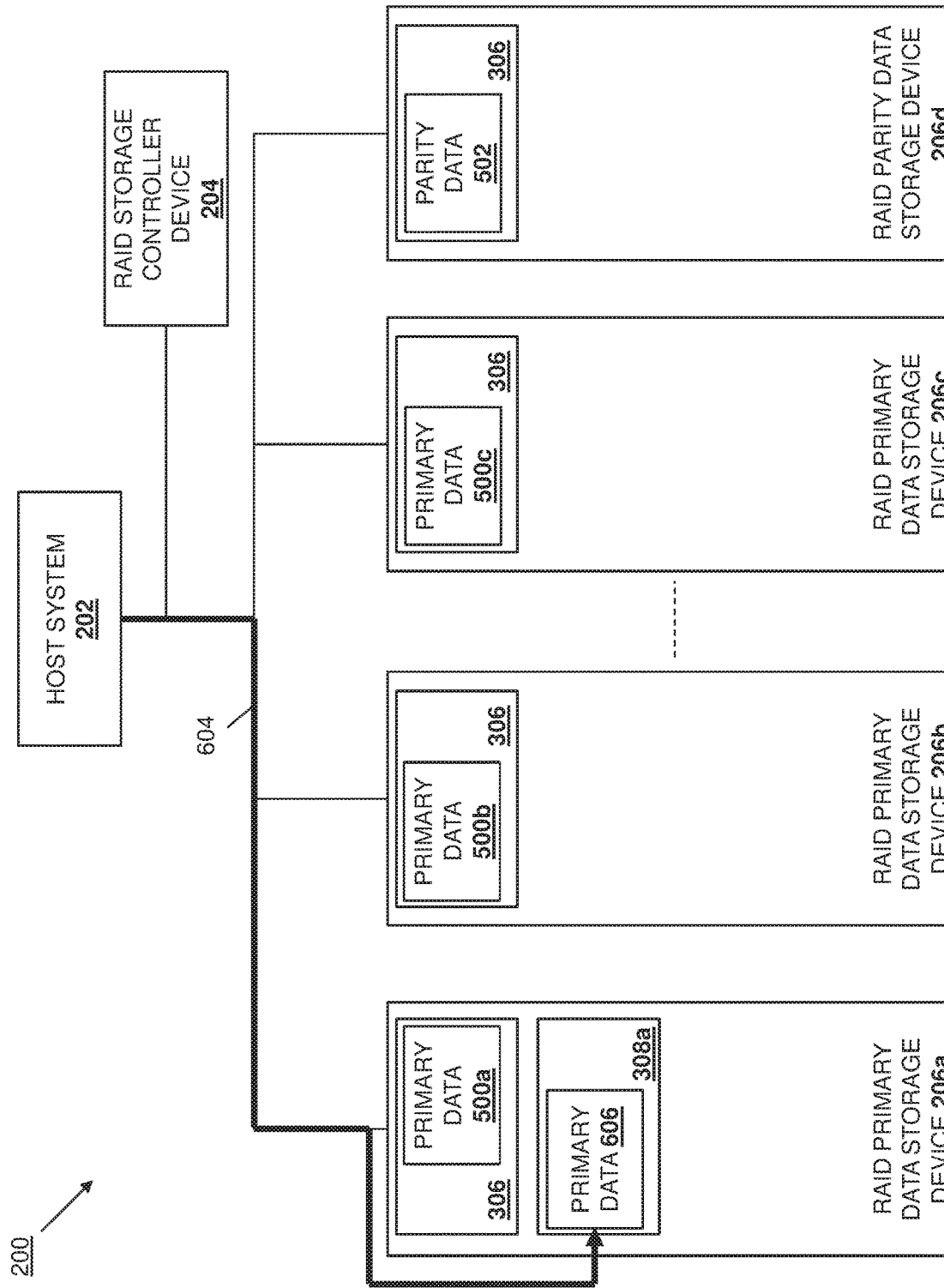
FIG. 6B is a schematic view illustrating an embodiment of the RAID storage system of FIG. 2 operating during the method of FIG. 4.

The method 400 then proceeds to block 404 where the RAID primary data storage devices retrieve respective primary data from a host system. With reference to FIG. 6B, in an embodiment of block 404 and based on the command 602 (which is a multi-operation command as described above in this embodiment), the RAID storage engine 304 in the RAID primary data storage device 206a/300 may operate to perform a Direct Memory Access (DMA) operation 604 that accesses primary data 606 that is stored on the host system 202 (e.g., in a memory system or storage system included on the host system 202) and writes that primary data 606 to its first buffer subsystem 308a (e.g., in a device buffer in the RAID primary data storage device 206a as described in the example above). As will be appreciated by one of skill in the art in possession of the present disclosure, the primary data 606 may be an update to the primary data 500a stored in the storage subsystem 306 in the RAID primary data storage device 206a, although other primary data writing scenarios will fall within the scope of the present disclosure as well.

Figure 7B:
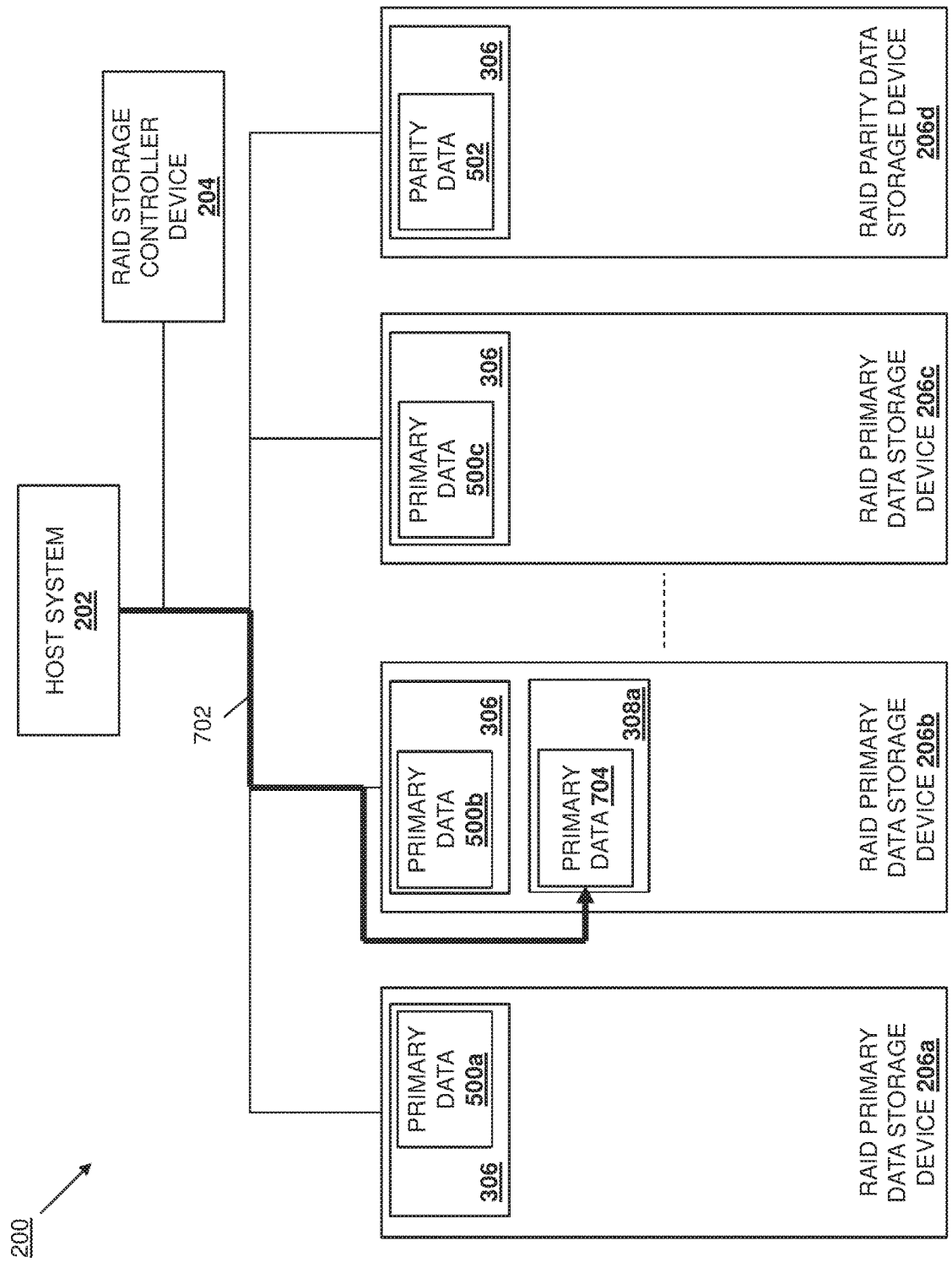
FIG. 7B is a schematic view illustrating an embodiment of the RAID storage system of FIG. 2 operating during the method of FIG. 4.

With reference to FIG. 7B, in an embodiment of block 404 and based on the command 700 (which is a multi-operation command as described above in this embodiment), the RAID storage engine 304 in the RAID primary data storage device 206b/300 may operate to perform a Direct Memory Access (DMA) operation 702 that accesses primary data 704 that is stored on the host system 202 (e.g., in a memory system or storage system included on the host system 202) and writes that primary data 704 to its first buffer subsystem 308a (e.g., in a device buffer in the RAID primary data storage device 206b as described in the example above). As will be appreciated by one of skill in the art in possession of the present disclosure, the primary data 704 may be an update to the primary data 500b stored in the storage subsystem 306 in the RAID primary data storage device 206b, although other primary data writing scenarios will fall within the scope of the present disclosure as well.

Figure 8B:
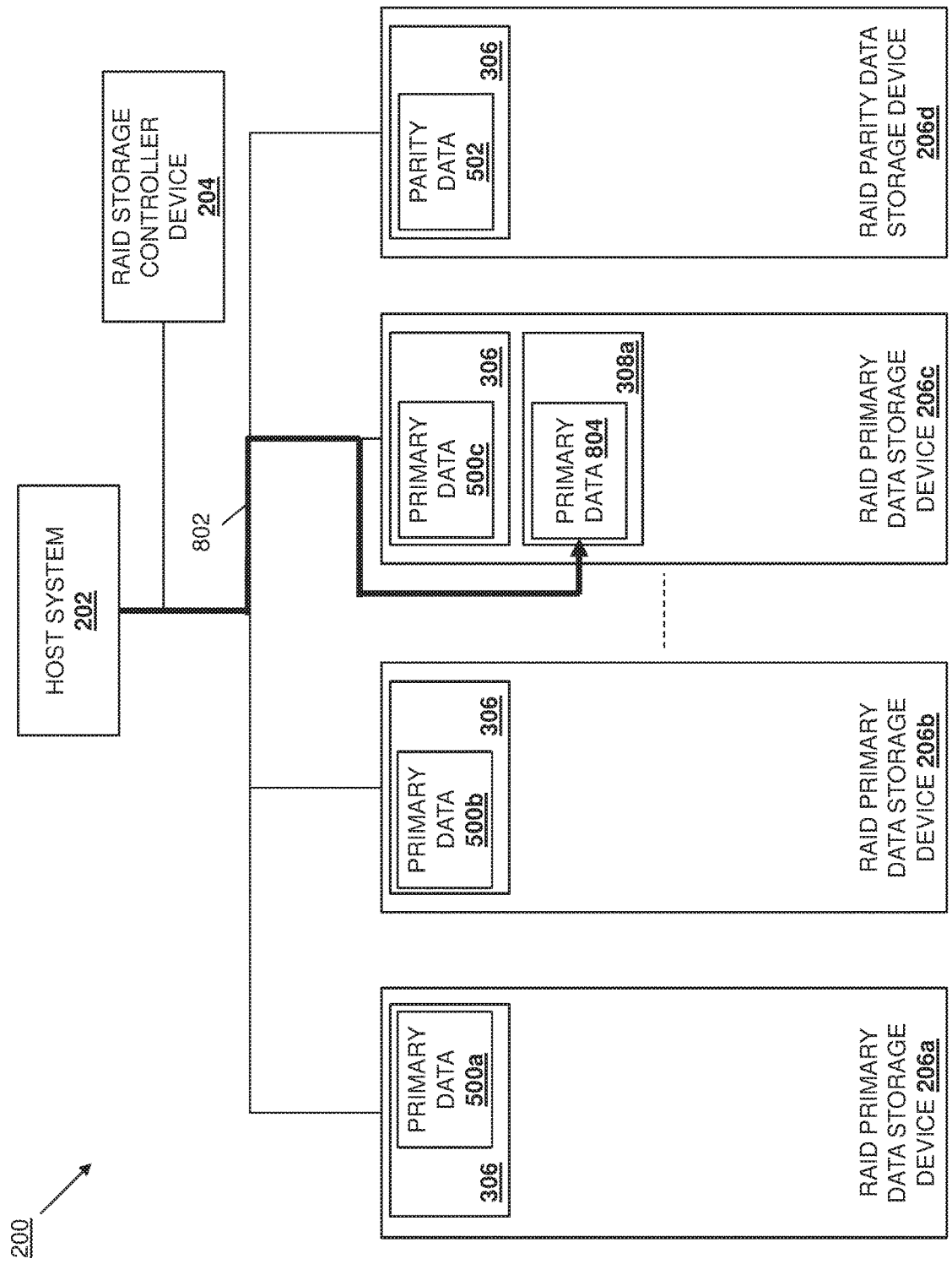
FIG. 8B is a schematic view illustrating an embodiment of the RAID storage system of FIG. 2 operating during the method of FIG. 4.

With reference to FIG. 8B, in an embodiment of block 404 and based on the command 800 (which is a multi-operation command as described above in this embodiment), the RAID storage engine 304 in the RAID primary data storage device 206c/300 may operate to perform a Direct Memory Access (DMA) operation 802 that accesses primary data 804 that is stored on the host system 202 (e.g., in a memory system or storage system included on the host system 202) and writes that primary data 804 to its first buffer subsystem 308a (e.g., in a device buffer in the RAID primary data storage device 206c as described in the example above). As will be appreciated by one of skill in the art in possession of the present disclosure, the primary data 804 may be an update to the primary data 500c stored in the storage subsystem 306 in the RAID primary data storage device 206c, although other primary data writing scenarios will fall within the scope of the present disclosure as well. As discussed above, the retrieval of the primary data 606, 704, and 804 in the example above describes a full stripe write, and one of skill in the art in possession of the present disclosure will recognize that some of that primary data may not be retrieved in the event a partial stripe write is being performed.

Figure 6C:
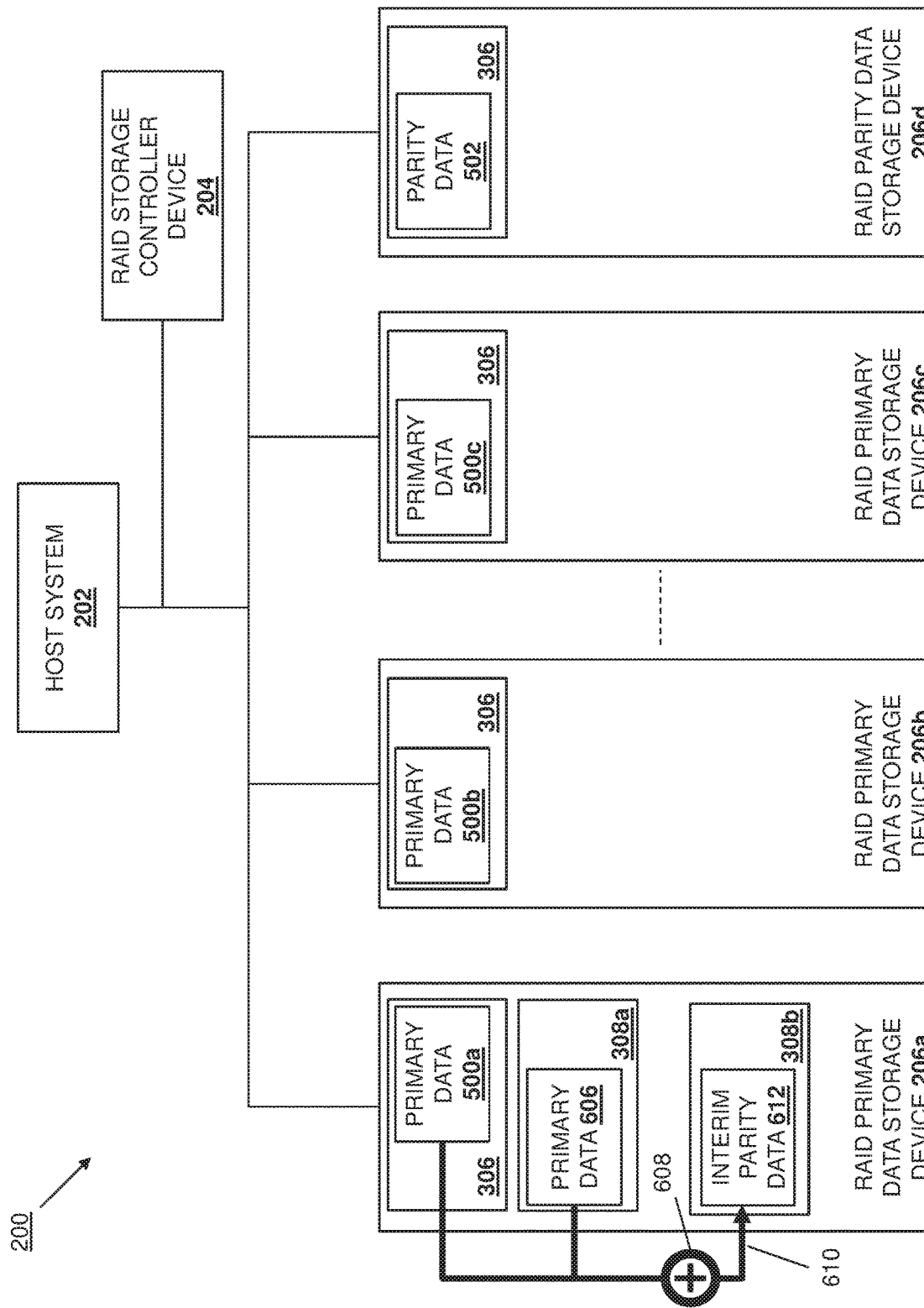
FIG. 6C is a schematic view illustrating an embodiment of the RAID storage system of FIG. 2 operating during the method of FIG. 4.
Figure 6D:
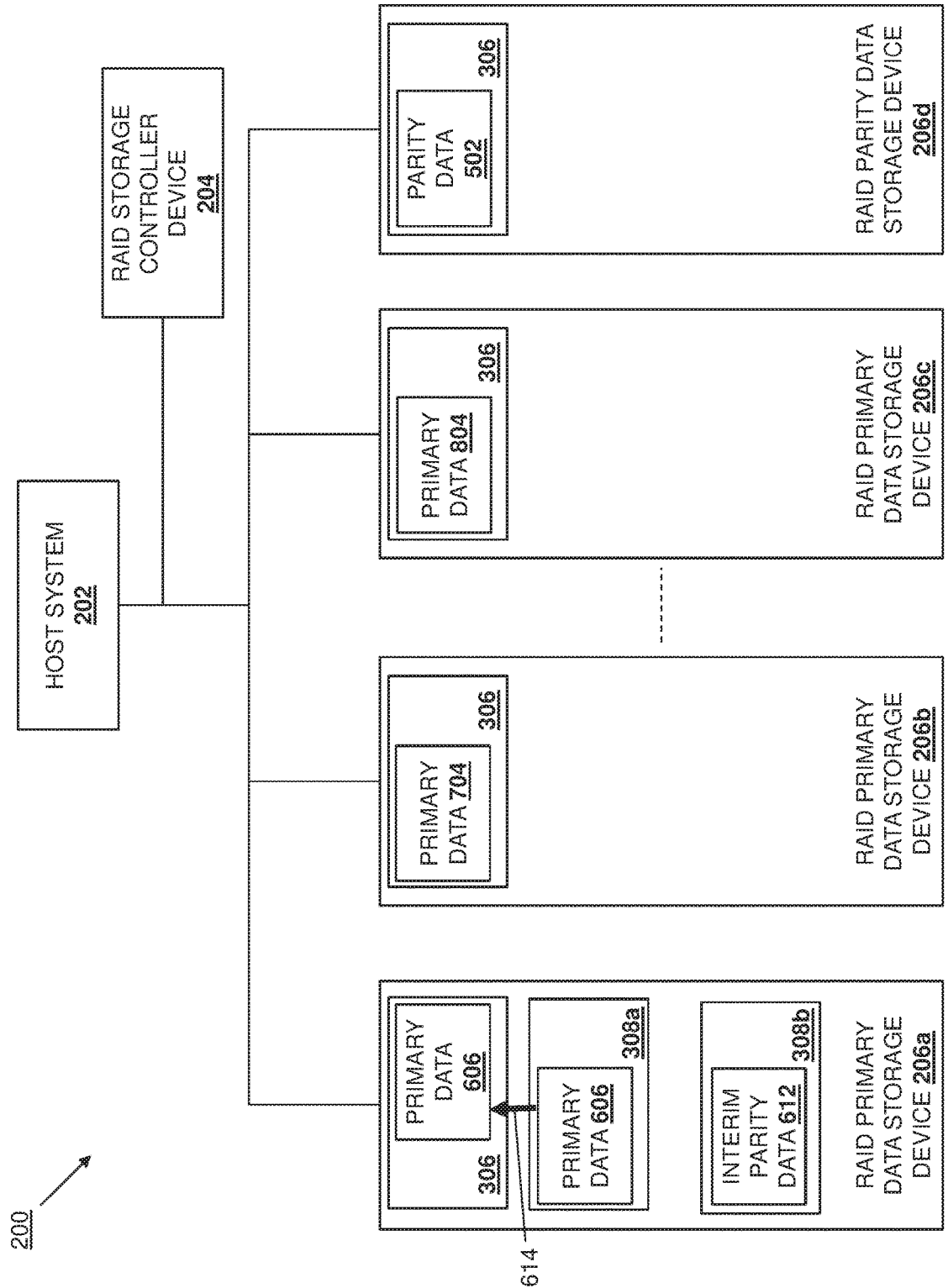
FIG. 6D is a schematic view illustrating an embodiment of the RAID storage system of FIG. 2 operating during the method of FIG. 4.

The method 400 then proceeds to block 406 where the RAID primary data storage devices perform respective XOR operations on respective primary data to produce respective interim parity data, and write the respective interim parity data to their respective buffer subsystems. With reference to FIG. 6C, in an embodiment of block 406 and based on the command 602 (which is a multi-operation command as described above in this embodiment), the RAID storage engine 304 in the RAID primary data storage device 206a/300 may operate to perform an XOR operation 608 using the primary data 500a in its storage subsystem 306 and the primary data 606 in its first buffer subsystem 308a in order to produce interim parity data 612, and then perform a write operation 610 to write that interim parity data 612 to its second buffer subsystem 308b (e.g., a CMB). Further still, FIG. 6D illustrates how the RAID storage engine 304 in the RAID parity data storage device 206a may perform an overwrite operation 614 to overwrite the primary data 500a in its storage subsystem 306 with the primary data 606 in its first buffer subsystem 308a based on the command 602 (which is a multi-operation command as described above in this embodiment), thus updating that primary data stored by the RAID primary data storage device 206a.

Figure 7C:
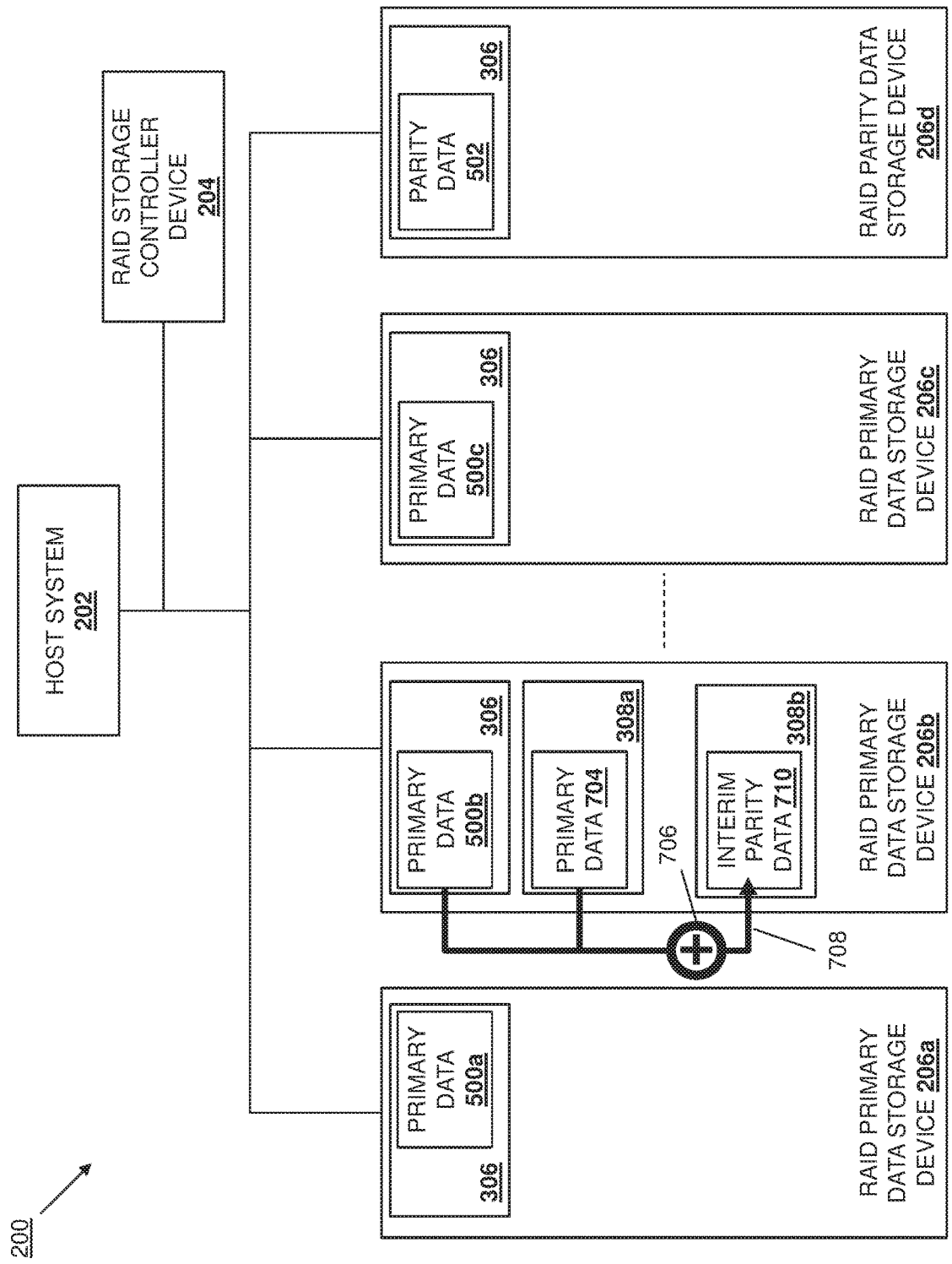
FIG. 7C is a schematic view illustrating an embodiment of the RAID storage system of FIG. 2 operating during the method of FIG. 4.
Figure 7D:
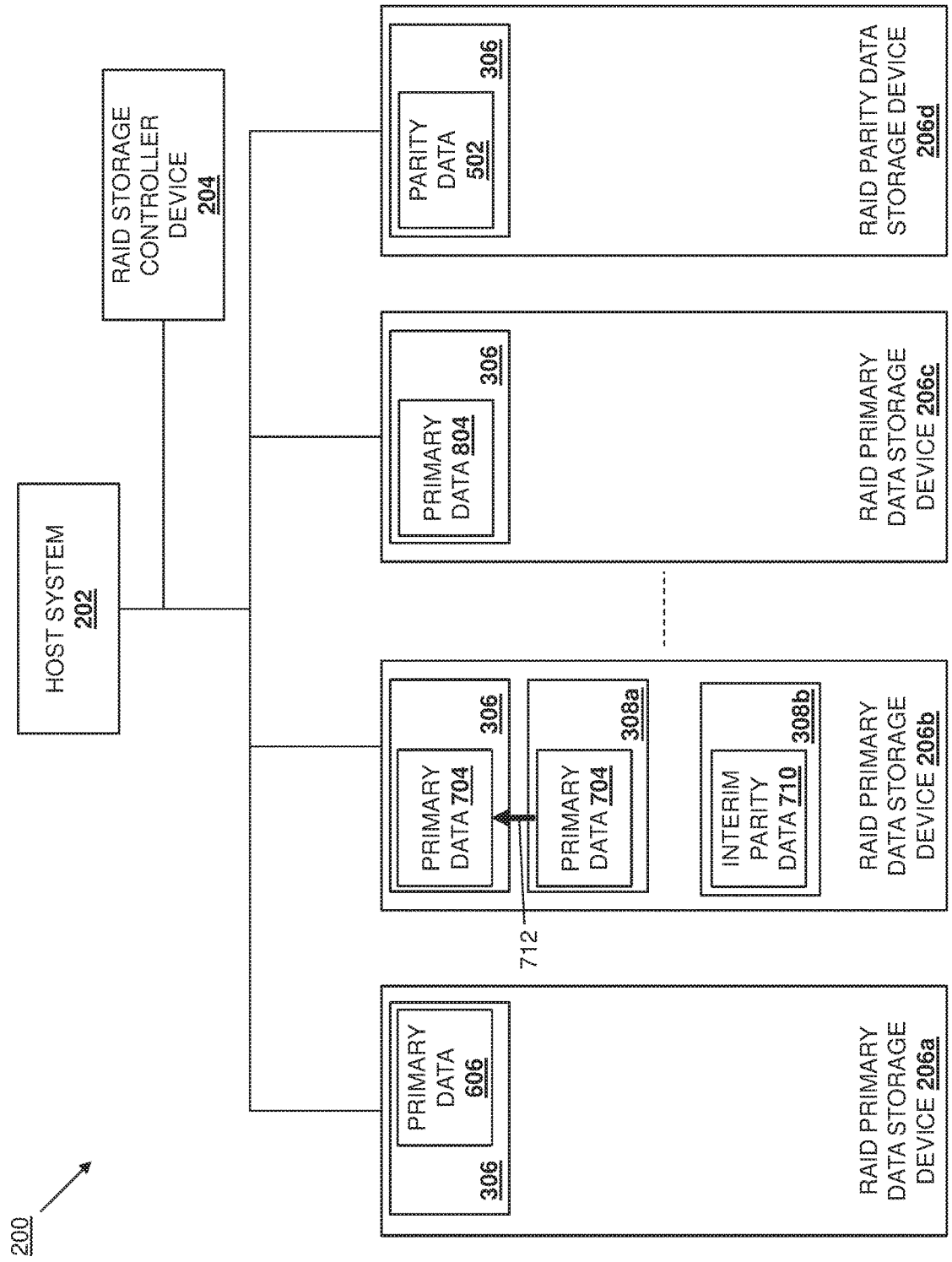
FIG. 7D is a schematic view illustrating an embodiment of the RAID storage system of FIG. 2 operating during the method of FIG. 4.

With reference to FIG. 7C, in an embodiment of block 406 and based on the command 700 (which is a multi-operation command as described above in this embodiment), the RAID storage engine 304 in the RAID primary data storage device 206b/300 may operate to perform an XOR operation 706 using the primary data 500b in its storage subsystem 306 and the primary data 704 in its first buffer subsystem 308a in order to produce interim parity data 710, and then perform a write operation 708 to write that interim parity data 710 to its second buffer subsystem 308b (e.g., a CMB). Further still, FIG. 7D illustrates how the RAID storage engine 304 in the RAID parity data storage device 206b may perform an overwrite operation 712 to overwrite the primary data 500b in its storage subsystem 306 with the primary data 704 in its first buffer subsystem 308a based on the command 700 (which is a multi-operation command as described above in this embodiment), thus updating that primary data stored by the RAID primary data storage device 206b.

Figure 7E:
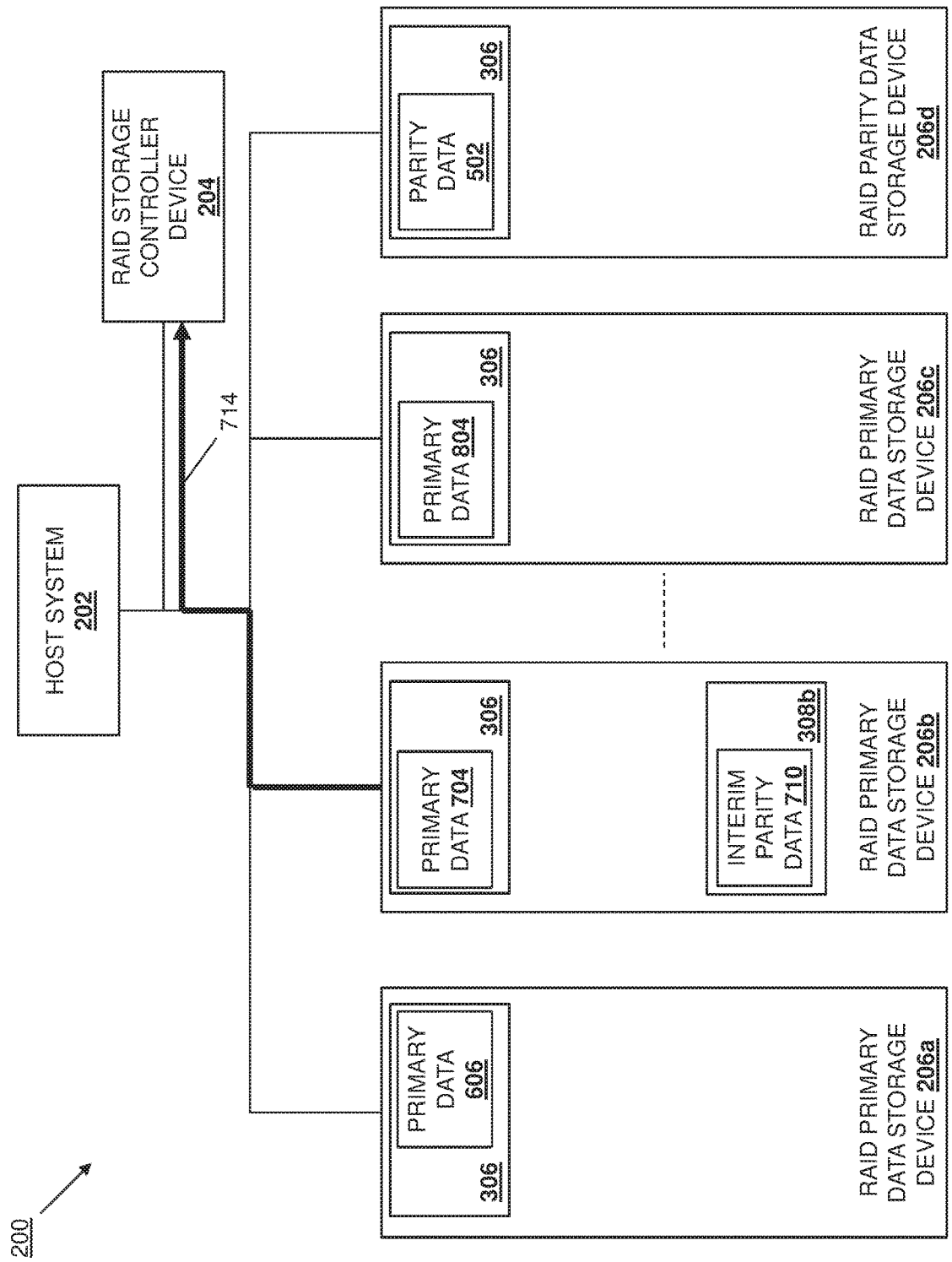
FIG. 7E is a schematic view illustrating an embodiment of the RAID storage system of FIG. 2 operating during the method of FIG. 4.
Figure 8C:
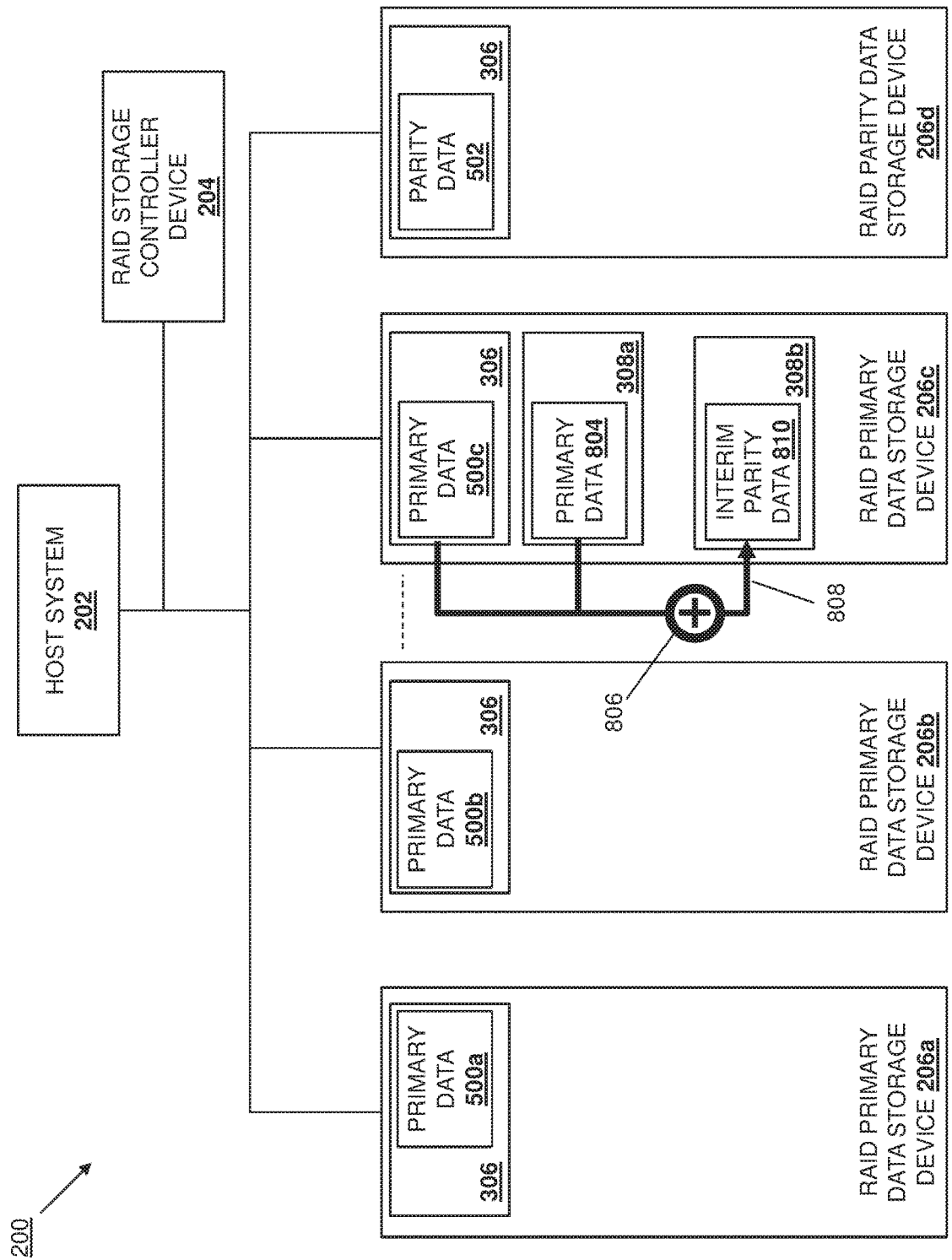
FIG. 8C is a schematic view illustrating an embodiment of the RAID storage system of FIG. 2 operating during the method of FIG. 4.
Figure 8D:
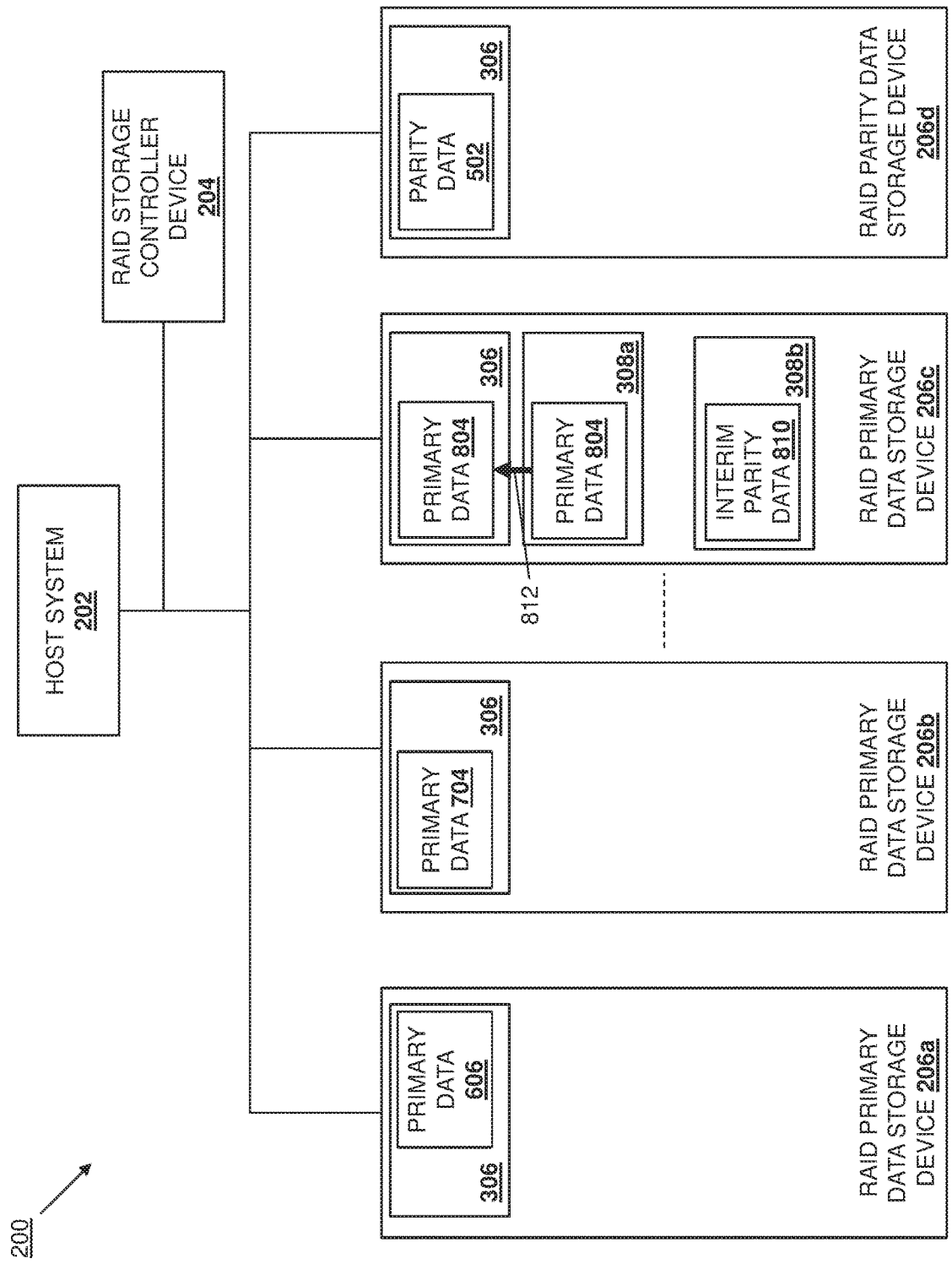
FIG. 8D is a schematic view illustrating an embodiment of the RAID storage system of FIG. 2 operating during the method of FIG. 4.

With reference to FIG. 8C, in an embodiment of block 406 and based on the command 800 (which is a multi-operation command as described above in this embodiment), the RAID storage engine 304 in the RAID primary data storage device 206c/300 may operate to perform an XOR operation 806 using the primary data 500c in its storage subsystem 306 and the primary data 804 in its first buffer subsystem 308a in order to produce interim parity data 810, and then perform an overwrite operation 808 to write that interim parity data 810 to its second buffer subsystem 308b (e.g., a CMB). Further still, FIG. 8D illustrates how the RAID storage engine 304 in the RAID parity data storage device 206c may perform an overwrite operation 812 to overwrite the primary data 500c in its storage subsystem 306 with the primary data 804 in its first buffer subsystem 308a based on the command 800 (which is a multi-operation command as described above in this embodiment), thus updating that primary data stored by the RAID primary data storage device 206c. As will be appreciated by one of skill in the art in possession of the present disclosure, any of the commands 602, 700, and 800 may be executed by the respective RAID primary data storage devices 206a, 206b and 206c in parallel, simultaneously, and/or at substantially the same time (as illustrated by the updated primary data 606, 704, and 804 in each of the RAID primary data storage devices 206a, 206b and 206c in FIGS. 6D, 6E, 7D, 7E, 8D, and 8E), although sequential execution of any of the commands 602, 700, and 800 by the respective RAID primary data storage devices 206a, 206b, and 206c will fall within the scope of the present disclosure as well.

Figure 6E:
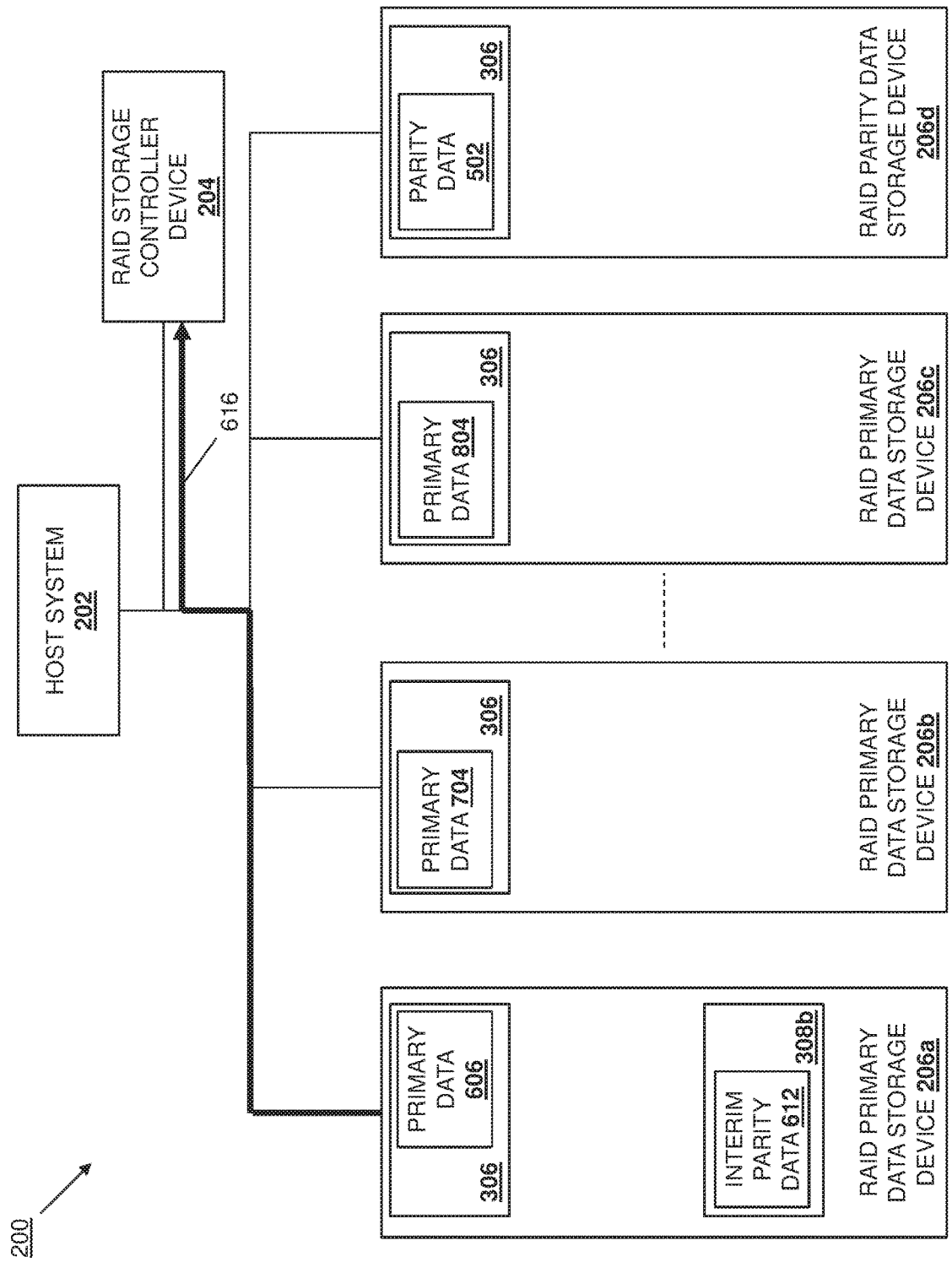
FIG. 6E is a schematic view illustrating an embodiment of the RAID storage system of FIG. 2 operating during the method of FIG. 4.

With reference to FIG. 6E, following completion of the operations associated with the command 602 (e.g., multiple operations associated with a multi-operation command as discussed above, following each operation associated with respective commands, etc.) the RAID storage engine 304 in the RAID primary data storage device 206a/300 may generate and transmit a completion message 616 to the RAID storage controller device 204. For example, the RAID storage engine 304 in the RAID primary data storage device 206a/300 may generate the completion message 616 and provide that completion message in a completion queue in its communication system 310, and then generate an interrupt to the RAID storage controller device 204 that causes the RAID storage controller device 204 to access that completion queue and retrieve the completion message. However, while a specific technique for transmitting the completion message is described, one of skill in the art in possession of the present disclosure will recognize that completion messages may be transmitted using a variety of other techniques while remaining within the scope of the present disclosure.

Similarly, with reference to FIG. 7E, following completion of the operations associated with the command 700 (e.g., multiple operations associated with a multi-operation command as discussed above, following each operation associated with respective commands, etc.) the RAID storage engine 304 in the RAID primary data storage device 206b/300 may generate and transmit a completion message 714 to the RAID storage controller device 204. For example, the RAID storage engine 304 in the RAID primary data storage device 206b/300 may generate the completion message 714 and provide that completion message in a completion queue in its communication system 310, and then generate an interrupt to the RAID storage controller device 204 that causes the RAID storage controller device 204 to access that completion queue and retrieve the completion message. However, while a specific technique for transmitting the completion message is described, one of skill in the art in possession of the present disclosure will recognize that completion messages may be transmitted using a variety of other techniques while remaining within the scope of the present disclosure.

Figure 8E:
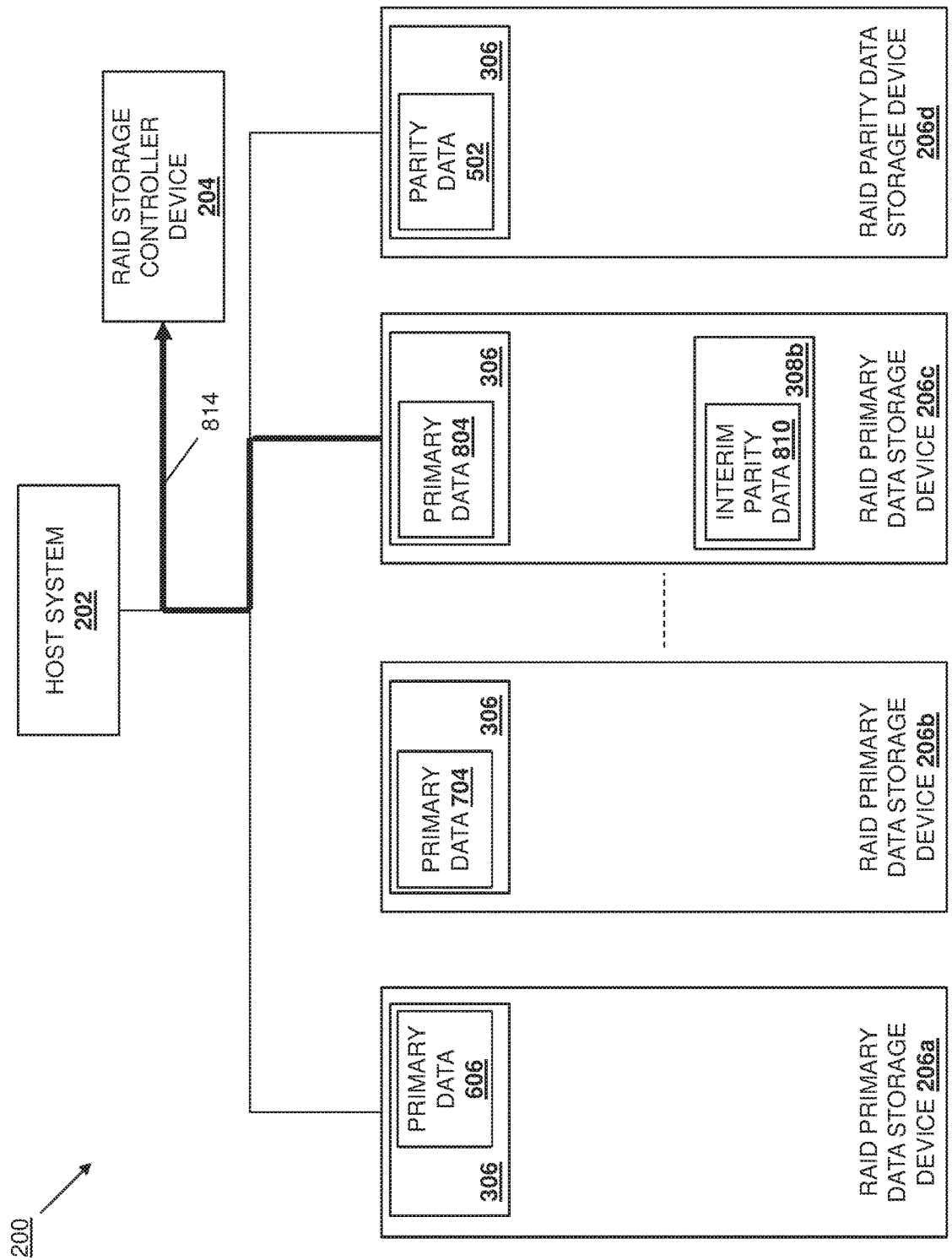
FIG. 8E is a schematic view illustrating an embodiment of the RAID storage system of FIG. 2 operating during the method of FIG. 4.

Similarly, with reference to FIG. 8E, following completion of the operations associated with the command 800 (e.g., multiple operations associated with a multi-operation command as discussed above, following each operation associated with respective commands, etc.) the RAID storage engine 304 in the RAID primary data storage device 206c/300 may generate and transmit a completion message 814 to the RAID storage controller device 204. For example, the RAID storage engine 304 in the RAID primary data storage device 206c/300 may generate the completion message 814 and provide that completion message in a completion queue in its communication system 310, and then generate an interrupt to the RAID storage controller device 204 that causes the RAID storage controller device 204 to access that completion queue and retrieve the completion message. However, while a specific technique for transmitting the completion message is described, one of skill in the art in possession of the present disclosure will recognize that completion messages may be transmitted using a variety of other techniques while remaining within the scope of the present disclosure. Furthermore, the RAID storage controller device 204 may wait to receive completion messages from each RAID primary data storage device experiencing an update prior to proceeding with the method 400. As discussed above, the XOR operations, overwrite operations, and completion messages provided in the example above describes a full stripe write, and one of skill in the art in possession of the present disclosure will recognize that some of those XOR operations, overwrite operations, and completion messages may not be performed (by any particular RAID primary data storage device not experiencing a data update) in the event a partial stripe write is being performed.

Figure 9A:
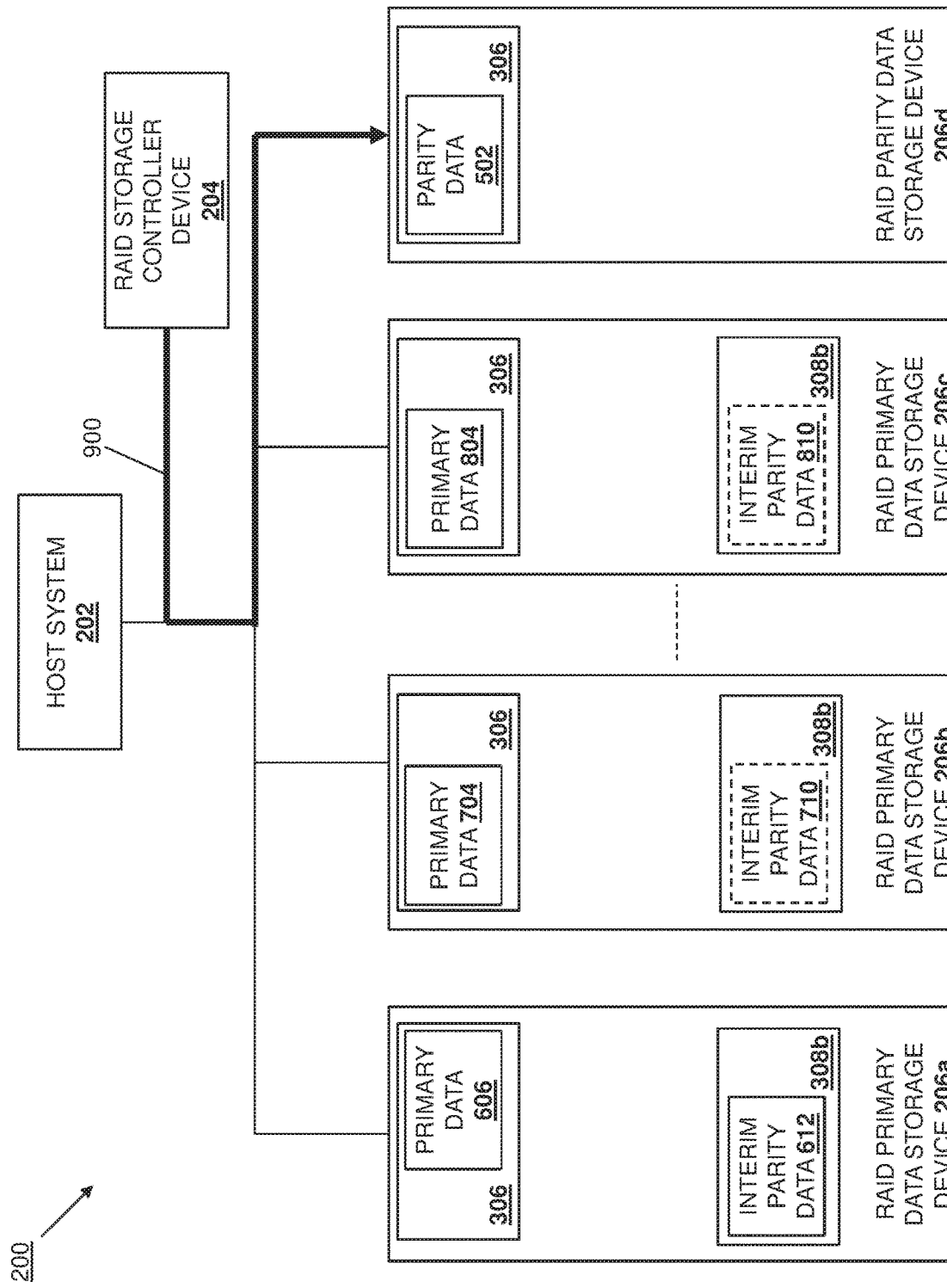
FIG. 9A is a schematic view illustrating an embodiment of the storage of data in a RAID storage system.

The method 400 then proceeds to block 408 where the RAID parity data storage device receives a command from the RAID storage controller device. In an embodiment, at block 408, the RAID storage controller device 204 may generate and transmit a command to a RAID parity data storage device. For example, and as discussed above, the RAID storage controller device 204 may determine that completion messages from each RAID primary data storage device experiencing an update have been received as discussed above and, in response, at block 408 the RAID storage controller device 204 may generate a command 900 and transmit the command 900 to the RAID parity data storage device 206d, as illustrated in FIG. 9A.

Similarly as discussed above, the command 900 may be a multi-operation command like those described in U.S. patent application Ser. No. 16/585,296, filed on Sep. 27, 2019. For example, the command 900 may be an NVMe WRITE PARITY multi-operation command that is configured to cause the RAID parity data storage device 206d to perform the multiple operations described below. However, while described as providing a multi-operation command at block 408, one of skill in the art in possession of the present disclosure will recognize that the multiple operations performed by the RAID parity data storage device 206d discussed below may be performed in response to respective commands transmitted by the RAID storage controller device 204 while remaining within the scope of the present disclosure as well. In a specific example, the transmission of the command 900 may include the RAID storage controller device 204 providing the command 900 in a submission queue that is included in the communication system 310 in the RAID parity data storage device 206d/300, and then ringing a doorbell for the RAID parity data storage device 206d/300. However, one of skill in the art in possession of the present disclosure will recognize that the command 900 may be provided to the RAID parity data storage device 206d in a variety of manners that will fall within the scope of the present disclosure as well.

As such, in some examples the RAID storage engine 304 in the RAID parity data storage device 206d/300 may respond to the ringing of its doorbell by accessing the command 900 in the submission queue in its communication system 310. In embodiments in which the command 900 is a multi-operation command, the RAID storage engine 304 in the RAID parity data storage device 206d/300 may identify the multiple operations instructed by that command 900 (as described in U.S. patent application Ser. No. 16/585,296, filed on Sep. 27, 2019.)

The method 400 then proceeds to block 410 where the RAID parity data storage device retrieves respective interim parity data from respective RAID primary data storage devices. With reference to FIGS. 9A-9E, the interim parity data 612 discussed above is illustrated in solid lines, while the interim parity data 710 and 810 are illustrated in dashed lines, which is intended to indicate how at least some of the interim parity data discussed above may not be produced by a RAID primary data storage device that does not experience a primary data update during the method 400 (i.e., in the partial stripe write situations discussed above). As such, FIGS. 9A-9E indicate that the RAID primary data storage device 206a has experienced a primary data update and produced the interim parity data 612, while the RAID primary data storage devices 206b and 206c may or may not have experienced a primary data update and thus may or may not have produced their associated interim parity data 710 and 810. However, one of skill in the art in possession of the present disclosure will appreciate that any subset of the RAID primary data storage devices 206a-206c may experience a primary data update and may produce corresponding interim parity data while remaining within the scope of the present disclosure as well.

Figure 9B:
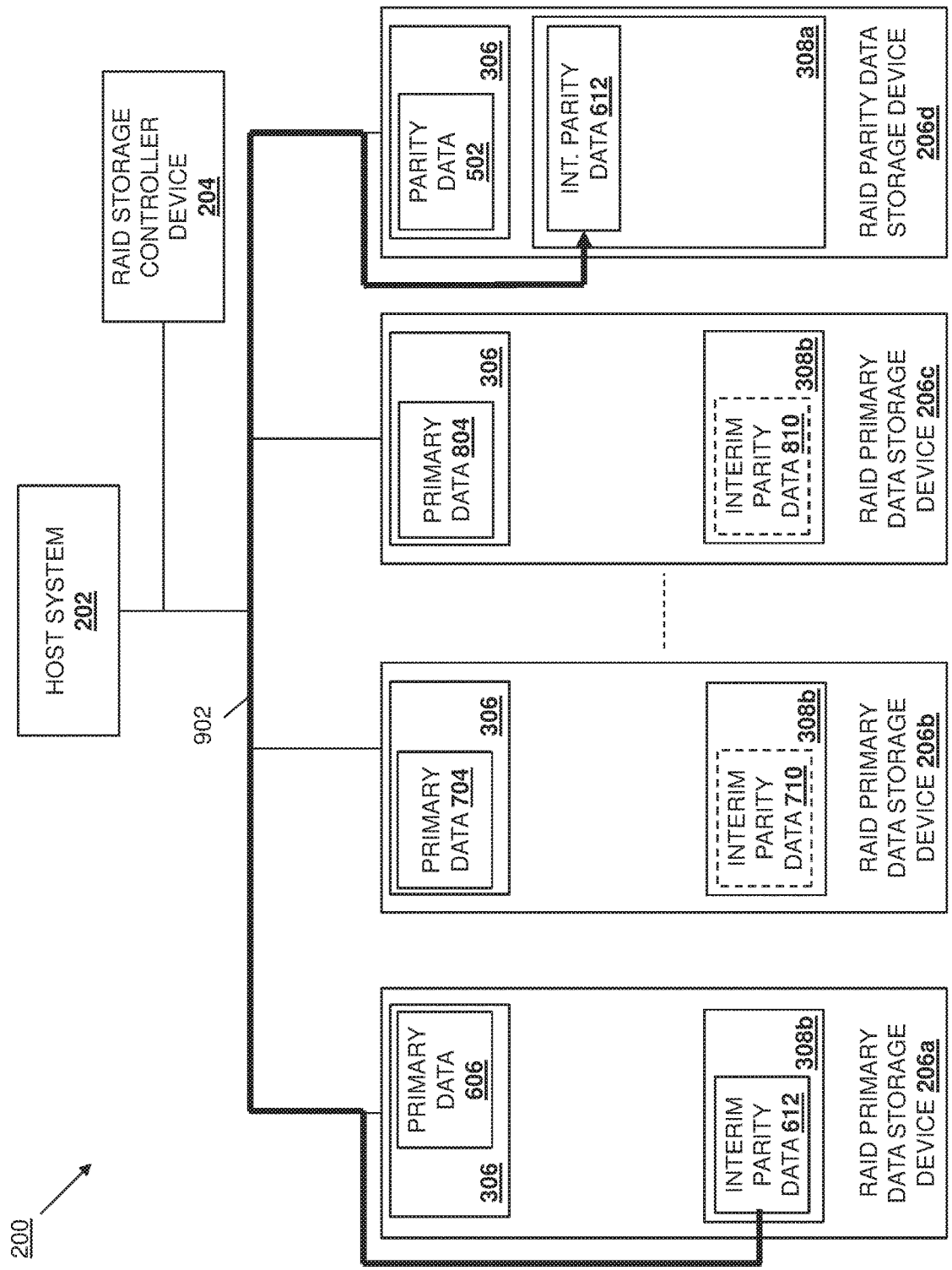
FIG. 9B is a schematic view illustrating an embodiment of the RAID storage system of FIG. 9A during the method of FIG. 4.
Figure 9C:
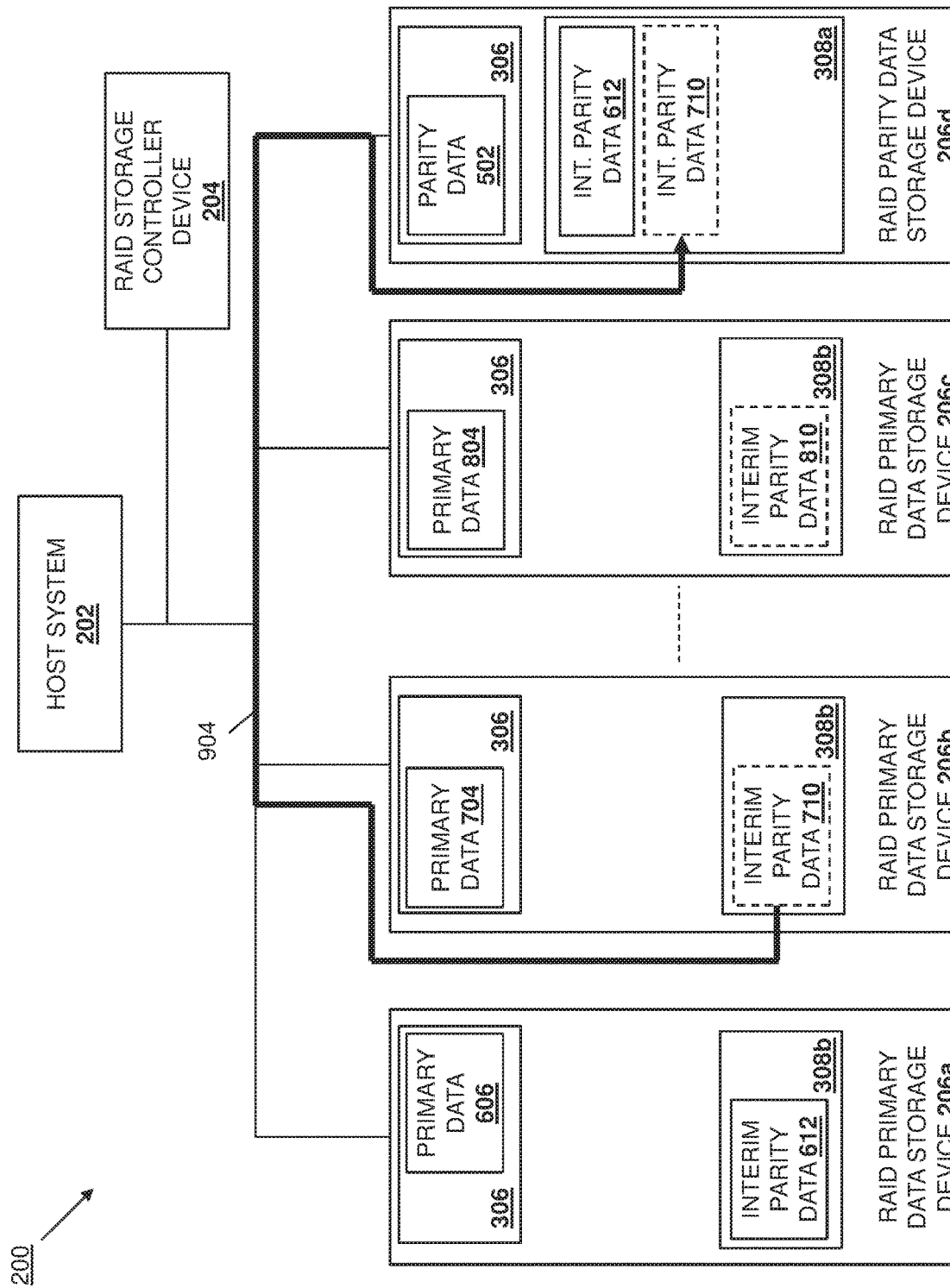
FIG. 9C is a schematic view illustrating an embodiment of the RAID storage system of FIG. 2 operating during the method of FIG. 4.

With reference to FIG. 9B, in an embodiment of block 410 and based on the command 900 (which is a multi-operation command as described above in this embodiment), the RAID storage engine 304 in the RAID parity data storage device 206d/300 may operate to perform a DMA operation 902 to retrieve the interim parity data 612 from the second buffer subsystem 308b in the RAID primary data storage device 206a, and write that interim parity data 612 to its first buffer subsystem 308a (e.g., in a device buffer in the RAID parity data storage device 206d as described in the example above). With reference to FIG. 9C, in an embodiment of block 410 and based on the command 900 (which is a multi-operation command as described above in this embodiment), the RAID storage engine 304 in the RAID parity data storage device 206d/300 may operate to perform a DMA operation 904 to retrieve the interim parity data 710 from the second buffer subsystem 308b in the RAID primary data storage device 206b, and write that interim parity data 710 to its first buffer subsystem 308a (e.g., in a device buffer in the RAID parity data storage device 206d as described in the example above) in situations in which the RAID primary data storage device 206b has experienced a primary data update and produced interim parity data.

Figure 9D:
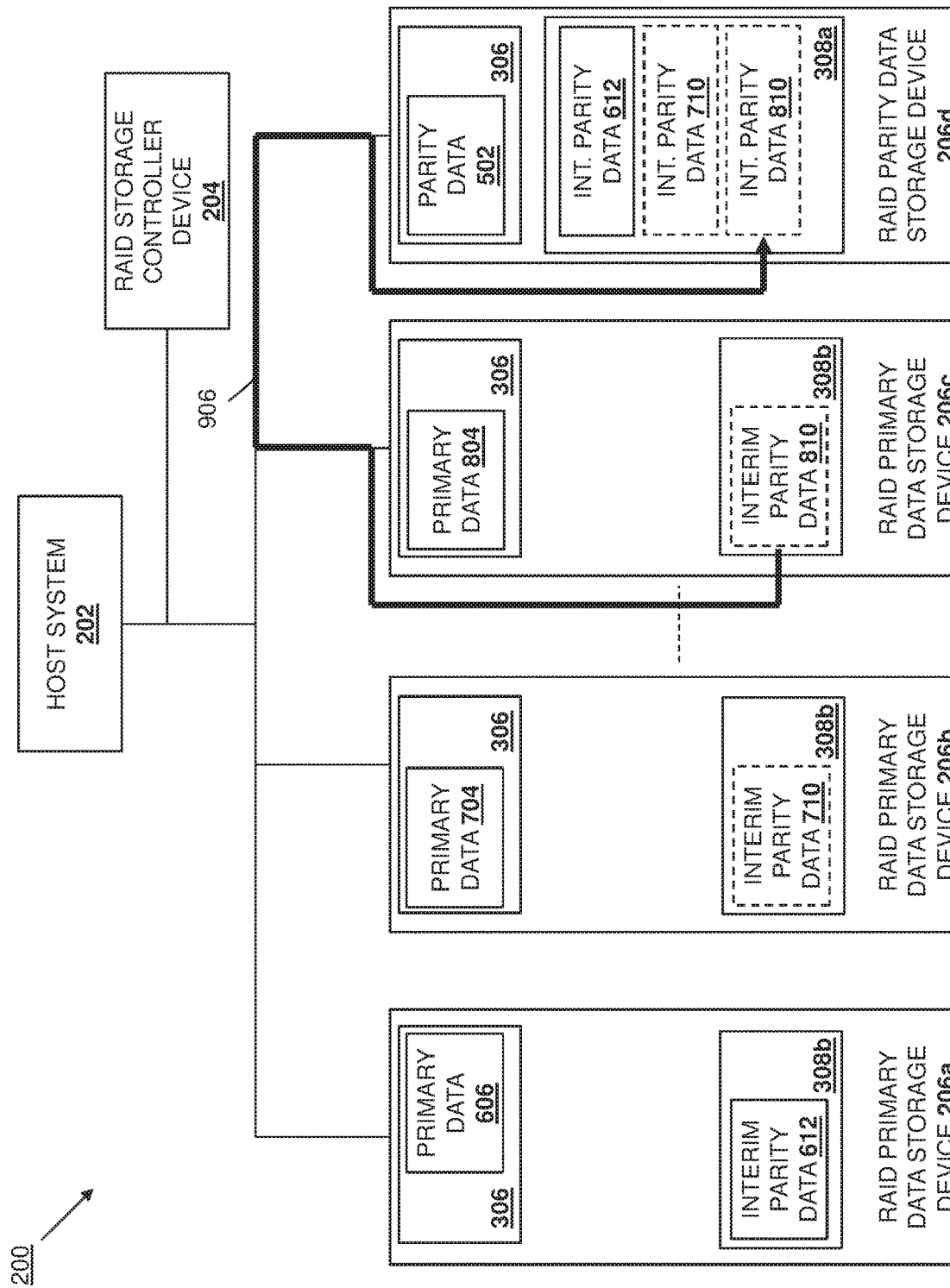
FIG. 9D is a schematic view illustrating an embodiment of the RAID storage system of FIG. 2 operating during the method of FIG. 4.

With reference to FIG. 9D, in an embodiment of block 410 and based on the command 900 (which is a multi-operation command as described above in this embodiment), the RAID storage engine 304 in the RAID parity data storage device 206d/300 may operate to perform a DMA operation 906 to retrieve the interim parity data 810 from the second buffer subsystem 308b in the RAID primary data storage device 206c, and write that interim parity data 810 to its first buffer subsystem 308a (e.g., in a device buffer in the RAID primary data storage device 206c as described in the example above) in situations in which the RAID primary data storage device 206c has experienced a primary data update and produced interim parity data. As will be appreciated by one of skill in the art in possession of the present disclosure, FIGS. 9B-9D illustrate interim parity data "pull" operations performed by the RAID parity data storage device 206d. However, those "pull" operations may be replaced by "push" operations (e.g., where the RAID primary data storage devices 206a, 206b, and/or 206c perform DMA operations to write their respective interim parity data to the first buffer subsystem 308a (e.g., a device buffer in the RAID parity data storage device 206d as described in the example above)) while remaining within the scope of the present disclosure as well.

Figure 9E:
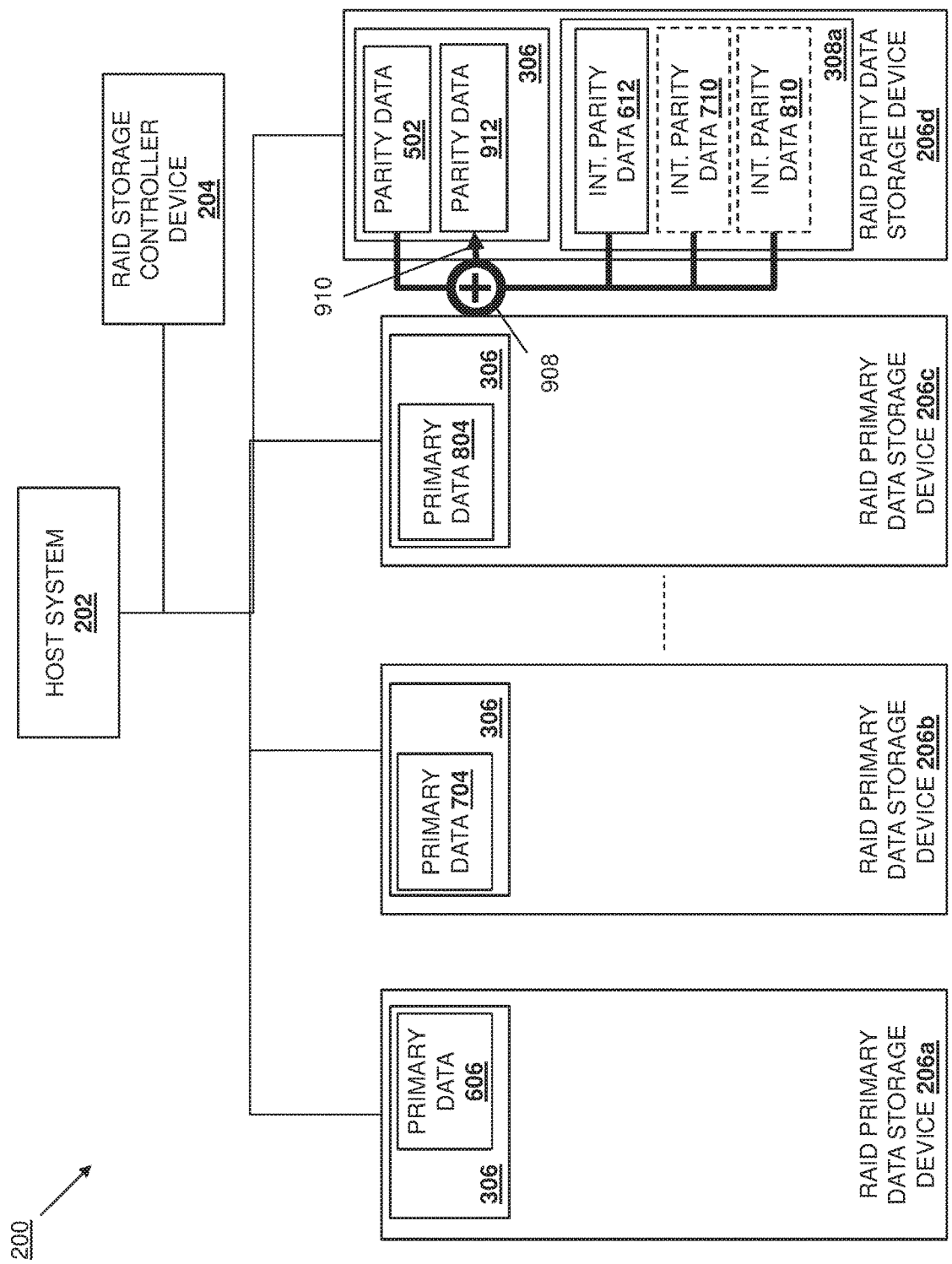
FIG. 9E is a schematic view illustrating an embodiment of the RAID storage system of FIG. 2 operating during the method of FIG. 4.

The method 400 then proceeds to block 412 where the RAID parity data storage device performs an XOR operation on current parity data and the interim parity data to produce updated parity data, and overwrites the current parity data with the updated parity data. With reference to FIG. 9E, in an embodiment of block 412 and based on the command 900 (which is a multi-operation command as described above in this embodiment), the RAID storage engine 304 in the RAID parity data storage device 206d/300 may operate to perform an XOR operation 908 using the parity data 502 in its storage subsystem 306 and any of the interim parity data 612, 710, and/or 810 written to its first buffer subsystem 308a in order to produce parity data 912, and then perform an overwrite operation 910 to overwrite the parity data 502 with the parity data 912 in its storage subsystem 306 (as illustrated by the replacement of parity data 502 from FIG. 9E with parity data 912 in FIG. 8F.) As will be appreciated by one of skill in the art in possession of the present disclosure, the XOR operation 908 performed using the parity data 502 and the interim parity data stored in the first buffer subsystem 308a will only include interim parity data provided by RAID primary data storage devices experiencing a primary data update as discussed above.

Figure 9F:
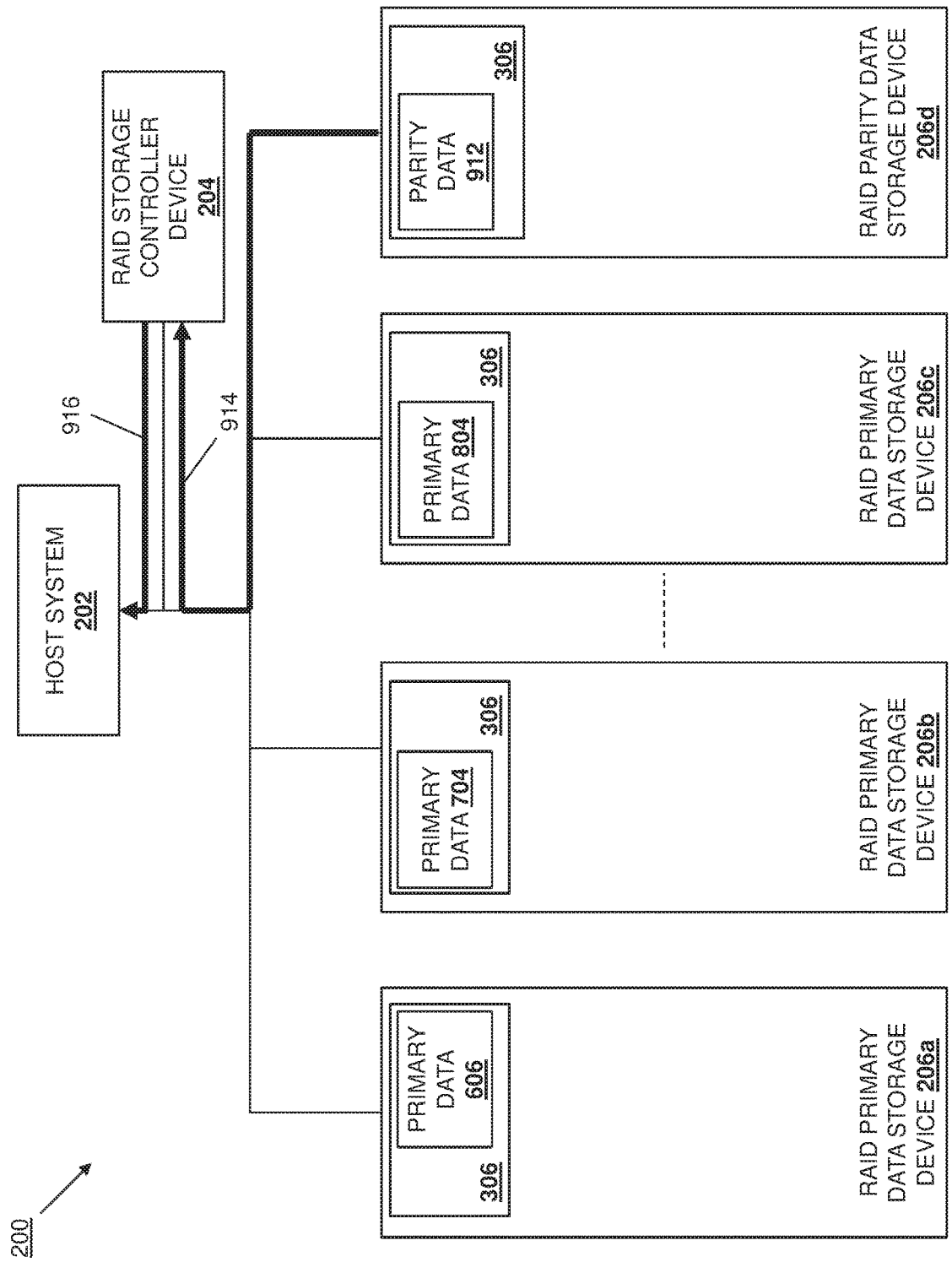
FIG. 9F is a schematic view illustrating an embodiment of the RAID storage system of FIG. 2 operating during the method of FIG. 4.

With reference to FIG. 9F, following completion of the operations associated with the command 900 (e.g., multiple operations associated with a multi-operation command as discussed above, following each operation associated with respective commands, etc.) the RAID storage engine 304 in the RAID parity data storage device 206d/300 may generate and transmit a completion message 914 to the RAID storage controller device 204. For example, the RAID storage engine 304 in the RAID parity data storage device 206d/300 may generate the completion message 914 and provide that completion message in a completion queue in its communication system 310, and then generate an interrupt to the RAID storage controller device 204 that causes the RAID storage controller device 204 to access that completion queue and retrieve the completion message. However, while a specific technique for transmitting the completion message is described, one of skill in the art in possession of the present disclosure will recognize that completion messages may be transmitted using a variety of other techniques while remaining within the scope of the present disclosure. As also illustrated in FIG. 9F, following the receiving of the completion message 914, the RAID storage controller device 204 may generate and transmit a completion message 916 to the host system 202 in order to indicate to the host system that the write command 600 has been completed.

Thus, systems and methods have been described that provide for the performance of data update operations to store and backup data in a RAID storage system with the assistance of the RAID storage devices that store that data. As will be appreciated by one of skill in the art in possession of the present disclosure, the number of data transfers involved in a data update according to the method 400 will be 2n, where n is the number of RAID storage devices experiencing a data update. For example, if only the RAID primary data storage device 206a is having its primary data updated, then the number of data transfers will be (2×1 RAID storage device=) 2 data transfers, which include the transfer of the updated primary data from the host system 202 to the RAID primary data storage device 206a, and the transfer of the interim parity data from the RAID primary data storage device 206a to the RAID parity data storage device 206d. Similarly, if the RAID primary data storage devices 206a and 206b are having their primary data updated, then the number of data transfers will be (2×2 RAID storage devices=) 4 data transfers, which include the transfer of the updated primary data from the host system 202 to the RAID primary data storage device 206a, and the transfer of the interim parity data from the RAID primary data storage device 206a to the RAID parity data storage device 206d, the transfer of the updated primary data from the host system 202 to the RAID primary data storage device 206b, and the transfer of the interim parity data from the RAID primary data storage device 206b to the RAID parity data storage device 206d. One of skill in the art in possession of the present disclosure will recognize that the 2n number of data transfers will hold for any number of RAID storage devices experiencing a data update (e.g., up to a full stripe data write that updates the primary data on all of the RAID primary data storage devices 206a-206c.)

Figure 10:
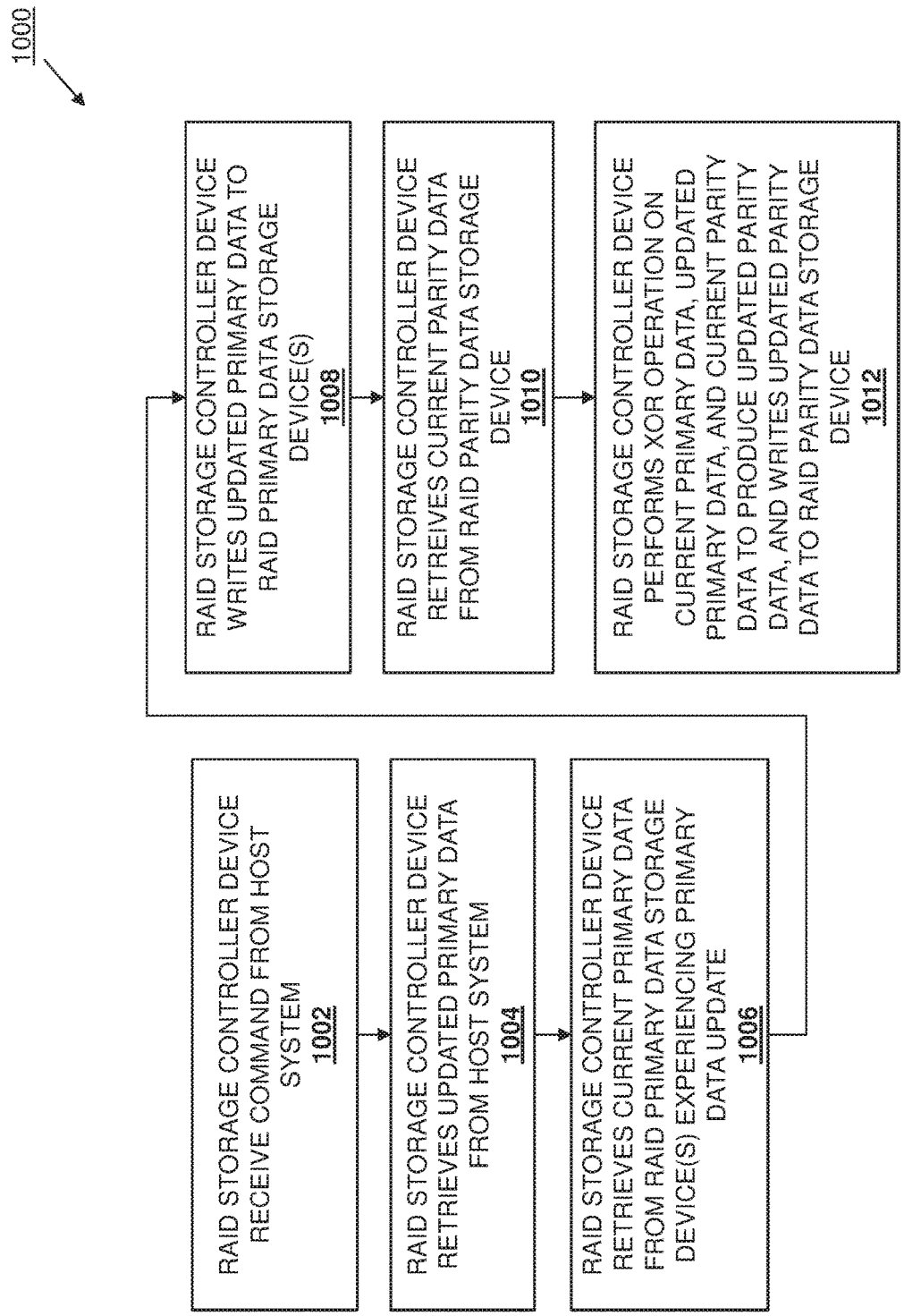
FIG. 10 is a flow chart illustrating an embodiment of a method for performing partial stripe data update operations using RAID storage controller device.

Referring now to FIG. 10, an embodiment of a method 1000 for performing partial stripe data update operations using a RAID storage controller device is illustrated. As discussed below, embodiments of the systems and methods of the present disclosure may provide for the performance of data update operations by a RAID storage controller device. For example, the RAID storage controller device may retrieve updated primary data from a host system, and current primary data from each RAID primary data storage device experiencing a primary data update, and then overwrite the current primary data in each RAID primary data storage device experiencing a primary data update with its respective updated primary data. The RAID storage controller device may then retrieve current parity data from a RAID parity data storage device, and perform an XOR operations on the current primary data, the updated primary data, and the current parity data in order to produce updated parity data, and overwrite the current parity data in the RAID parity data storage device with the updated parity date. As such, an option to perform data update operations by the RAID storage controller device exists. However, one of skill in the art in possession of the present disclosure will recognize that the performance of such partial stripe write operations by the RAID storage controller device is associated with the scaling issues discussed above, while the number of data transfers associated with such RAID storage controller device data update techniques is 2n+3, where n is the number of RAID primary data storage devices experiencing a primary data update. Thus, as discussed below, the RAID storage controller device data update technique discussed below is not utilized in many embodiments of the present disclosure, but is described briefly below for comparison to the more efficient data update techniques described herein.

Figure 11:
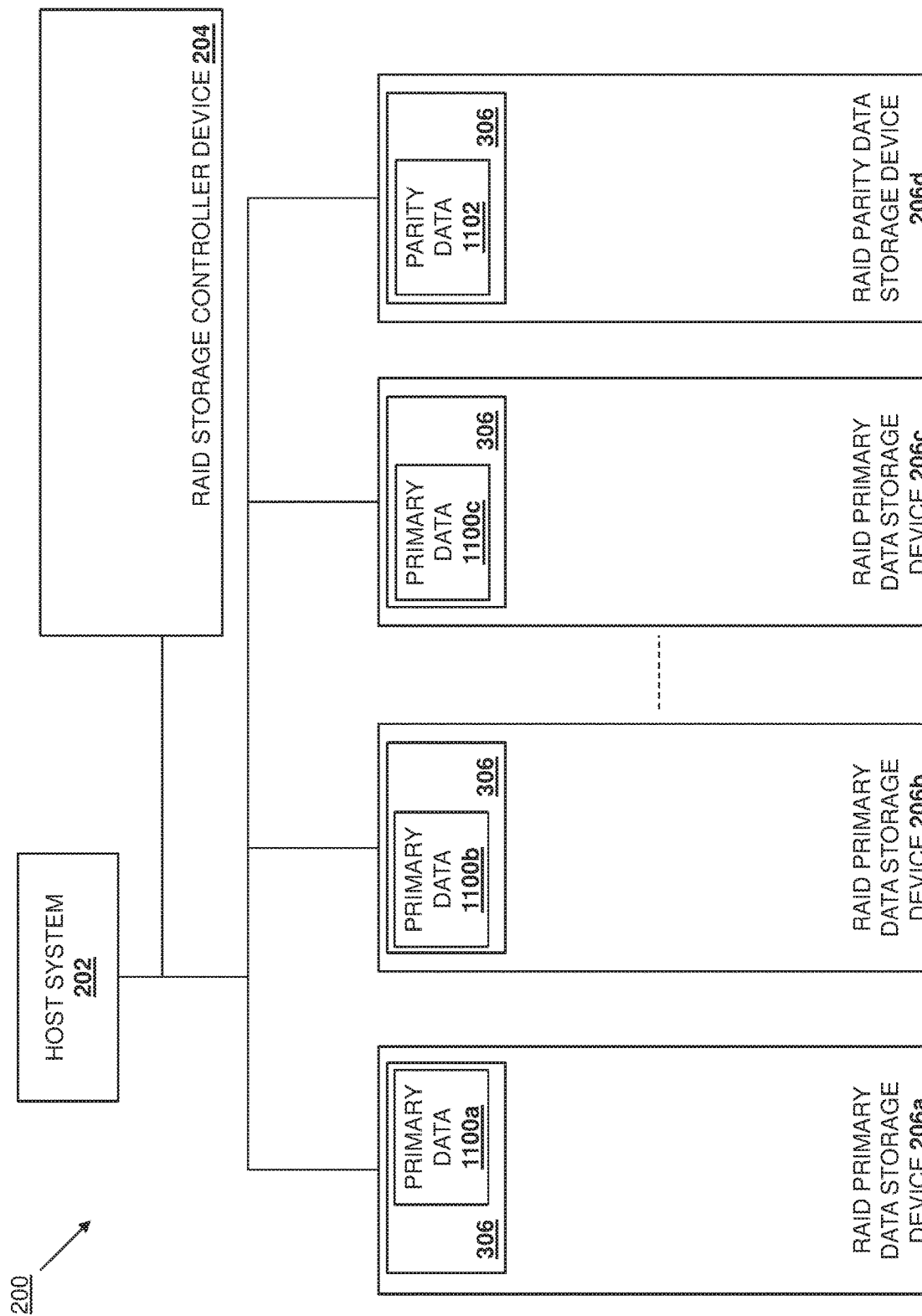
FIG. 11 is a schematic view illustrating an embodiment of the RAID storage system of FIG. 2 operating during the method of FIG. 10.

With reference to FIG. 11, the RAID storage system 200 is illustrated with the RAID primary data storage device 206a storing primary data 1100a in its storage subsystem 306, the RAID primary data storage device 206b storing primary data 1100b in its storage subsystem 306, and the RAID primary data storage device 206c storing primary data 1100c in its storage subsystem 306. While only three RAID primary data storage devices are illustrated and described in the examples provided below, one of skill in the art in possession of the present disclosure will recognize that any number of RAID primary data storage devices may store primary data while remaining within the scope of the present disclosure as well. In addition, the RAID storage system 200 is also illustrated with the RAID parity data storage device 206d storing parity data 1102 in its storage subsystem 306, and one of skill in the art in possession of the present disclosure will recognize that the parity data 1102 may have been generated via an XOR operation performed on the primary data 1100a-1100c in the RAID primary data storage devices 206a-206c, and allows for the rebuilding of any primary data stored on any one RAID primary data storage device in the event that primary data/RAID primary data storage device becomes unavailable.

Similarly as discussed above, the primary/parity data storage configuration illustrated in FIG. 11 provides primary/parity for a single data strip, and different data strips may have different primary/parity data storage configurations (e.g., in a plurality of RAID storage devices provided in a RAID storage system, a first data stripe may include primary data on first, second, and third RAID storage devices and parity data on a fourth RAID storage device; a second data stripe may include primary data on the second, third, and fourth RAID storage devices and parity data on the first RAID storage device, etc.) Thus, it should be understood that the same RAID storage device may act as both a RAID primary data storage device and a RAID parity data storage device for different data stripes.

Figure 12A:
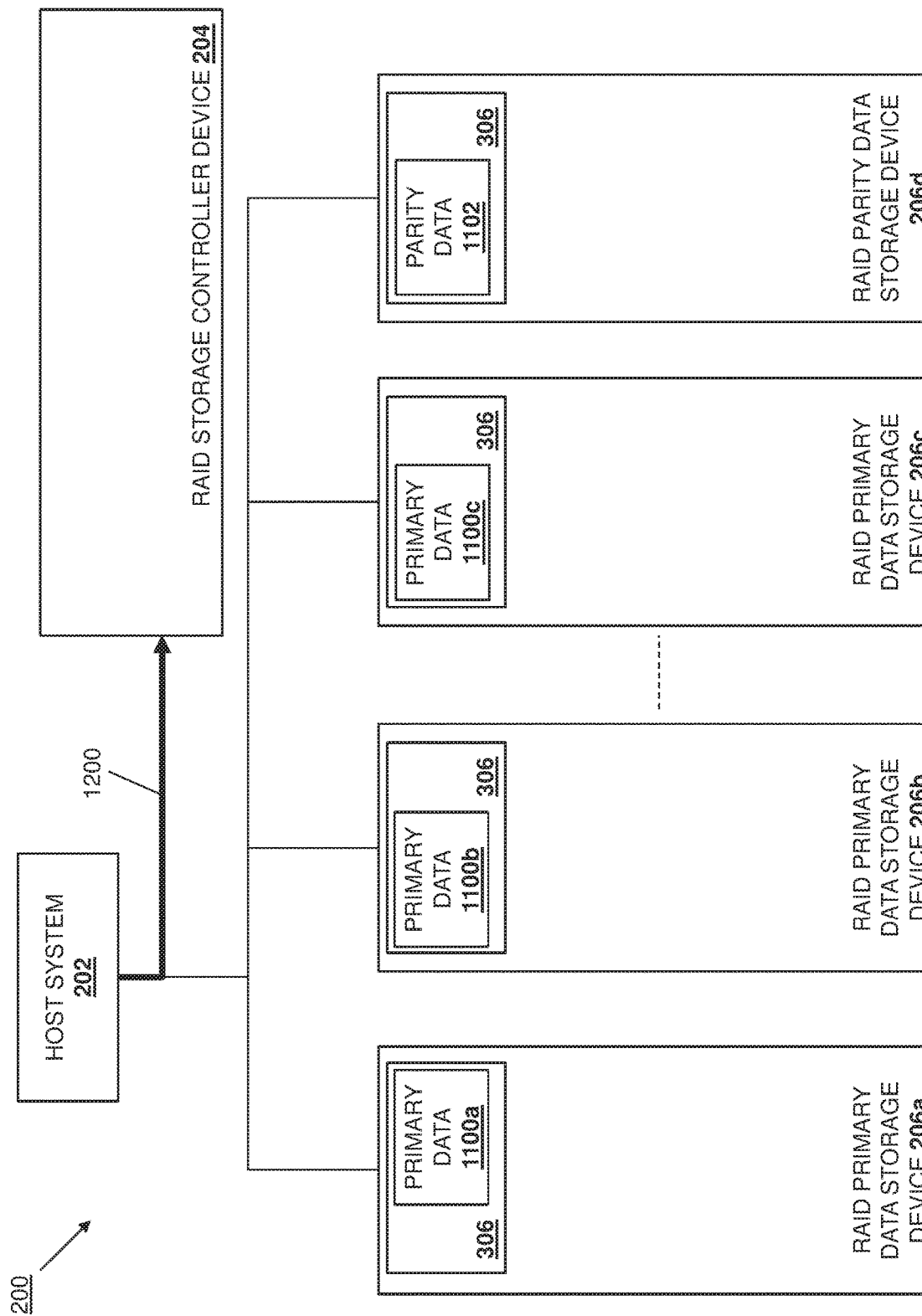
FIG. 12A is a schematic view illustrating an embodiment of the RAID storage system of FIG. 2 operating during the method of FIG. 10.

The method 1000 begins at block 1002 where RAID storage controller device receives a command from a host system. With reference to FIG. 12A, the host system 202 may generate a write command 1200 that instructs the writing of primary data that is located on the host system 200 to the RAID primary data storage devices 206a-206c, and may transmit that write command 1200 to the RAID storage controller device 204. As will be appreciated by one of skill in the art in possession of the present disclosure, the generation and/or transmission of the write command 1200 by the host system 202 to the RAID storage controller device 204 at block 1002 may include a variety of control plane communications between the host system 202 and the RAID storage controller device 204 that have been omitted for clarity of discussion. As such, at block 1002, the RAID storage controller device 204 may receive the write command 1200.

Figure 12B:
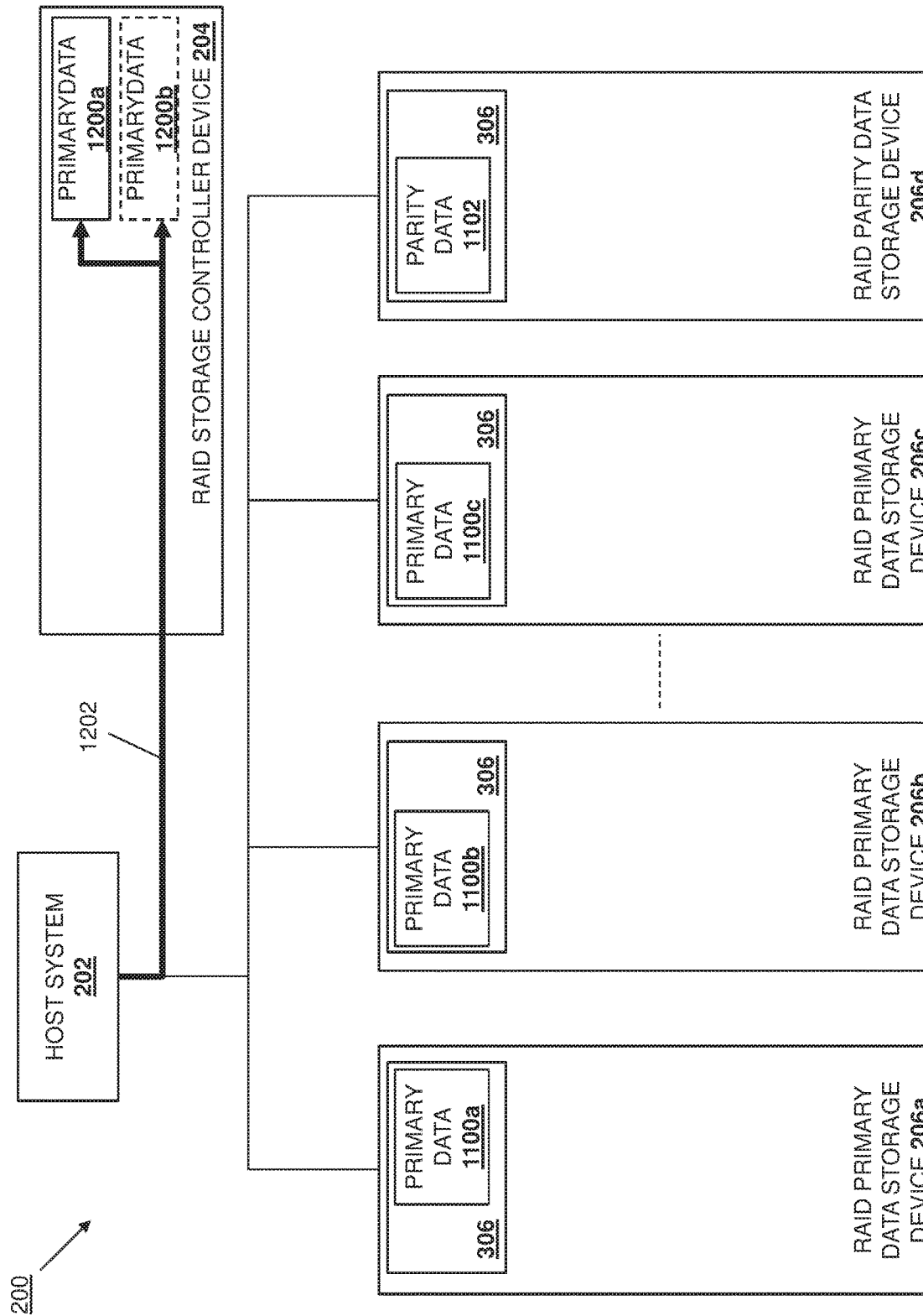
FIG. 12B is a schematic view illustrating an embodiment of the RAID storage system of FIG. 2 operating during the method of FIG. 10.

The method 1000 then proceeds to block 1004 where the RAID storage controller device retrieves updated primary data from the host system. With reference to FIG. 12B, the RAID storage controller device 204 is illustrated performing a DMA operation 1202 that accesses primary data 1200a and up to primary data 1200b that is stored on the host system 202 (e.g., in a memory system or storage system included on the host system 202), and writes that primary data 1200a-1200b to a buffer subsystem in the RAID storage controller device 204 (not illustrated, but similar to the device buffers in the RAID primary data storage devices described in the examples above). As will be appreciated by one of skill in the art in possession of the present disclosure, the primary data 1200a-1200b may be updates to some of the primary data stored in the RAID primary data storage devices 206a-206c (e.g., the primary data 1100a-1100b stored in the storage subsystems 306 in the RAID primary data storage devices 206a and 206b in the examples below), although other primary data writing scenarios will fall within the scope of the present disclosure as well. In the examples below, the partial stripe write is indicated by providing the primary data 1200a in solid lines and providing the primary data 1200b in dashed lines in order to indicate that the partial stripe write need only write updated primary data to one RAID primary data storage device (e.g., the RAID primary data storage device 206a in this example), and may write updated primary data to any number of the RAID primary data storage devices (e.g., the RAID primary data storage device 206b in this example) but not all of the RAID primary data storage devices (which would be a full stripe write, discussed below). As such, one of skill in the art in possession of the present disclosure will appreciate that updated primary data may be retrieved at block 1004 for any subset of the RAID primary storage devices 206a-206c.

Figure 12C:
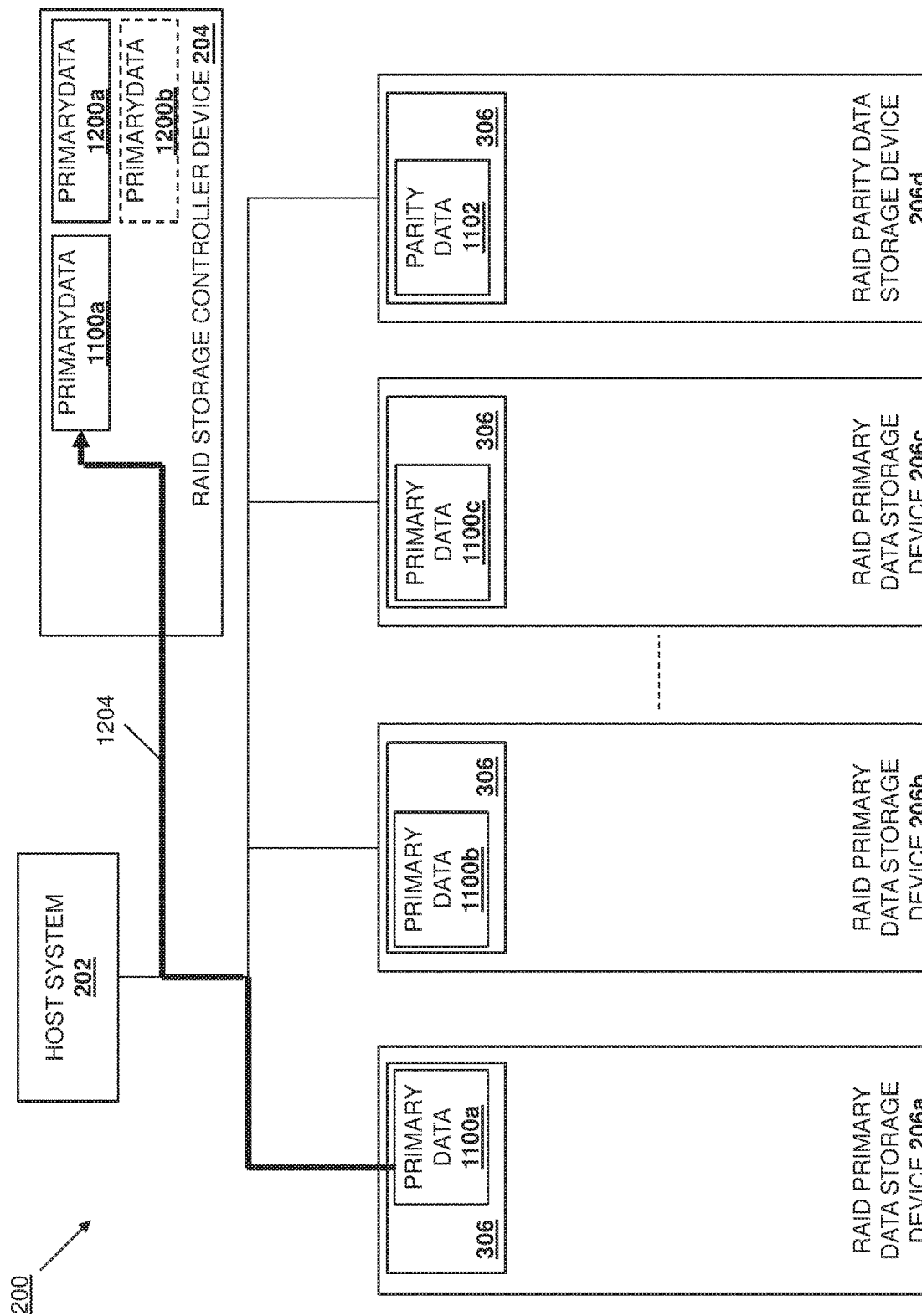
FIG. 12C is a schematic view illustrating an embodiment of the RAID storage system of FIG. 2 operating during the method of FIG. 10.
Figure 12D:
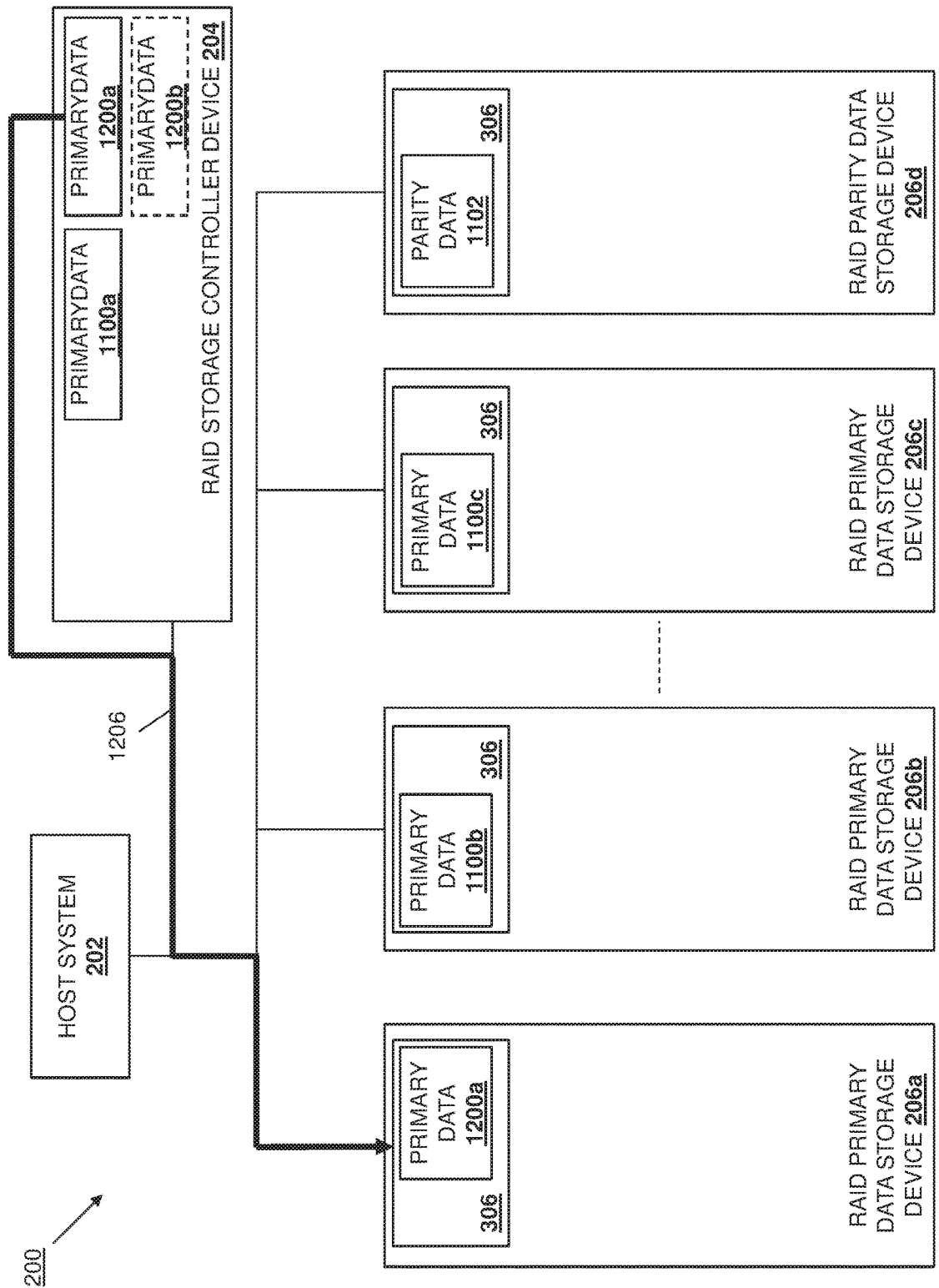
FIG. 12D is a schematic view illustrating an embodiment of the RAID storage system of FIG. 2 operating during the method of FIG. 10.

The method 1000 then proceeds to block 1006 where the RAID storage controller device retrieves current primary data from the RAID primary data storage devices experiencing a primary data update, and then to block 1008 where the RAID storage controller device writes the updated primary data to the RAID primary data storage devices. With reference to FIG. 12C, at block 1006 the RAID storage controller device 204 is illustrated performing a DMA operation 1204 that accesses the storage subsystem 306 in the RAID primary data storage device 206a, and writes the primary data 1100a to the buffer subsystem in the RAID storage controller device 204 (not illustrated, but similar to the device buffers in the RAID primary data storage devices described in the examples above). Furthermore, with reference to FIG. 12D, at block 1008 the RAID storage controller device 204 is illustrated performing a DMA operation 1204 that writes the primary data 1200a to the storage subsystem 306 in the RAID primary data storage device 206a.

Figure 13A:
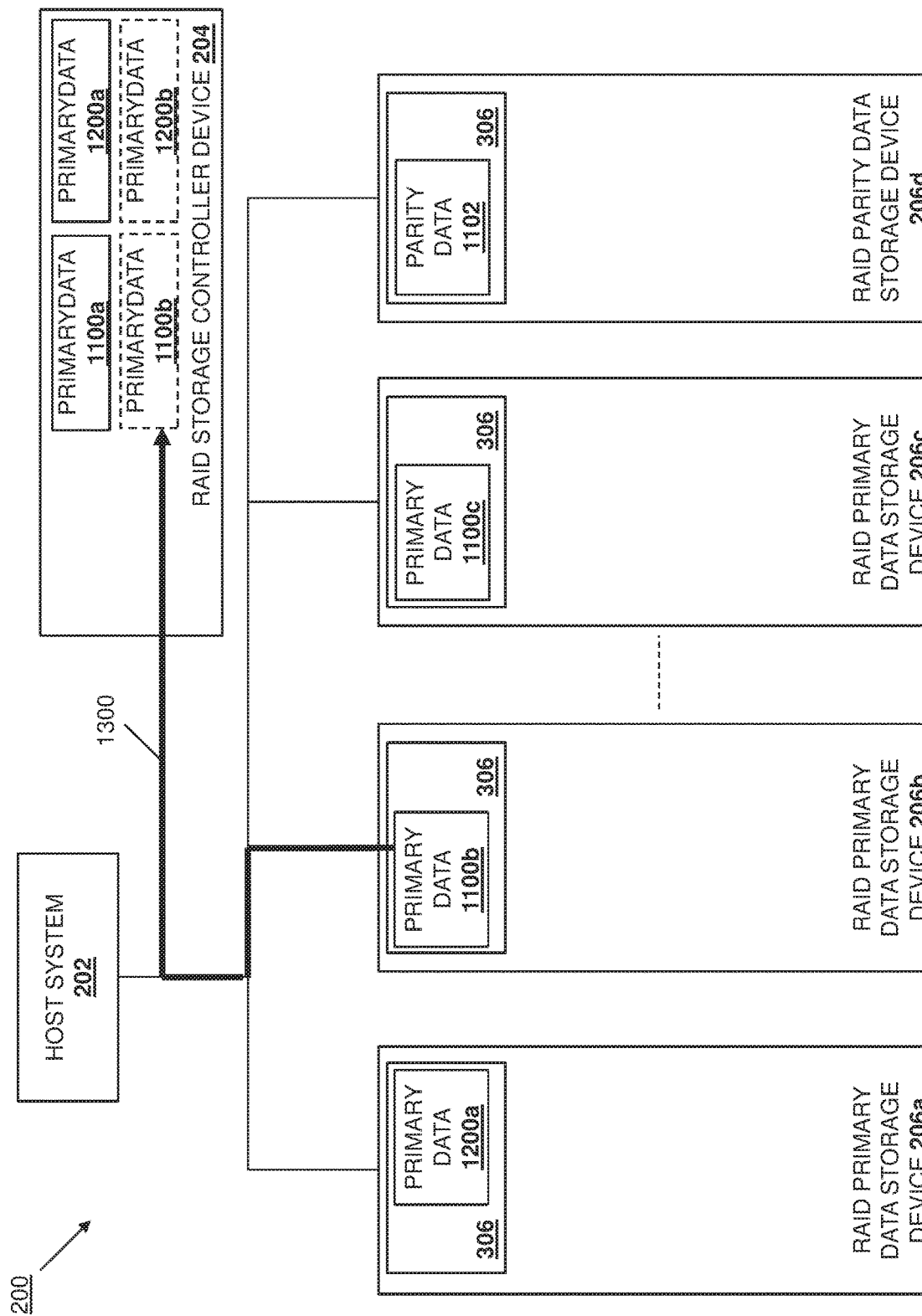
FIG. 13A is a schematic view illustrating an embodiment of the RAID storage system of FIG. 2 operating during the method of FIG. 10.
Figure 13B:
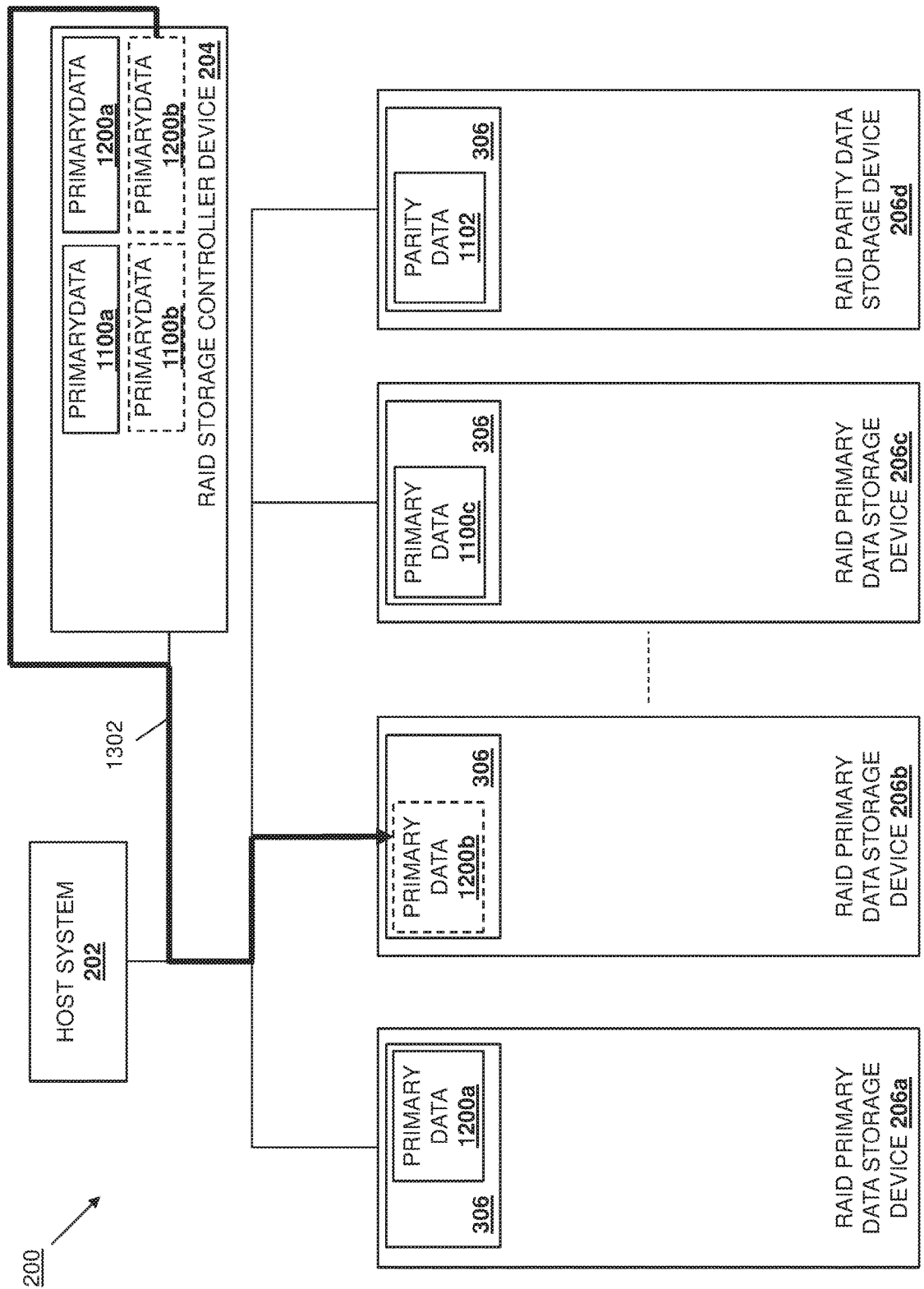
FIG. 13B is a schematic view illustrating an embodiment of the RAID storage system of FIG. 2 operating during the method of FIG. 10.

Similarly, with reference to FIG. 13A, at block 1006 the RAID storage controller device 204 is illustrated performing a DMA operation 1300 that accesses the storage subsystem 306 in the RAID primary data storage device 206b, and writes the primary data 1100b to the buffer subsystem in the RAID storage controller device 204 (not illustrated, but similar to the device buffers in the RAID primary data storage devices described in the examples above). Furthermore, with reference to FIG. 13B, at block 1008 the RAID storage controller device 204 is illustrated performing a DMA operation 1302 that writes the primary data 1200b to the storage subsystem 306 in the RAID primary data storage device 206b. Similarly as discussed above, the partial stripe write is indicated by providing the primary data 1100a in solid lines and providing the primary data 1100b in dashed lines in order to indicate that the partial stripe write need only write updated primary data to one RAID primary data storage device (e.g., the RAID primary data storage device 206a in this example), and may write updated primary data to any number of the RAID primary data storage devices (e.g., the RAID primary data storage device 206b in this example) but not all of the RAID primary data storage devices (which would be a full stripe write, discussed below). As such, one of skill in the art in possession of the present disclosure will appreciate that current primary data may be retrieved at block 1004 for any subset of the RAID primary storage devices 206a-206c that is experiencing a primary data update.

Figure 14A:
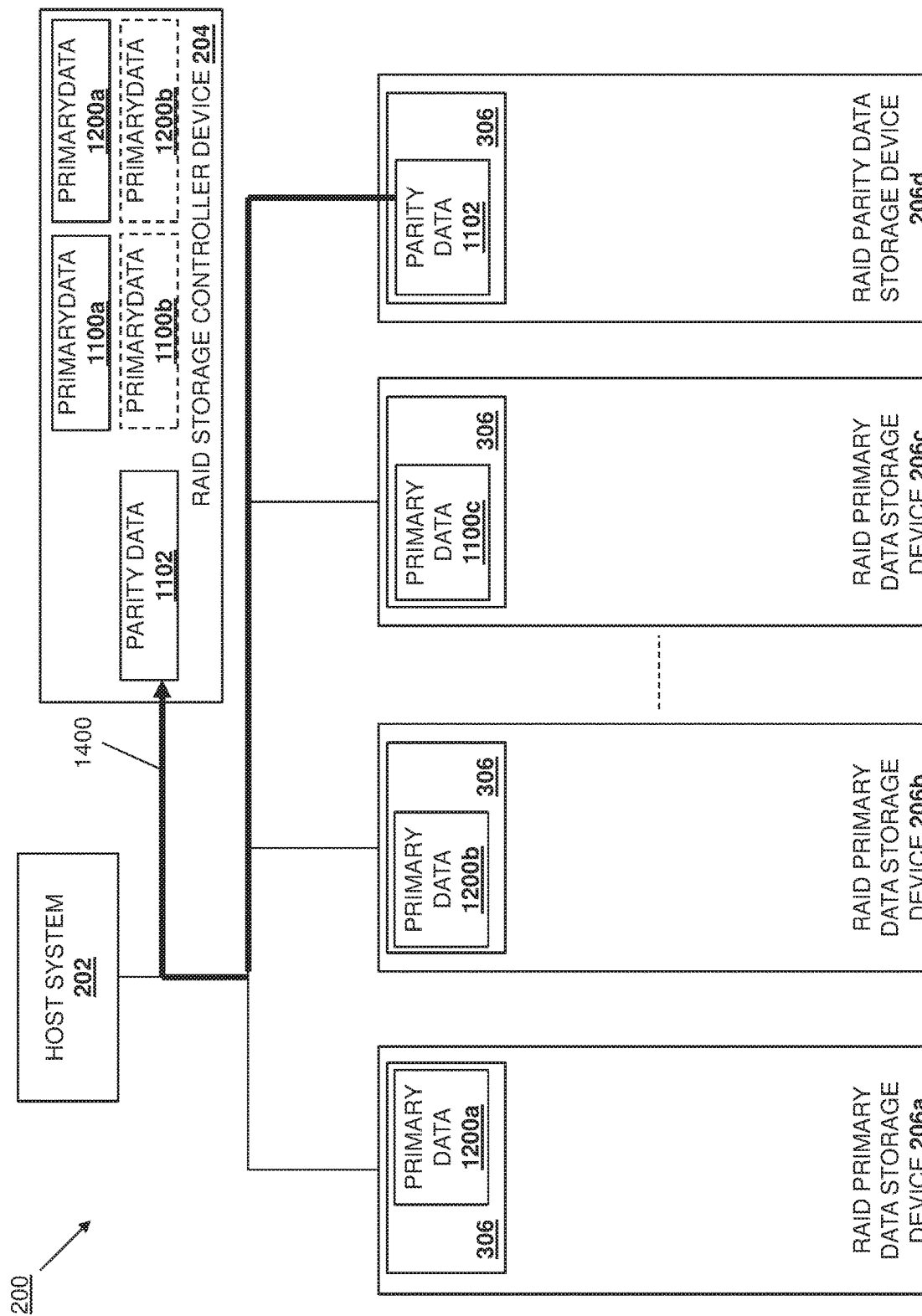
FIG. 14A is a schematic view illustrating an embodiment of the RAID storage system of FIG. 2 operating during the method of FIG. 10.

The method 1000 then proceeds to block 1010 where the RAID storage controller device retrieves current parity data from the RAID parity data storage device. With reference to FIG. 14A, at block 1010 the RAID storage controller device 204 is illustrated performing a DMA operation 1400 that accesses the storage subsystem 306 in the RAID parity data storage device 206d, and writes the parity data 1102 to the buffer subsystem in the RAID storage controller device 204 (not illustrated, but similar to the device buffers in the RAID primary data storage devices described in the examples above).

Figure 14B:
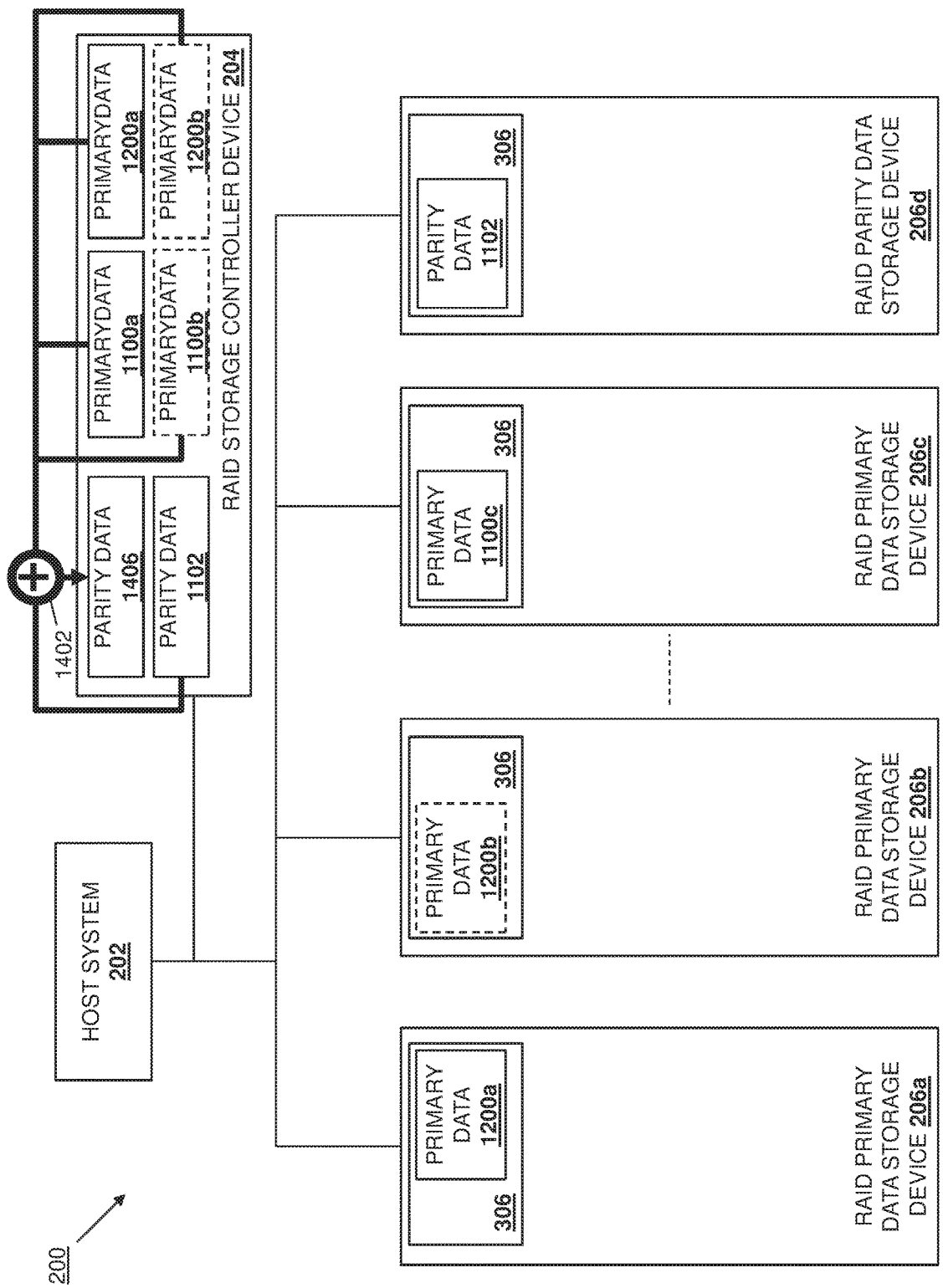
FIG. 14B is a schematic view illustrating an embodiment of the RAID storage system of FIG. 2 operating during the method of FIG. 10.
Figure 14C:
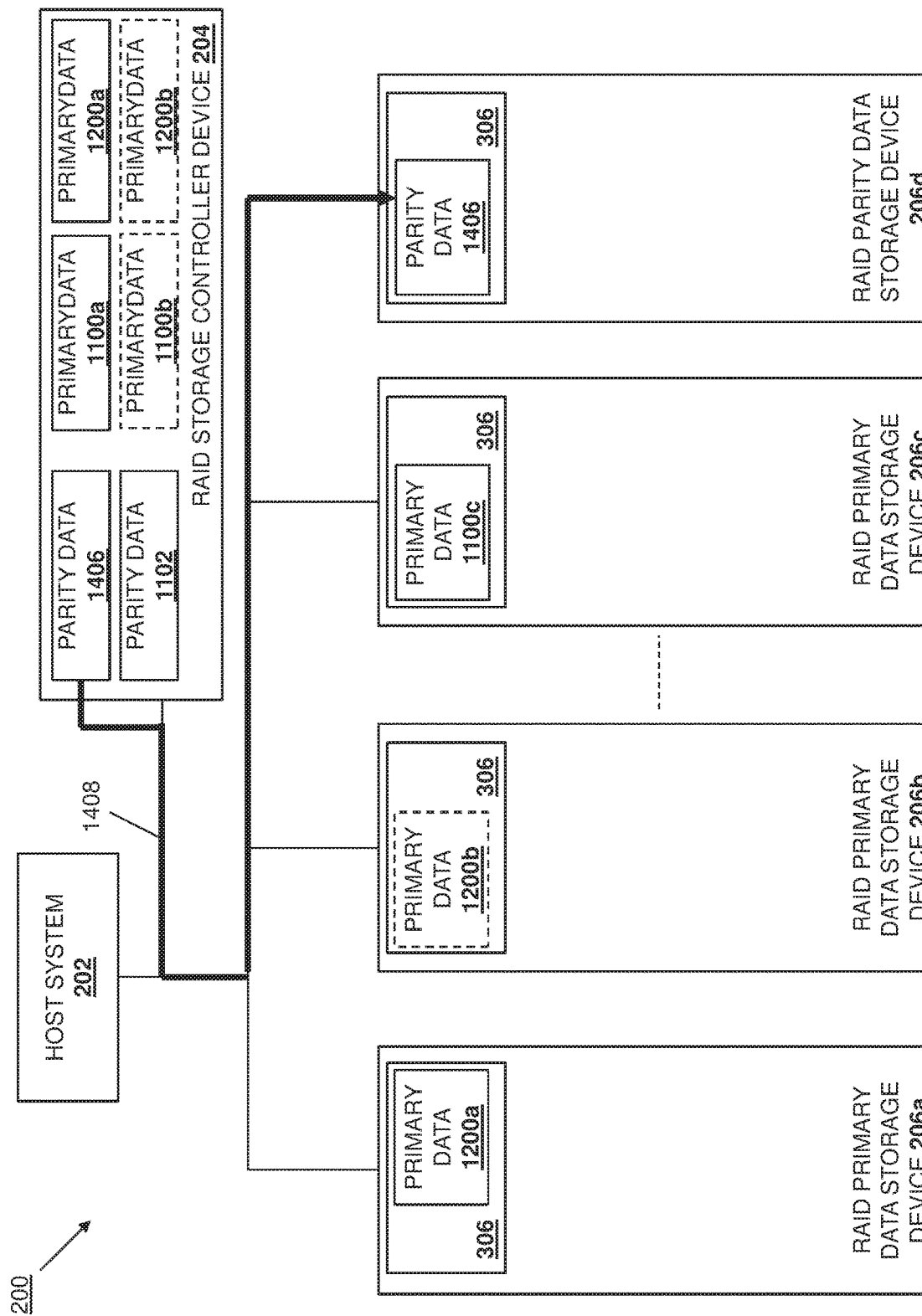
FIG. 14C is a schematic view illustrating an embodiment of the RAID storage system of FIG. 2 operating during the method of FIG. 10.
Figure 14D:
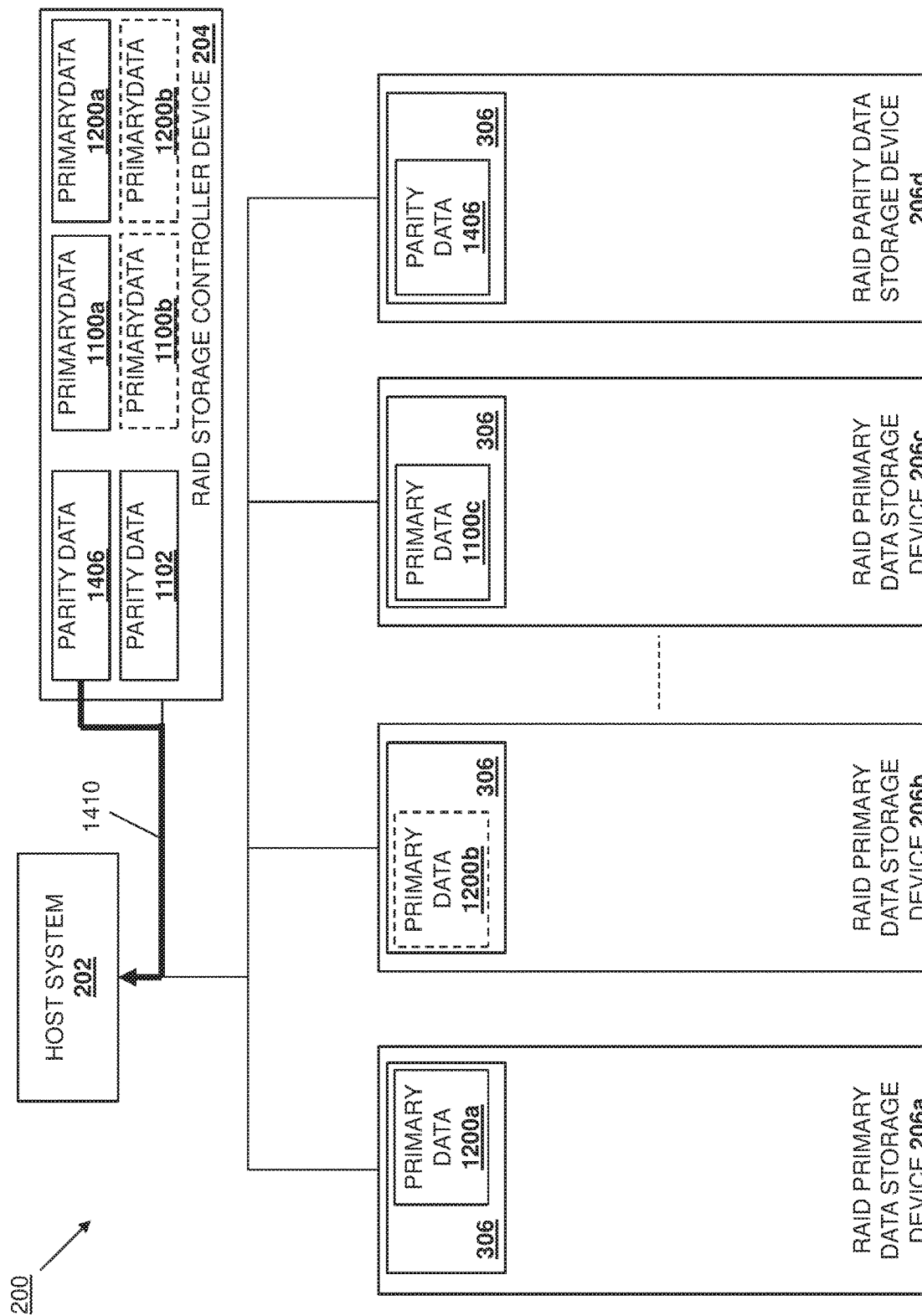
FIG. 14D is a schematic view illustrating an embodiment of the RAID storage system of FIG. 2 operating during the method of FIG. 10.

The method 1000 then proceeds to block 1012 where the RAID storage controller device performs an XOR operation on current primary data, updated primary data, and current parity data in order to produce updated parity data, and writes the updated parity data to the RAID parity data storage device. With reference to FIG. 14B, at block 1012 the RAID storage controller device 204 is illustrated performing an XOR operation 1402 on the primary data 1100a, the primary data 1100b, the primary data 1200a, the primary data 1200b, and the parity data 1102 in order to produce parity data 1406. Furthermore, with reference to FIG. 14C, at block 1012 the RAID storage controller device 204 is illustrated performing a DMA operation 1408 that overwrites the parity data 1102 in the storage subsystem 306 in the RAID parity data storage device 206d with the parity data 1406. As such, following block 1012, the primary data 1100a in the RAID primary data storage device 206a has been updated with the primary data 1200a, the primary data 1100b in the RAID primary data storage device 206b has been updated with the primary data 1200b, and the parity data 1102 in the RAID parity data storage device 206d has been updated with the parity data 1406, thus allowing for the use of the parity data 1406 for the recovery of any one of the primary data 1200a, 1200b, and 1100c in the event that primary data becomes unavailable. FIG. 14D illustrates the RAID storage controller device 204 generating and transmitting a completion message 1410 to the host system 202 to indicate that the write command 1200 has been completed.

Thus, systems and methods have been described that provide for the performance of partial stripe data update operations to store and backup data in a RAID storage system using a RAID storage controller device. As will be appreciated by one of skill in the art in possession of the present disclosure, the number of data transfers involved in a data update according to the method 1000 will be 2n+3, where n is the number of RAID storage devices experiencing a data update. For example, if only the RAID primary data storage device 206a is having its primary data updated, then the number of data transfers will be ((2×1 RAID storage device)+3=) 5 data transfers, which include the transfer of the updated primary data from the host system 202 to the RAID storage controller device 204, the transfer of the current primary data from the RAID primary data storage device 206a to the RAID storage controller device 204, the transfer of the updated primary data from the RAID storage controller device 204 to the RAID primary data storage device 206a, the transfer of the current parity data from the RAID parity data storage device 206d to the RAID storage controller device 204, and the transfer of the updated parity data from the RAID storage controller device 204 to the RAID parity data storage device 206d.

Similarly, if the RAID primary data storage devices 206a and 206b are having their primary data updated, then the number of data transfers will be ((2×2 RAID storage device)+3=) 7 data transfers, which include the transfer of the updated primary data from the host system 202 to the RAID storage controller device 204, the transfer of the current primary data from the RAID primary data storage device 206a to the RAID storage controller device 204, the transfer of the updated primary data from the RAID storage controller device 204 to the RAID primary data storage device 206a, the transfer of the current primary data from the RAID primary data storage device 206b to the RAID storage controller device 204, the transfer of the updated primary data from the RAID storage controller device 204 to the RAID primary data storage device 206b, the transfer of the current parity data from the RAID parity data storage device 206d to the RAID storage controller device 204, and the transfer of the updated parity data from the RAID storage controller device 204 to the RAID parity data storage device 206d. One of skill in the art in possession of the present disclosure will recognize that the 2n+3 number of data transfers will hold for any number of RAID storage devices experiencing a data update.

Figure 15:
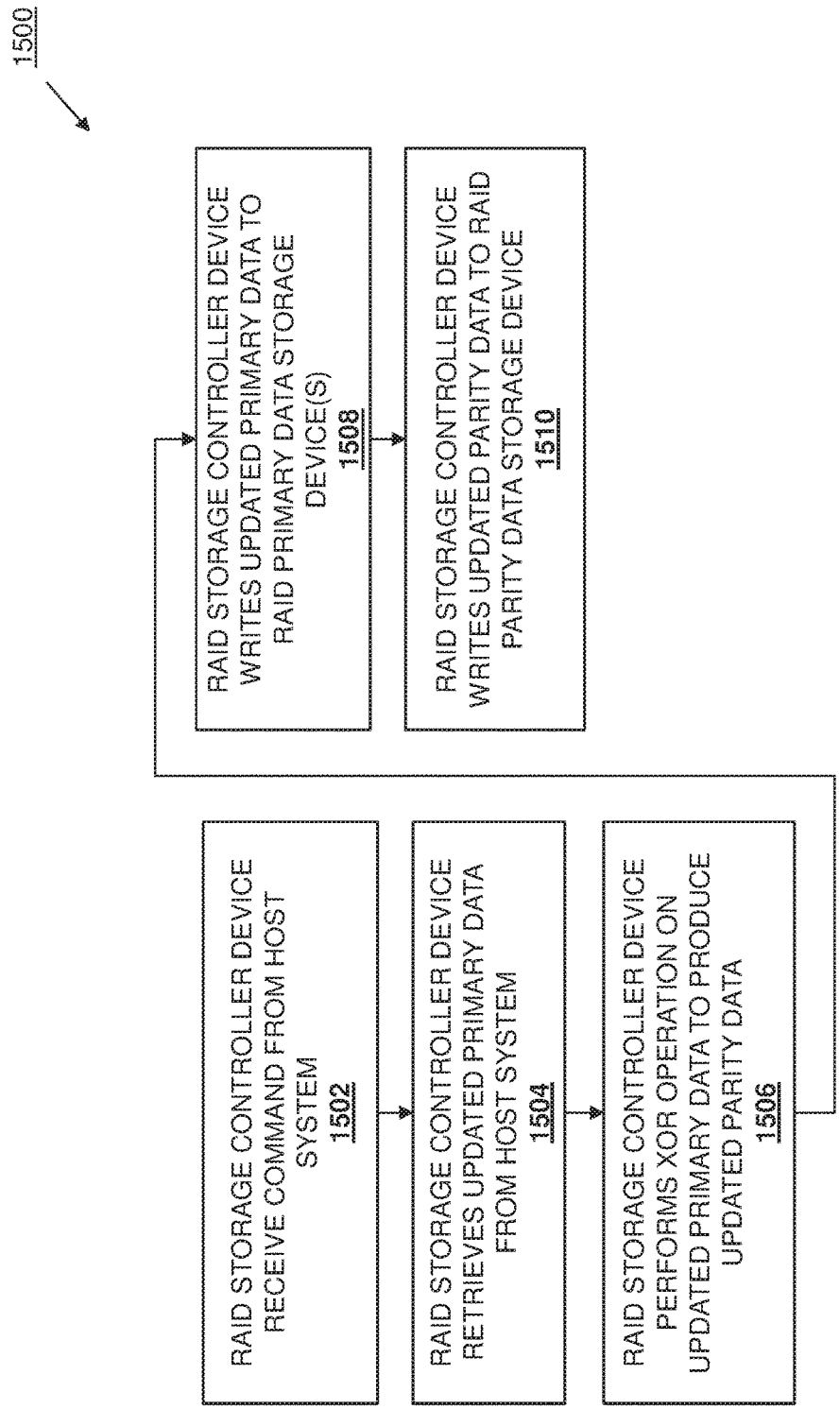
FIG. 15 is a flow chart illustrating an embodiment of a method for performing full stripe data update operations using RAID storage controller device.

Referring now to FIG. 15, an embodiment of a method 1500 for performing full stripe data update operations using a RAID storage controller device is illustrated. As discussed below, embodiments of the systems and methods of the present disclosure may provide for the performance of data update operations by a RAID storage controller device. For example, the RAID storage controller device may retrieve updated primary data from a host system, and perform an XOR operation on the updated primary data in order to produce updated parity data. The RAID storage controller device may then overwrite the current primary data in each RAID primary data storage device with its respective updated primary data, and overwrite the current parity data in the RAID parity data storage device with the updated parity data. As such, in some embodiments of the present disclosure, full stripe data update operations may be performed by the RAID storage controller device. Furthermore, one of skill in the art in possession of the present disclosure will recognize that the number of data transfers associated with such RAID storage controller device data update techniques is (the number of RAID storage devices in the RAID storage system)+1).

Figure 16:
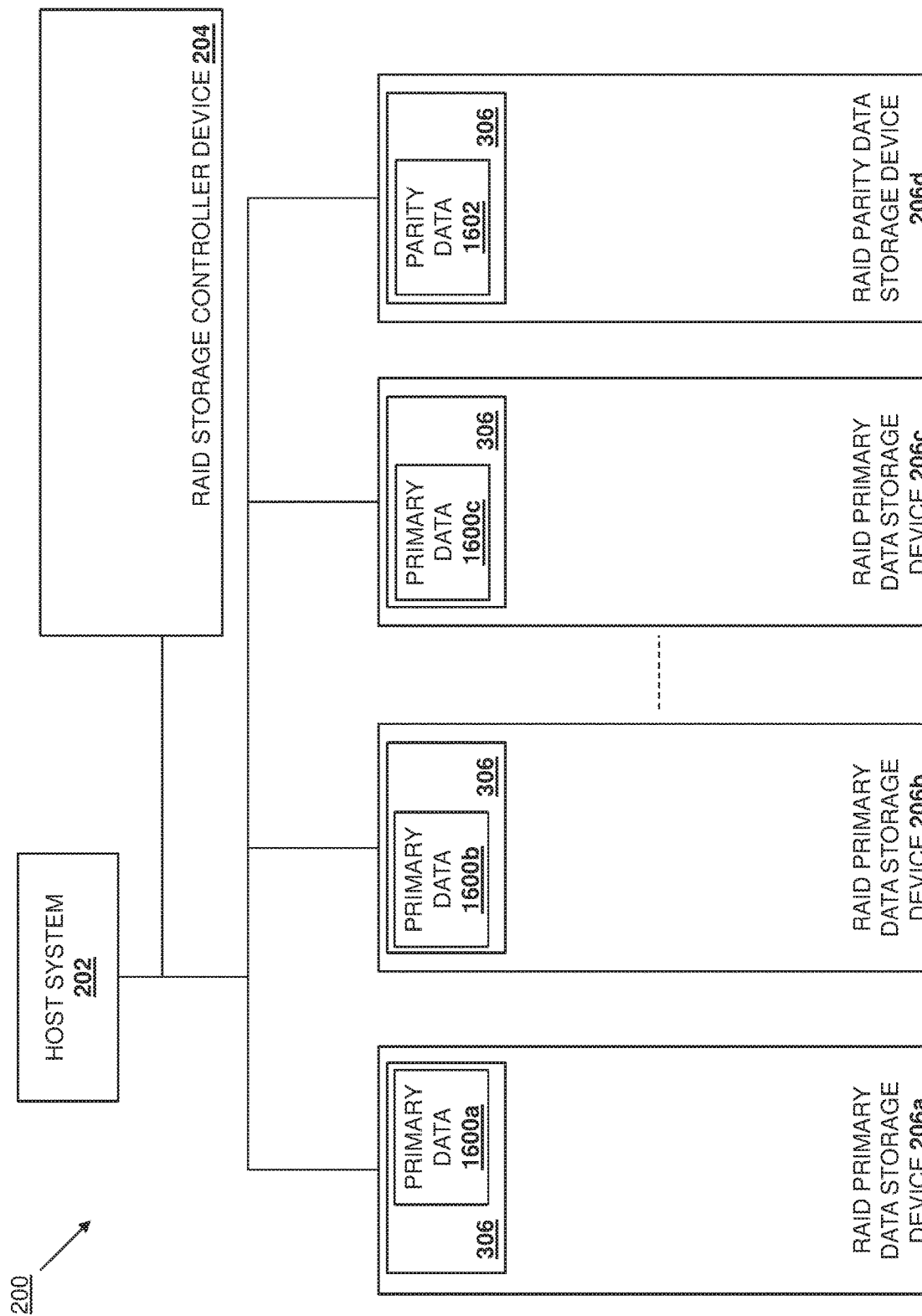
FIG. 16 is a schematic view illustrating an embodiment of the RAID storage system of FIG. 2 operating during the method of FIG. 15.

With reference to FIG. 16, the RAID storage system 200 is illustrated with the RAID primary data storage device 206a storing primary data 1600a in its storage subsystem 306, the RAID primary data storage device 206b storing primary data 1600b in its storage subsystem 306, and the RAID primary data storage device 206c storing primary data 1600c in its storage subsystem 306. While only three RAID primary data storage devices are illustrated and described in the examples provided below, one of skill in the art in possession of the present disclosure will recognize that any number of RAID primary data storage devices may store primary data while remaining within the scope of the present disclosure as well. In addition, the RAID storage system 200 is also illustrated with the RAID parity data storage device 206d storing parity data 1602 in its storage subsystem 306, and one of skill in the art in possession of the present disclosure will recognize that the parity data 1602 may have been generated via an XOR operation performed on the primary data 1600a-1600c in the RAID primary data storage devices 206a-206c, and allows for the rebuilding of any primary data stored on any one RAID primary data storage device in the event that primary data/RAID primary data storage device becomes unavailable.

Similarly as discussed above, the primary/parity data storage configuration illustrated in FIG. 16 provides primary/parity for a single data strip, and different data strips may have different primary/parity data storage configurations (e.g., in a plurality of RAID storage devices provided in a RAID storage system, a first data stripe may include primary data on first, second, and third RAID storage devices and parity data on a fourth RAID storage device; a second data stripe may include primary data on the second, third, and fourth RAID storage devices and parity data on the first RAID storage device, etc.) Thus, it should be understood that the same RAID storage device may act as both a RAID primary data storage device and a RAID parity data storage device for different data stripes.

Figure 17A:
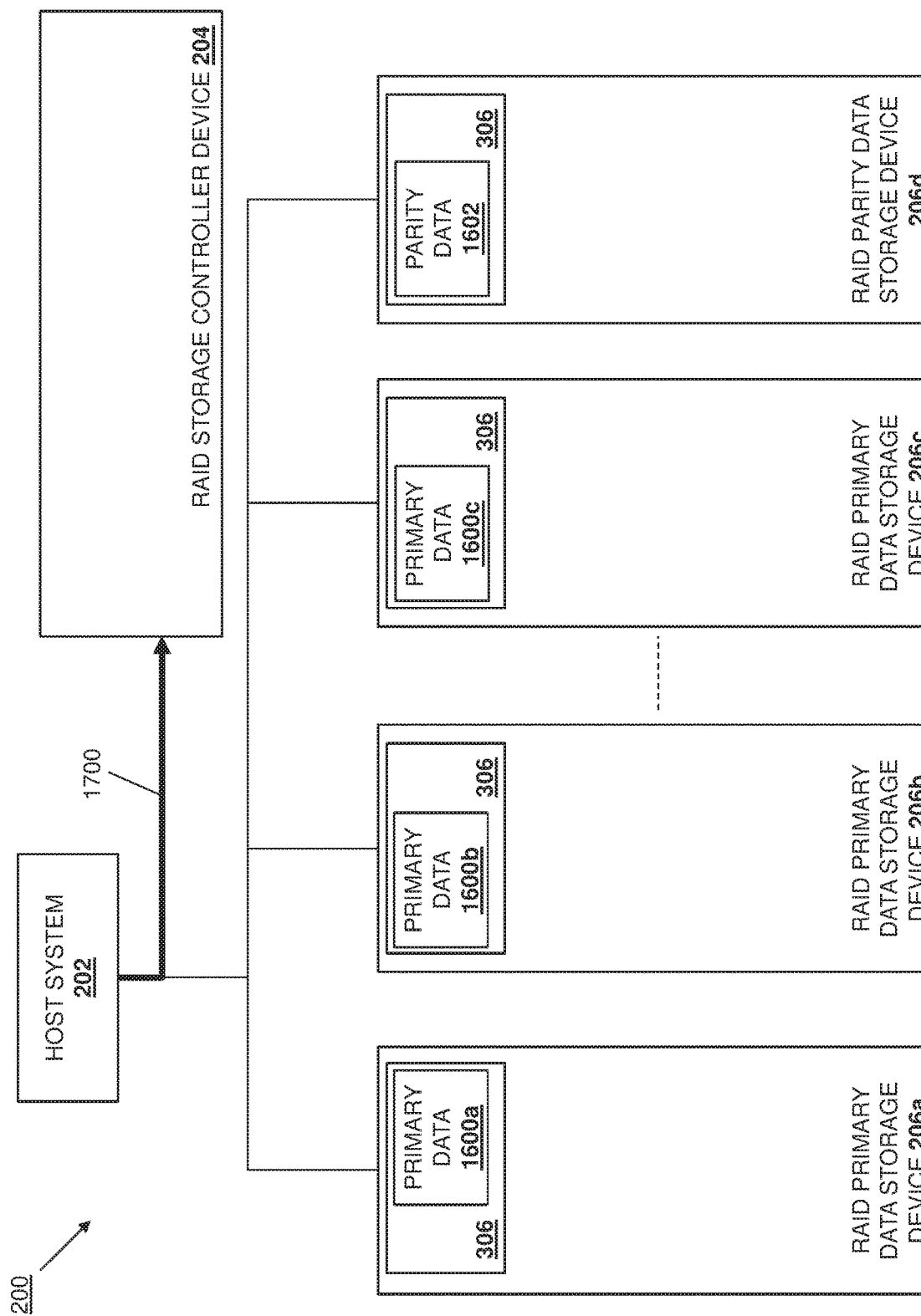
FIG. 17A is a schematic view illustrating an embodiment of the RAID storage system of FIG. 2 operating during the method of FIG. 15.

The method 1500 begins at block 1502 where RAID storage controller device receives a command from a host system. With reference to FIG. 17A, the host system 202 may generate a write command 1700 that instructs the writing of primary data that is located on the host system 200 to the RAID primary data storage devices 206a-206c, and may transmit that write command 1700 to the RAID storage controller device 204. As will be appreciated by one of skill in the art in possession of the present disclosure, the generation and/or transmission of the write command 1700 by the host system 202 to the RAID storage controller device 204 at block 1502 may include a variety of control plane communications between the host system 202 and the RAID storage controller device 204 that have been omitted for clarity of discussion. As such, at block 1502, the RAID storage controller device 204 may receive the write command 1700.

Figure 17B:
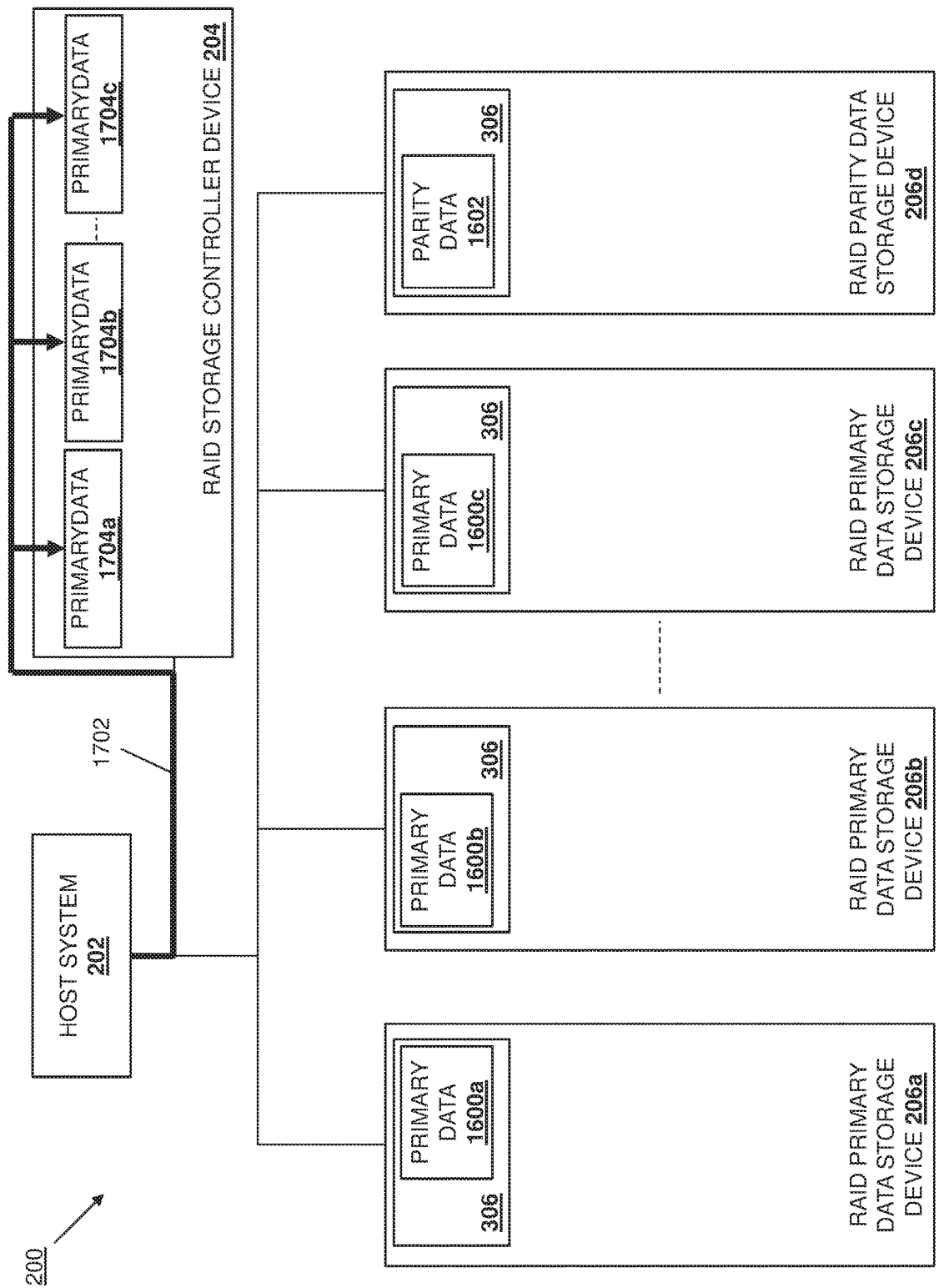
FIG. 17B is a schematic view illustrating an embodiment of the RAID storage system of FIG. 2 operating during the method of FIG. 15.

The method 1500 then proceeds to block 1504 where the RAID storage controller device retrieves updated primary data from the host system. With reference to FIG. 17B, the RAID storage controller device 204 is illustrated performing a DMA operation 1702 that accesses primary data 1704a, primary data 1704b, and up to primary data 1704c that is stored on the host system 202 (e.g., in a memory system or storage system included on the host system 202), and writes that primary data 1704a-1704c to a buffer subsystem in the RAID storage controller device 204 (not illustrated, but similar to the device buffers in the RAID primary data storage devices described in the examples above). As will be appreciated by one of skill in the art in possession of the present disclosure, the primary data 1704a-1704c may be updates to the primary data 1600a-1600c, respectively, stored in the RAID primary data storage devices 206a-206c, although other primary data writing scenarios will fall within the scope of the present disclosure as well. One of skill in the art in possession of the present disclosure will recognize the scenario described for the method 1500 as a full stripe write in which all of the primary data in a data stripe provided by the RAID primary data storage devices 206a-206c is updated.

Figure 17C:
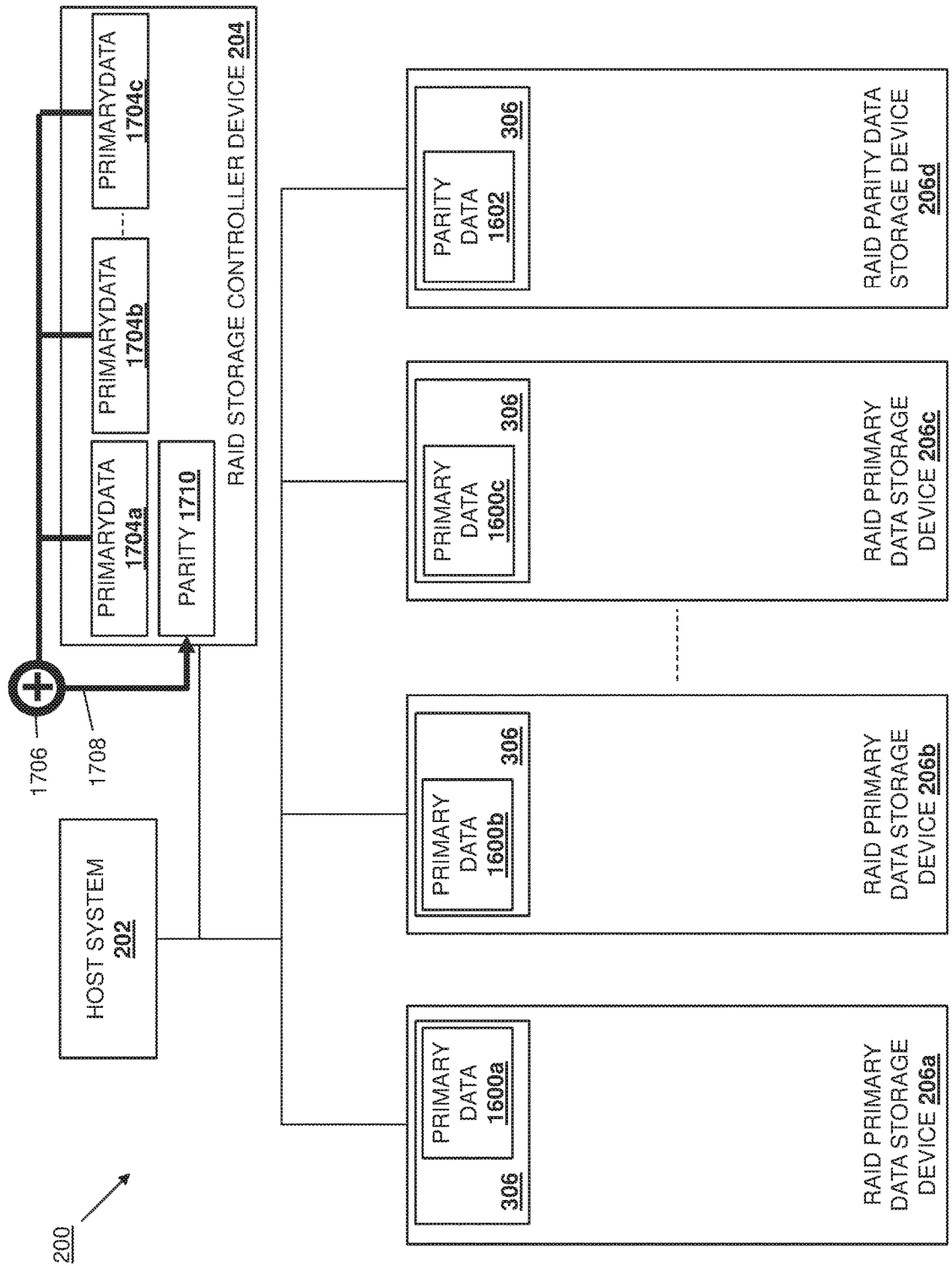
FIG. 17C is a schematic view illustrating an embodiment of the RAID storage system of FIG. 2 operating during the method of FIG. 15.

The method 1500 then proceeds to block 1506 where the RAID storage controller device performs an XOR operation on the updated primary data in order to produce updated parity data. With reference to FIG. 17C, at block 1506 the RAID storage controller device 204 is illustrated performing an XOR operation 1706 on the primary data 1704a-1704c in order to produce parity data 1710. As will be appreciated by one of skill in the art in possession of the present disclosure, the full stripe write situation allows for the RAID storage controller device to compute the updated parity data from the updated primary data retrieved from the host system 202, as that is the primary data that will be stored on each of the RAID primary data storage devices 206a-206c, as discussed below. Thus, the parity data 1710 produced at block 1506 will allow for recovery of any of the primary data 1704a-1704c in the event any one becomes unavailable.

Figure 17D:
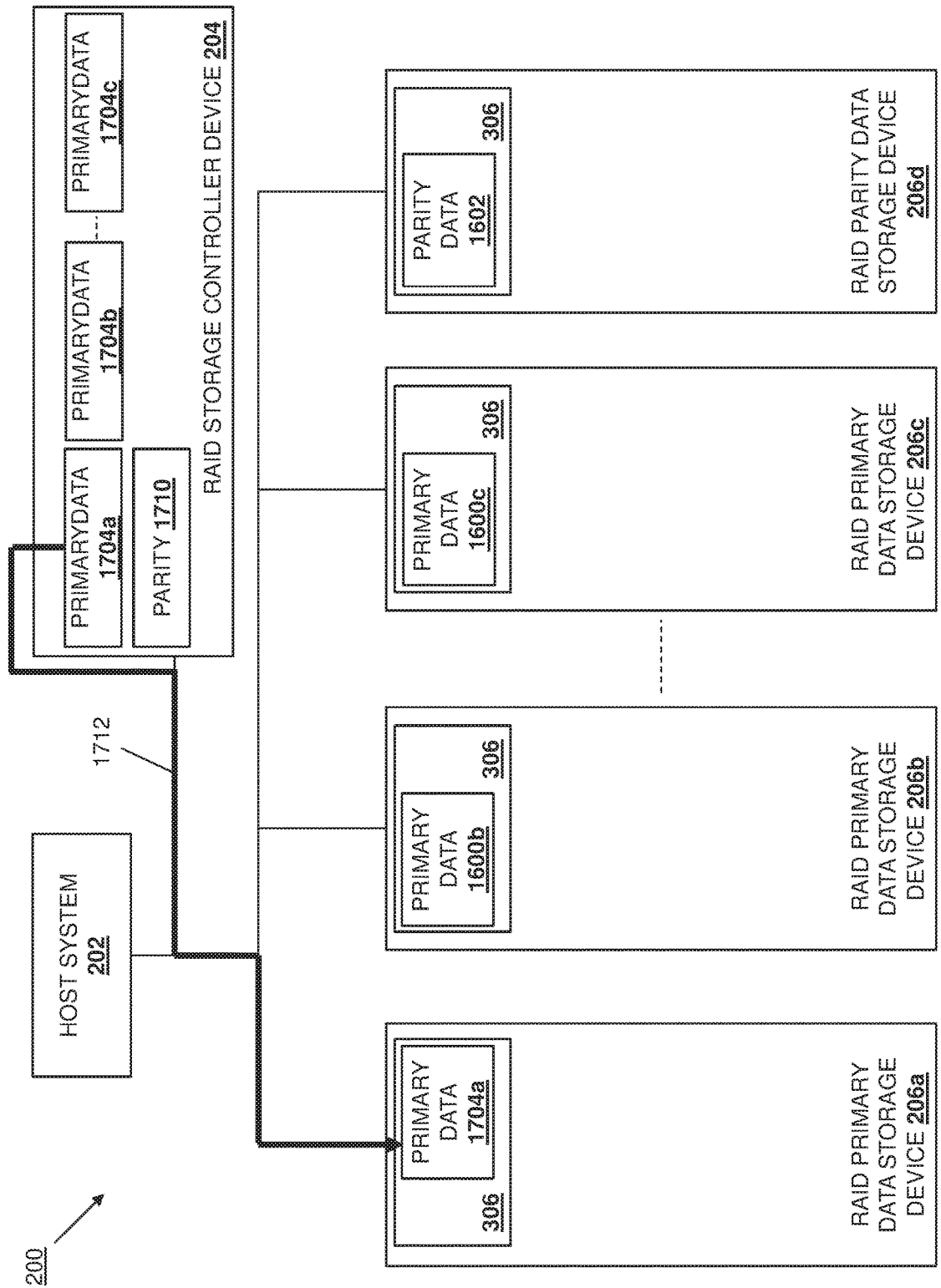
FIG. 17D is a schematic view illustrating an embodiment of the RAID storage system of FIG. 2 operating during the method of FIG. 15.
Figure 17E:
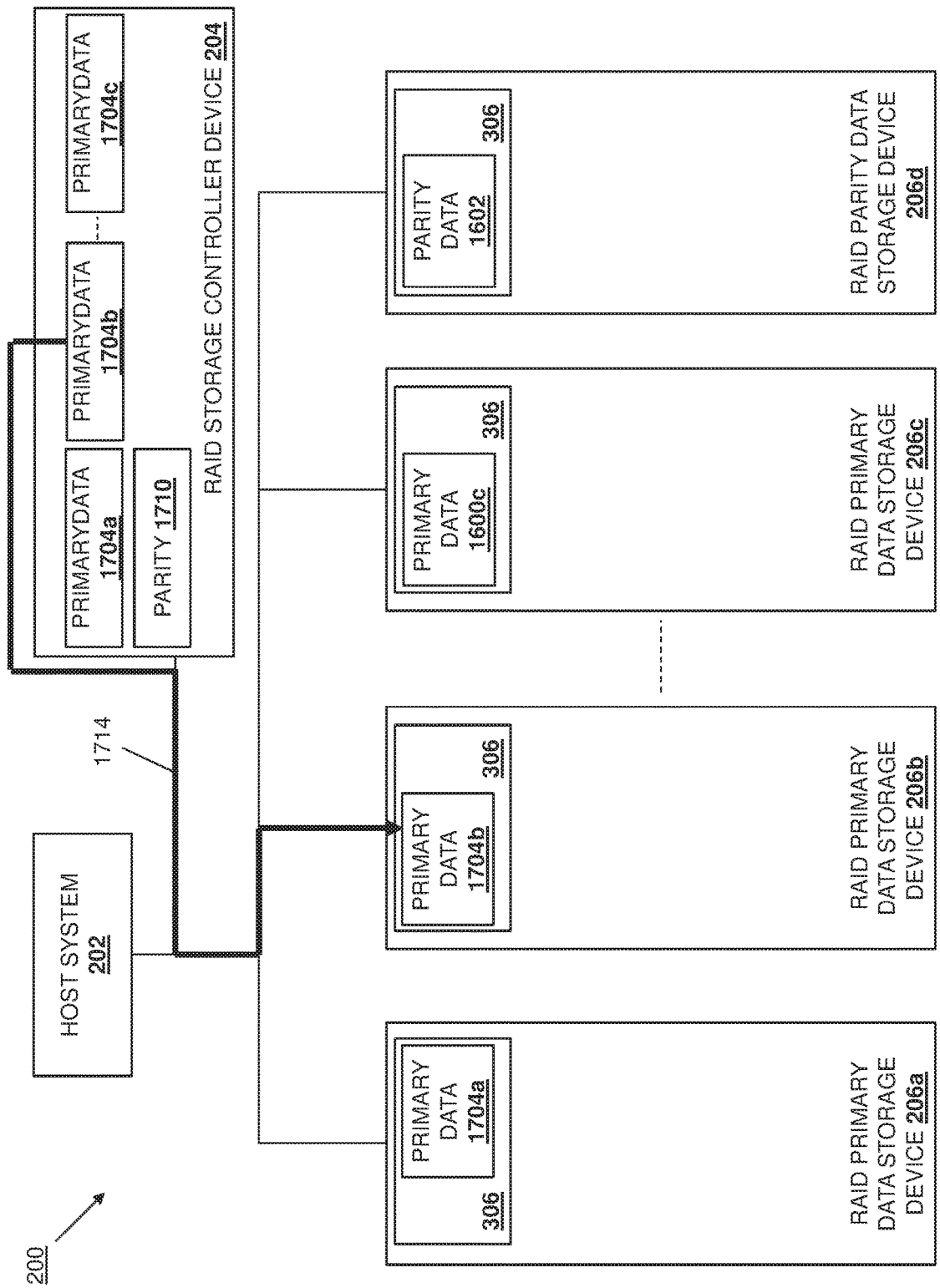
FIG. 17E is a schematic view illustrating an embodiment of the RAID storage system of FIG. 2 operating during the method of FIG. 15.
Figure 17F:
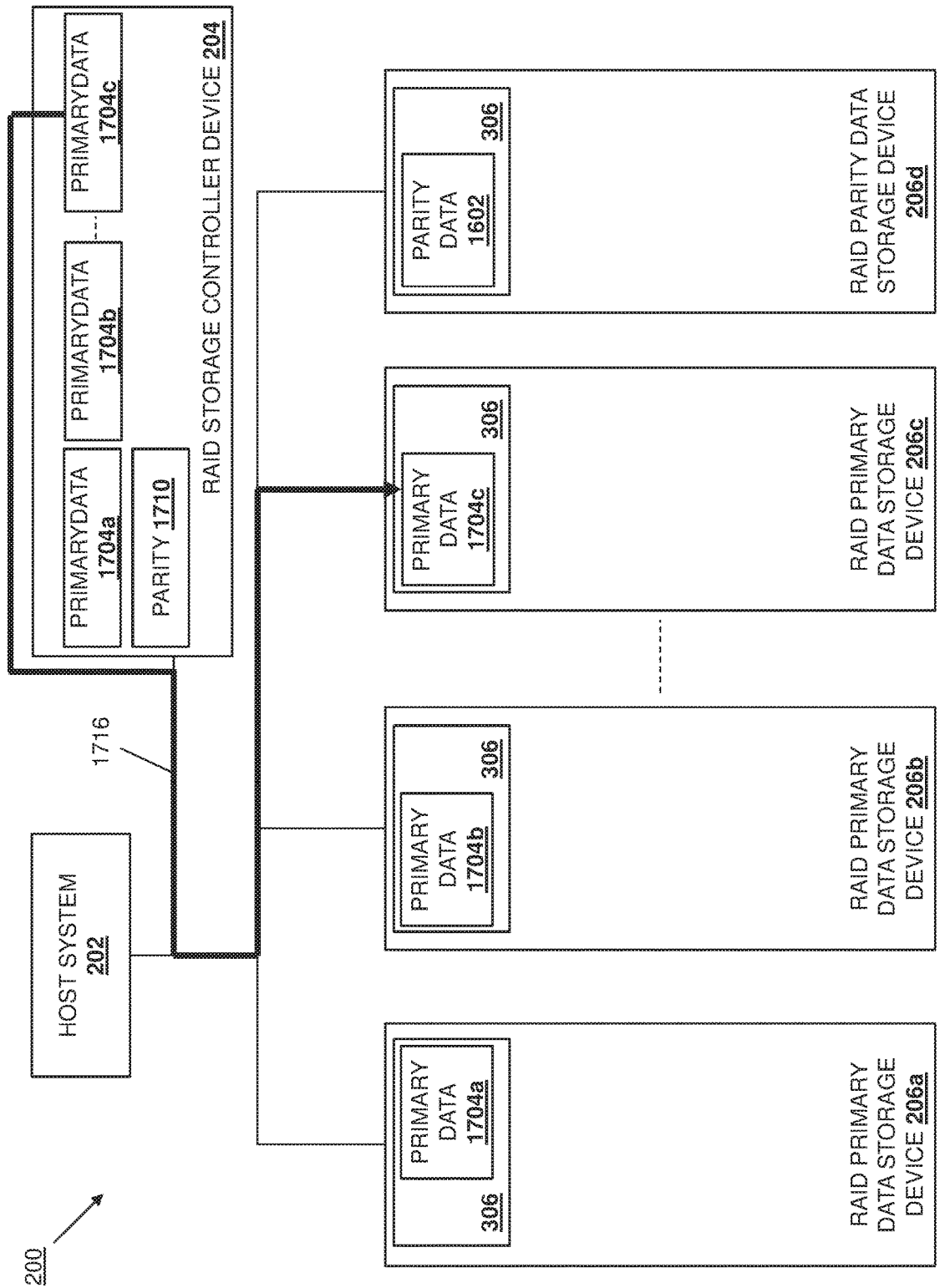
FIG. 17F is a schematic view illustrating an embodiment of the RAID storage system of FIG. 2 operating during the method of FIG. 15.
Figure 17G:
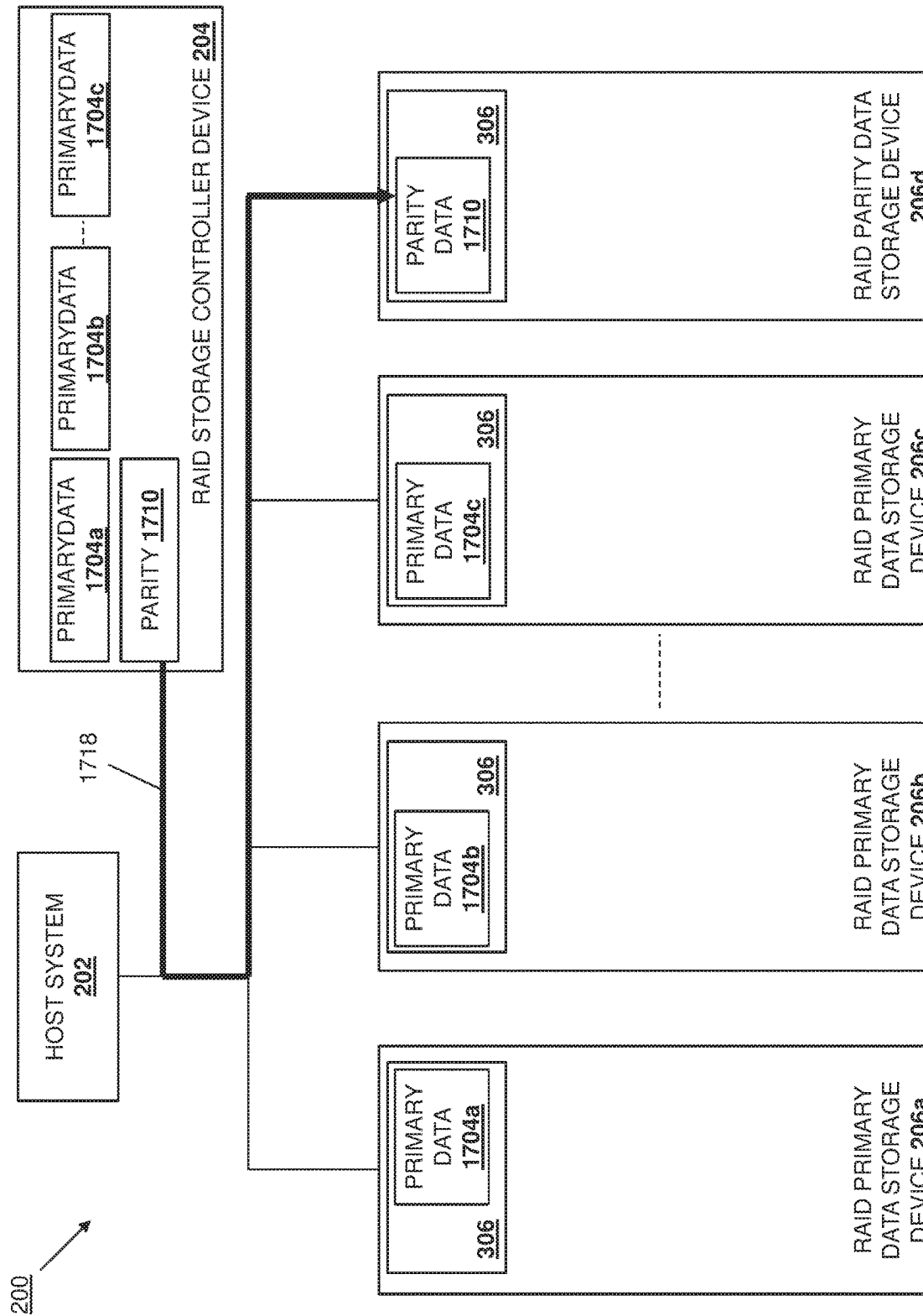
FIG. 17G is a schematic view illustrating an embodiment of the RAID storage system of FIG. 2 operating during the method of FIG. 15.

The method 1500 then proceeds to block 1508 where the RAID storage controller device writes the updated primary data to the RAID primary data storage device, and block 1510 where the RAID storage controller writes the updated parity data to the RAID parity data storage device. With reference to FIG. 17D, at block 1508 the RAID storage controller device 204 is illustrated performing a DMA operation 1712 that overwrites the primary data 1600a in the storage subsystem 306 in the RAID primary data storage device 206a with the primary data 1704a. Similarly, with reference to FIG. 17E, at block 1508 the RAID storage controller device 204 is illustrated performing a DMA operation 1714 that overwrites the primary data 1600b in the storage subsystem 306 in the RAID primary data storage device 206a with the primary data 1704b. Similarly, with reference to FIG. 17F, at block 1508 the RAID storage controller device 204 is illustrated performing a DMA operation 1716 that overwrites the primary data 1600c in the storage subsystem 306 in the RAID primary data storage device 206a with the primary data 1704c. Finally, with reference to FIG. 17F, at block 1510 the RAID storage controller device 204 is illustrated performing a DMA operation 1718 that overwrites the parity data 1602 in the storage subsystem 306 in the RAID parity data storage device 206d with the parity data 1710.

Figure 17H:
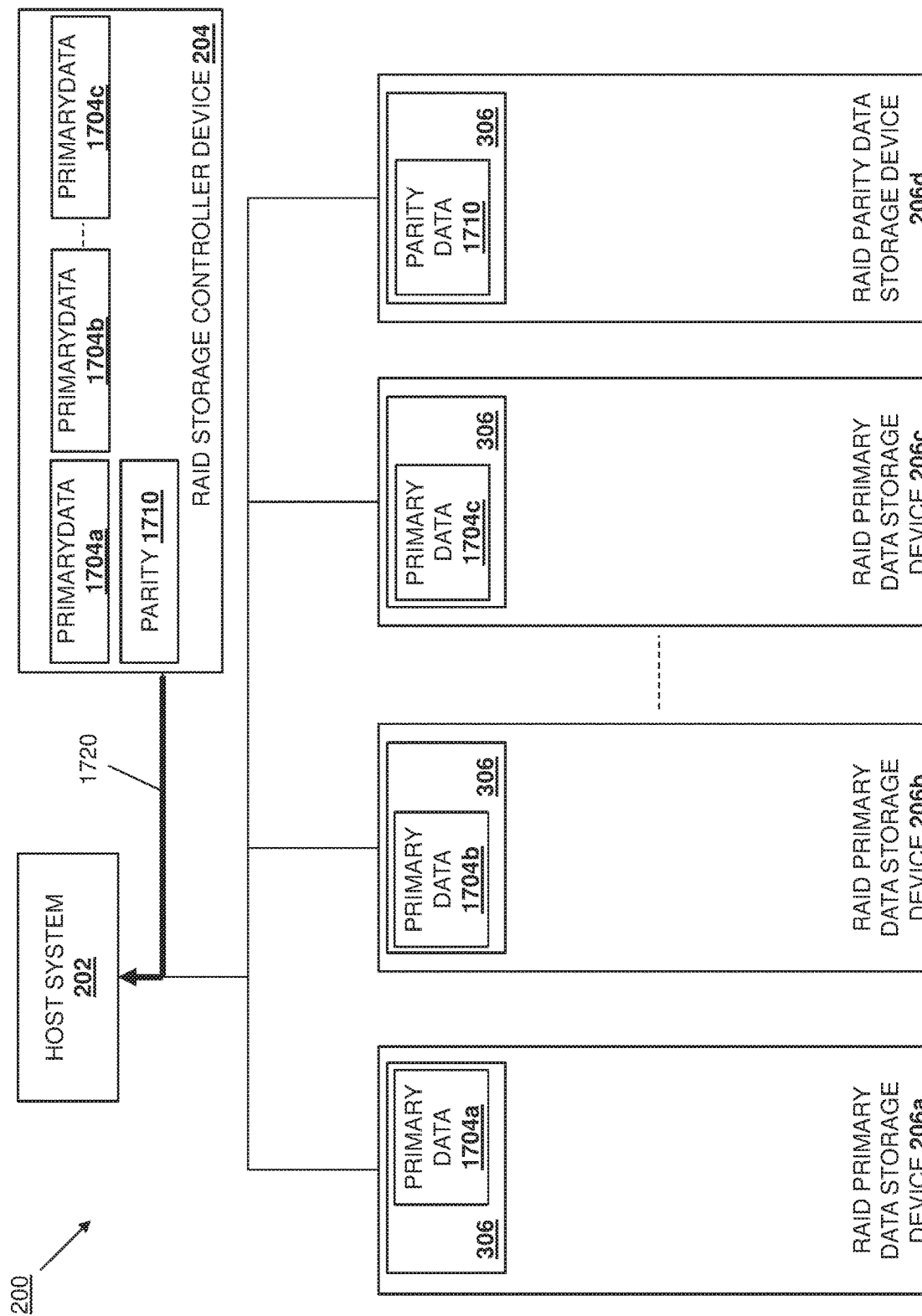
FIG. 17H is a schematic view illustrating an embodiment of the RAID storage system of FIG. 2 operating during the method of FIG. 15.

As such, following block 1510, the primary data 1600a in the RAID primary data storage device 206a has been updated with the primary data 1704a, the primary data 1600b in the RAID primary data storage device 206b has been updated with the primary data 1704b, the primary data 1600c in the RAID primary data storage device 206c has been updated with the primary data 1704c, and the parity data 1602 in the RAID parity data storage device 206d has been updated with the parity data 1710, thus allowing for the recovery of any of the primary data 1704a-1704c in the event that primary data becomes unavailable. FIG. 17H illustrates the RAID storage controller device 204 generating and transmitting a completion message 1720 to the host system 202 to indicate that the write command 1200 has been completed.

Thus, systems and methods have been described that provide for the performance of full stripe data update operations to store and backup data in a RAID storage system using a RAID storage controller device. As will be appreciated by one of skill in the art in possession of the present disclosure, the number of data transfers involved in a data update according to the method 1000 will be (the number of RAID storage devices in the RAID storage system)+1). For example, given the three RAID primary data storage devices 206a-206c and the RAID parity data storage device 206d in the illustrated embodiment, then the number of data transfers will be ((4 RAID storage devices)+1=) 5 data transfers, which include the transfer of the updated primary data from the host system 202 to the RAID storage controller device 204, the transfer of the updated primary data from the RAID storage controller device 204 to the RAID primary data storage device 206a, the transfer of the updated primary data from the RAID storage controller device 204 to the RAID primary data storage device 206b, the transfer of the updated primary data from the RAID storage controller device 204 to the RAID primary data storage device 206c, and the transfer of the updated parity data from the RAID storage controller device 204 to the RAID parity data storage device 206d. One of skill in the art in possession of the present disclosure will recognize that the (the number of RAID storage devices in the RAID storage system)+1) number of data transfers will hold for any number of RAID storage devices in a RAID storage system during a full stripe write.

Figure 18:
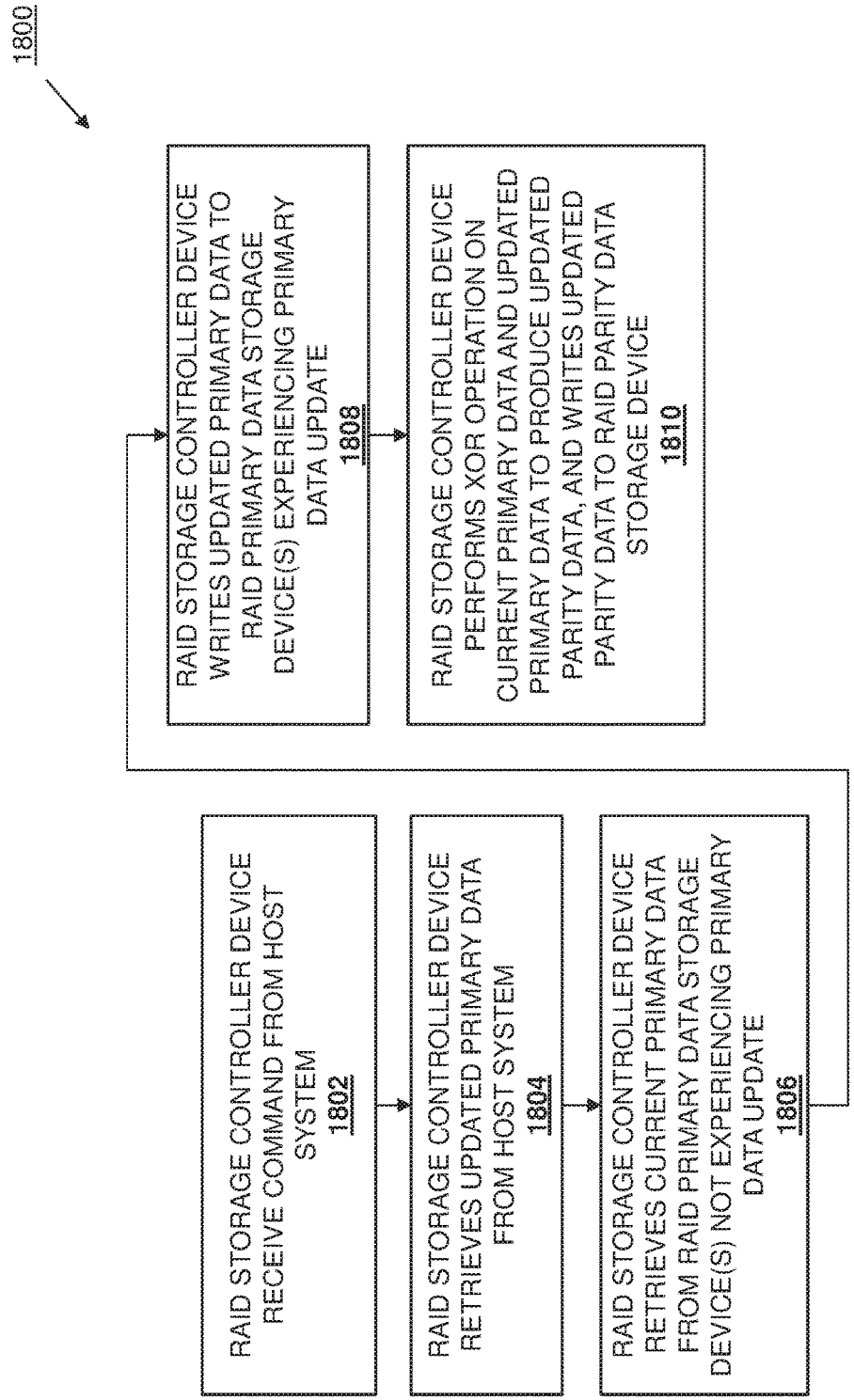
FIG. 18 is a flow chart illustrating an embodiment of a method for performing partial stripe data update operations using RAID storage controller device.

Referring now to FIG. 18, an embodiment of a method 1800 for performing partial stripe data update operations using a RAID storage controller device is illustrated. As discussed below, embodiments of the systems and methods of the present disclosure may provide for the performance of data update operations by a RAID storage controller device. For example, the RAID storage controller device may retrieve updated primary data from a host system, and current primary data from each RAID primary data storage device that is not experiencing a primary data update, and then overwrite the current primary data in each RAID primary data storage device that is experiencing a primary data update with its respective updated primary data. The RAID storage controller device may then perform an XOR operation on the current primary data and the updated primary data in order to produce updated parity data, and overwrite the current parity data in the RAID parity data storage device with the updated parity date. As such, in some embodiments of the present disclosure, partial stripe data update operations may be performed by the RAID storage controller device. Furthermore, one of skill in the art in possession of the present disclosure will recognize that the number of data transfers associated with such RAID storage controller device data update techniques is (the number of RAID storage devices in the RAID storage system)+1).

Figure 19:
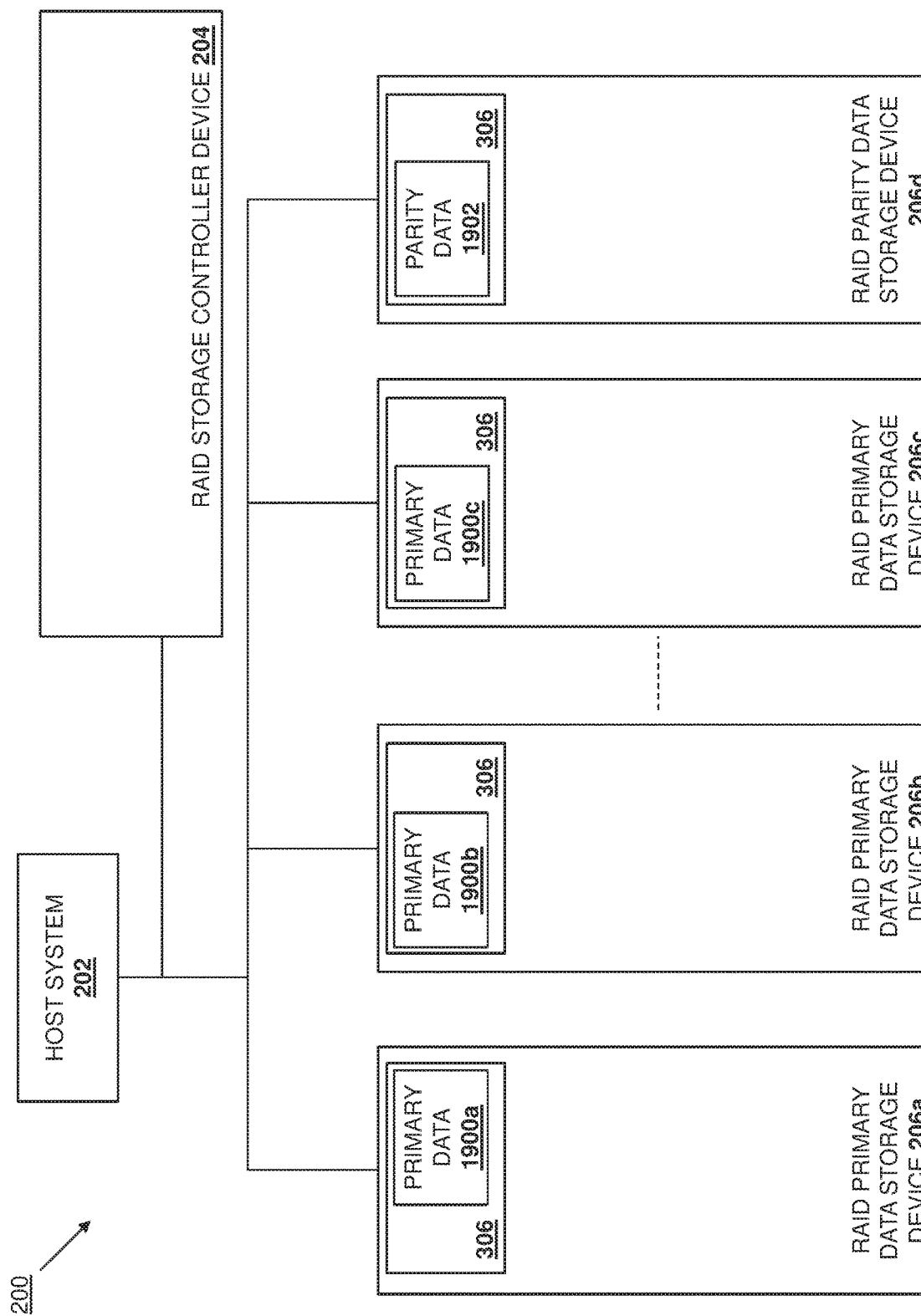
FIG. 19 is a schematic view illustrating an embodiment of the RAID storage system of FIG. 2 operating during the method of FIG. 18.

With reference to FIG. 19, the RAID storage system 200 is illustrated with the RAID primary data storage device 206a storing primary data 1900a in its storage subsystem 306, the RAID primary data storage device 206b storing primary data 1900b in its storage subsystem 306, and the RAID primary data storage device 206c storing primary data 1900c in its storage subsystem 306. While only three RAID primary data storage devices are illustrated and described in the examples provided below, one of skill in the art in possession of the present disclosure will recognize that any number of RAID primary data storage devices may store primary data while remaining within the scope of the present disclosure as well. In addition, the RAID storage system 200 is also illustrated with the RAID parity data storage device 206d storing parity data 1902 in its storage subsystem 306, and one of skill in the art in possession of the present disclosure will recognize that the parity data 1902 may have been generated via an XOR operation performed on the primary data 1900a-1900c in the RAID primary data storage devices 206a-206c, and allows for the rebuilding of any primary data stored on any one RAID primary data storage device in the event that primary data/RAID primary data storage device becomes unavailable.

Similarly as discussed above, the primary/parity data storage configuration illustrated in FIG. 19 provides primary/parity for a single data strip, and different data strips may have different primary/parity data storage configurations (e.g., in a plurality of RAID storage devices provided in a RAID storage system, a first data stripe may include primary data on first, second, and third RAID storage devices and parity data on a fourth RAID storage device; a second data stripe may include primary data on the second, third, and fourth RAID storage devices and parity data on the first RAID storage device, etc.) Thus, it should be understood that the same RAID storage device may act as both a RAID primary data storage device and a RAID parity data storage device for different data stripes.

Figure 20A:
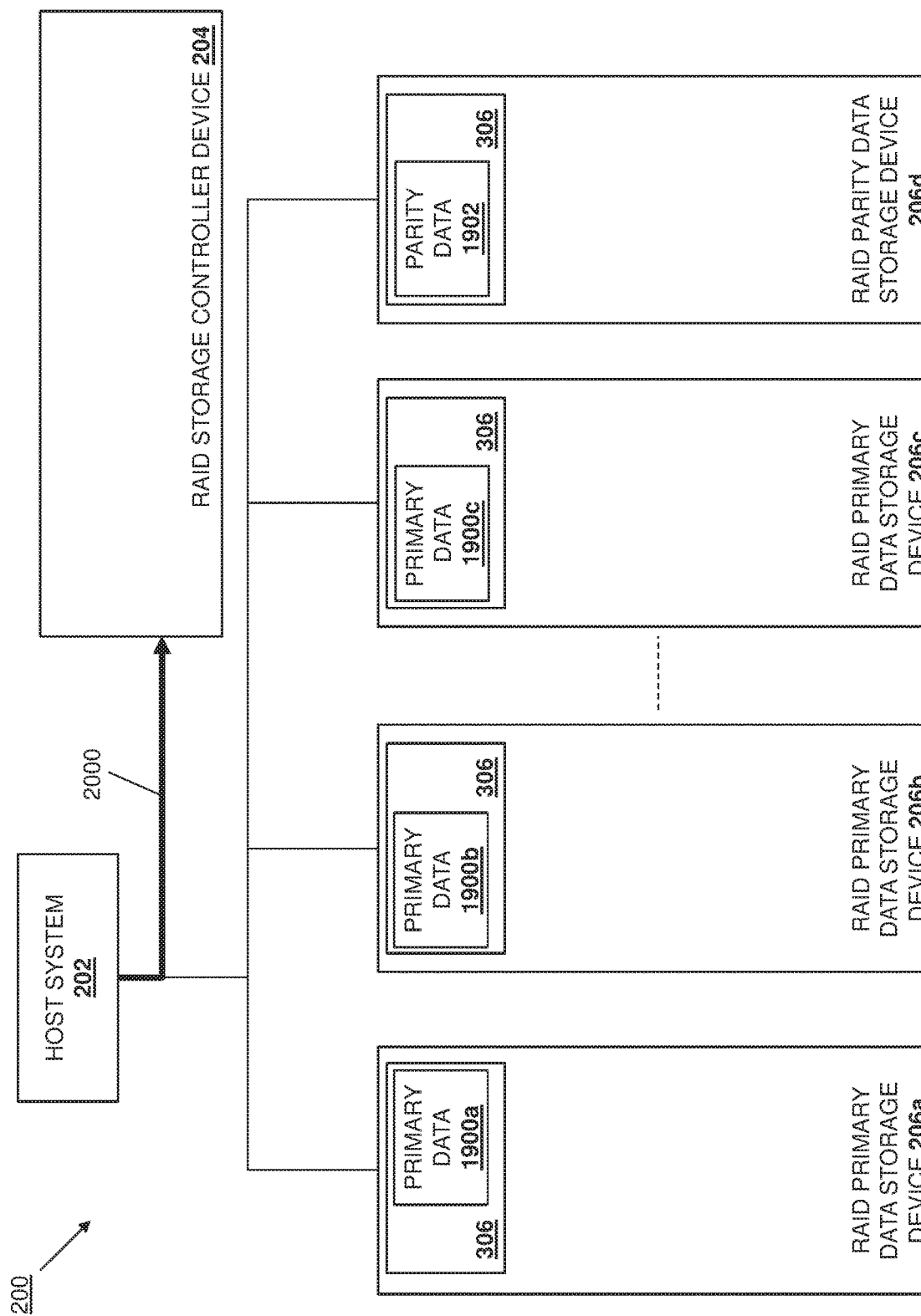
FIG. 20A is a schematic view illustrating an embodiment of the RAID storage system of FIG. 2 operating during the method of FIG. 18.

The method 1800 begins at block 1802 where RAID storage controller device receives a command from a host system. With reference to FIG. 20A, the host system 202 may generate a write command 2000 that instructs the writing of primary data that is located on the host system 200 to the RAID primary data storage devices 206a-206c, and may transmit that write command 2000 to the RAID storage controller device 204. As will be appreciated by one of skill in the art in possession of the present disclosure, the generation and/or transmission of the write command 2000 by the host system 202 to the RAID storage controller device 204 at block 1802 may include a variety of control plane communications between the host system 202 and the RAID storage controller device 204 that have been omitted for clarity of discussion. As such, at block 1802, the RAID storage controller device 204 may receive the write command 2000.

Figure 20B:
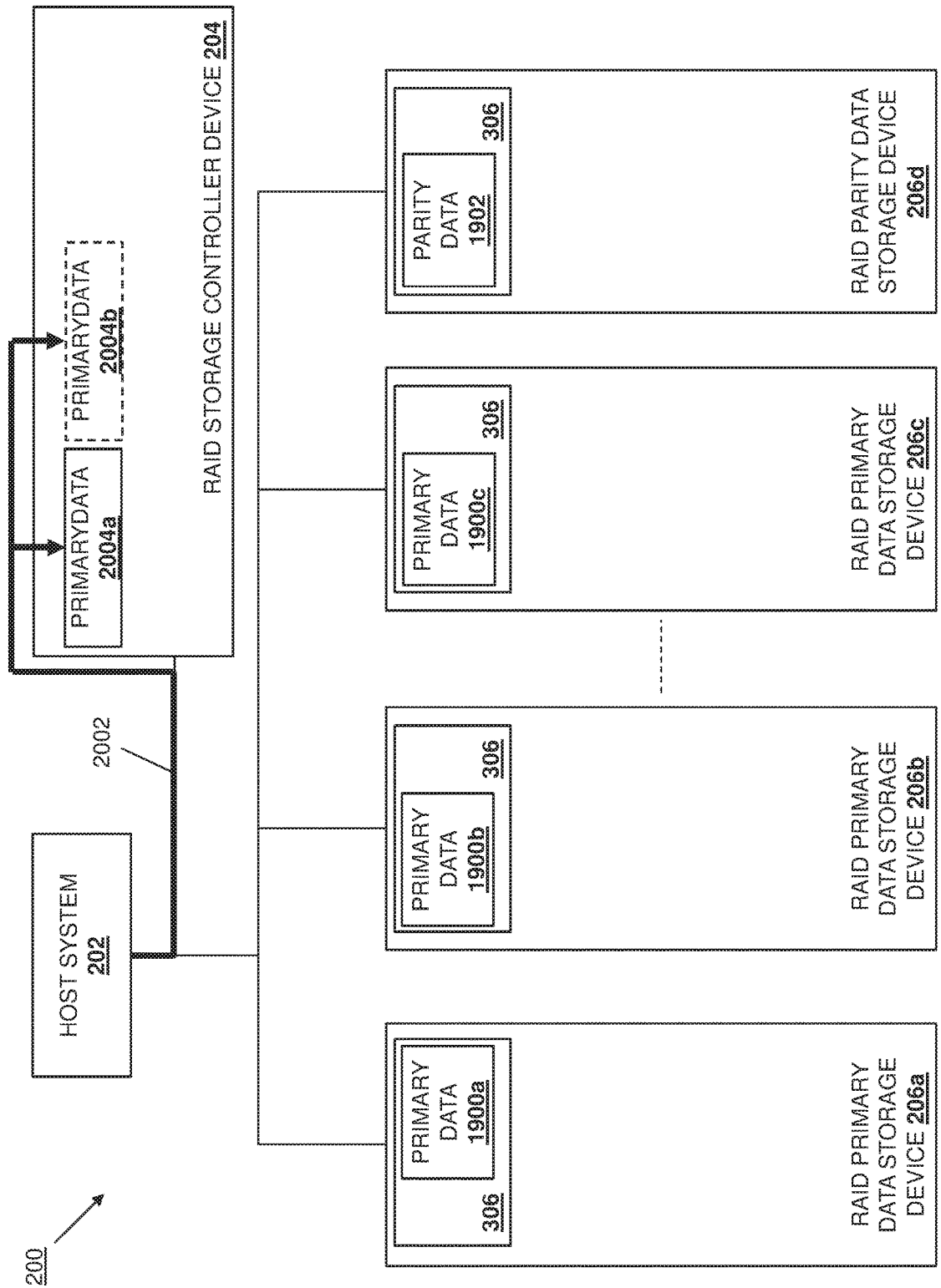
FIG. 20B is a schematic view illustrating an embodiment of the RAID storage system of FIG. 2 operating during the method of FIG. 18.

The method 1800 then proceeds to block 1804 where the RAID storage controller device retrieves updated primary data from the host system. With reference to FIG. 20B, the RAID storage controller device 204 is illustrated performing a DMA operation 2002 that accesses primary data 2004a and up to primary data 2004b that is stored on the host system 202 (e.g., in a memory system or storage system included on the host system 202), and writes that primary data 2004a-2004b to a buffer subsystem in the RAID storage controller device 204 (not illustrated, but similar to the device buffers in the RAID primary data storage devices described in the examples above). As will be appreciated by one of skill in the art in possession of the present disclosure, the primary data 2004a-2004b may be updates to some of the primary data stored in the RAID primary data storage devices 206a-206c (e.g., the primary data 1900a-1900b stored in the storage subsystems 306 in the RAID primary data storage devices 206a and 206b in the examples below), although other primary data writing scenarios will fall within the scope of the present disclosure as well. In the examples below, the partial stripe write is indicated by providing the primary data 2004a in solid lines and providing the primary data 2004b in dashed lines in order to indicate that the partial stripe write need only write updated primary data to one RAID primary data storage device (e.g., the RAID primary data storage device 206a in this example), and may write updated primary data to any number of the RAID primary data storage devices (e.g., the RAID primary data storage device 206b in this example) but not all of the RAID primary data storage devices (which would be a full stripe write, discussed above). As such, one of skill in the art in possession of the present disclosure will appreciate that updated primary data may be retrieved at block 1804 for any subset of the RAID primary storage devices 206a-206c.

Figure 20C:
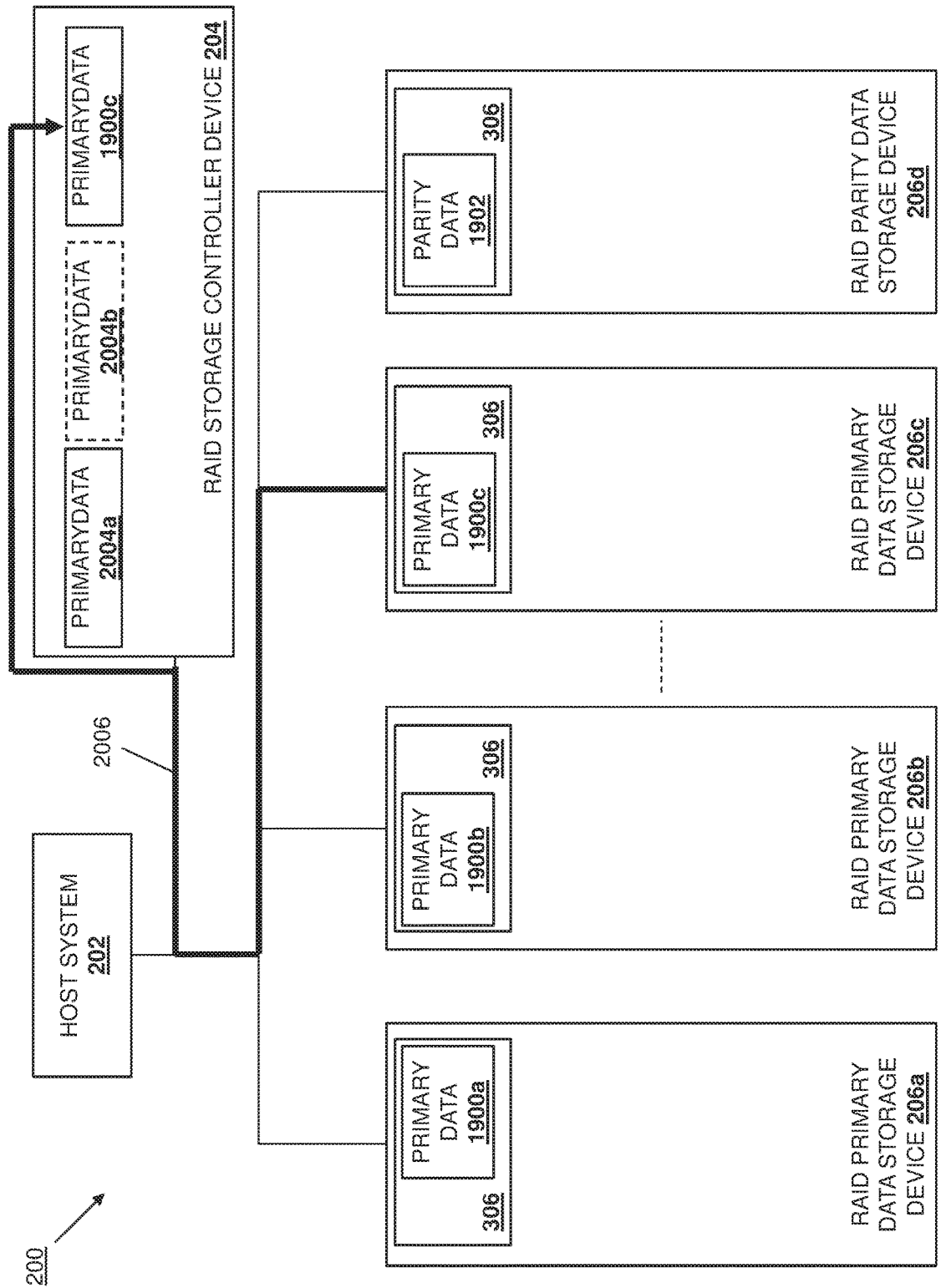
FIG. 20C is a schematic view illustrating an embodiment of the RAID storage system of FIG. 2 operating during the method of FIG. 18.

The method 1800 then proceeds to block 1806 where the RAID storage controller device retrieves current primary data from the RAID primary data storage devices that are not experiencing a primary data update, and then to block 1808 where the RAID storage controller device writes the updated primary data to the RAID primary data storage devices that are experiencing a primary data update. With reference to FIG. 20C, at block 1806 the RAID storage controller device 204 is illustrated performing a DMA operation 2006 that accesses the storage subsystem 306 in the RAID primary data storage device 206c (which is not having its primary data updated in this example), and writes the primary data 1900c to the buffer subsystem in the RAID storage controller device 204 (not illustrated, but similar to the device buffers in the RAID primary data storage devices described in the examples above). While only one RAID primary data storage device that is not experiencing a primary data update is illustrated as having its current primary data retrieved, one of skill in the art in possession of the present disclosure will recognize that any number of RAID primary data storage devices that are not experiencing a primary data update may have their current primary data retrieved while remaining within the scope of the present disclosure as well.

Figure 20D:
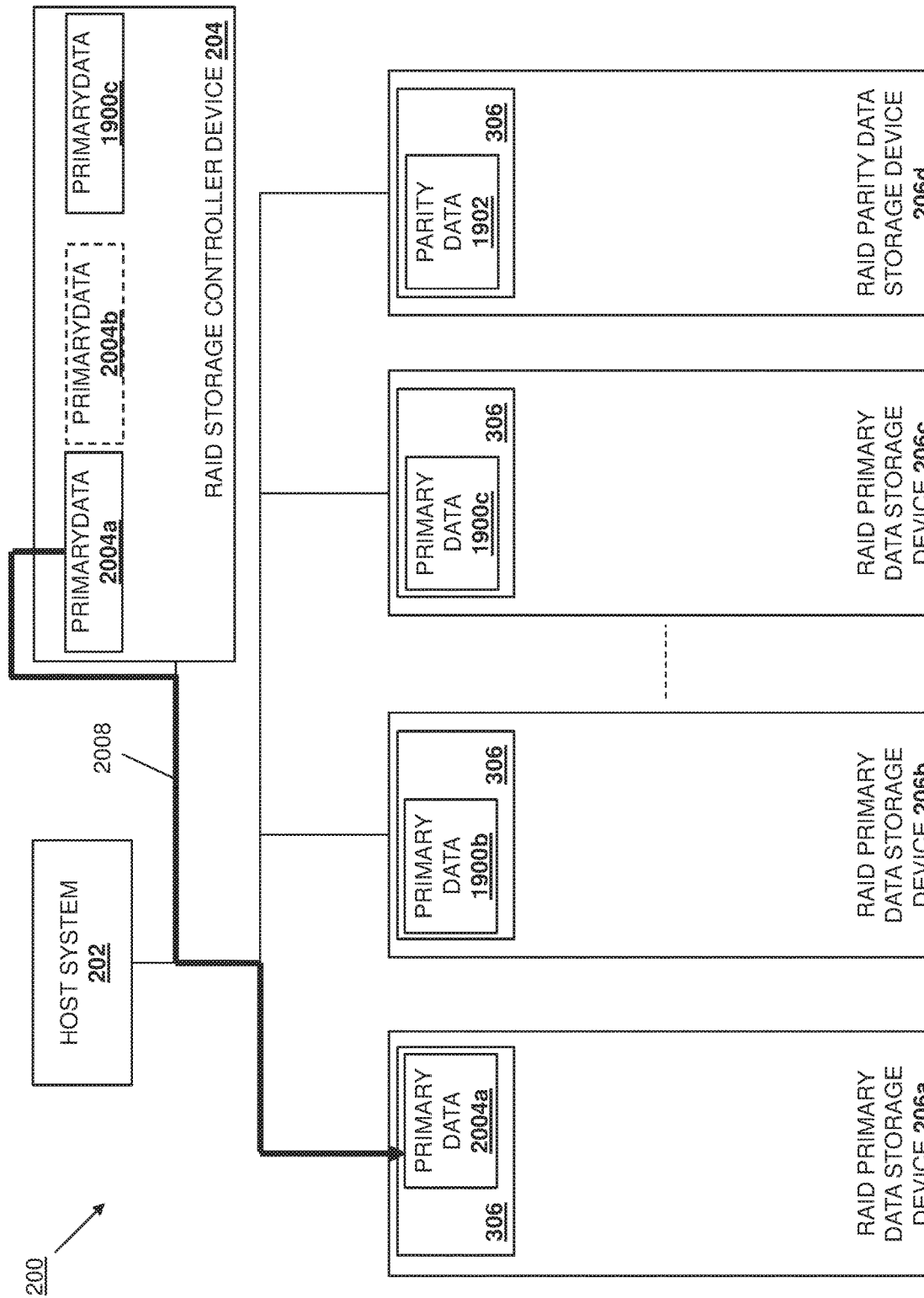
FIG. 20D is a schematic view illustrating an embodiment of the RAID storage system of FIG. 2 operating during the method of FIG. 18.
Figure 20E:
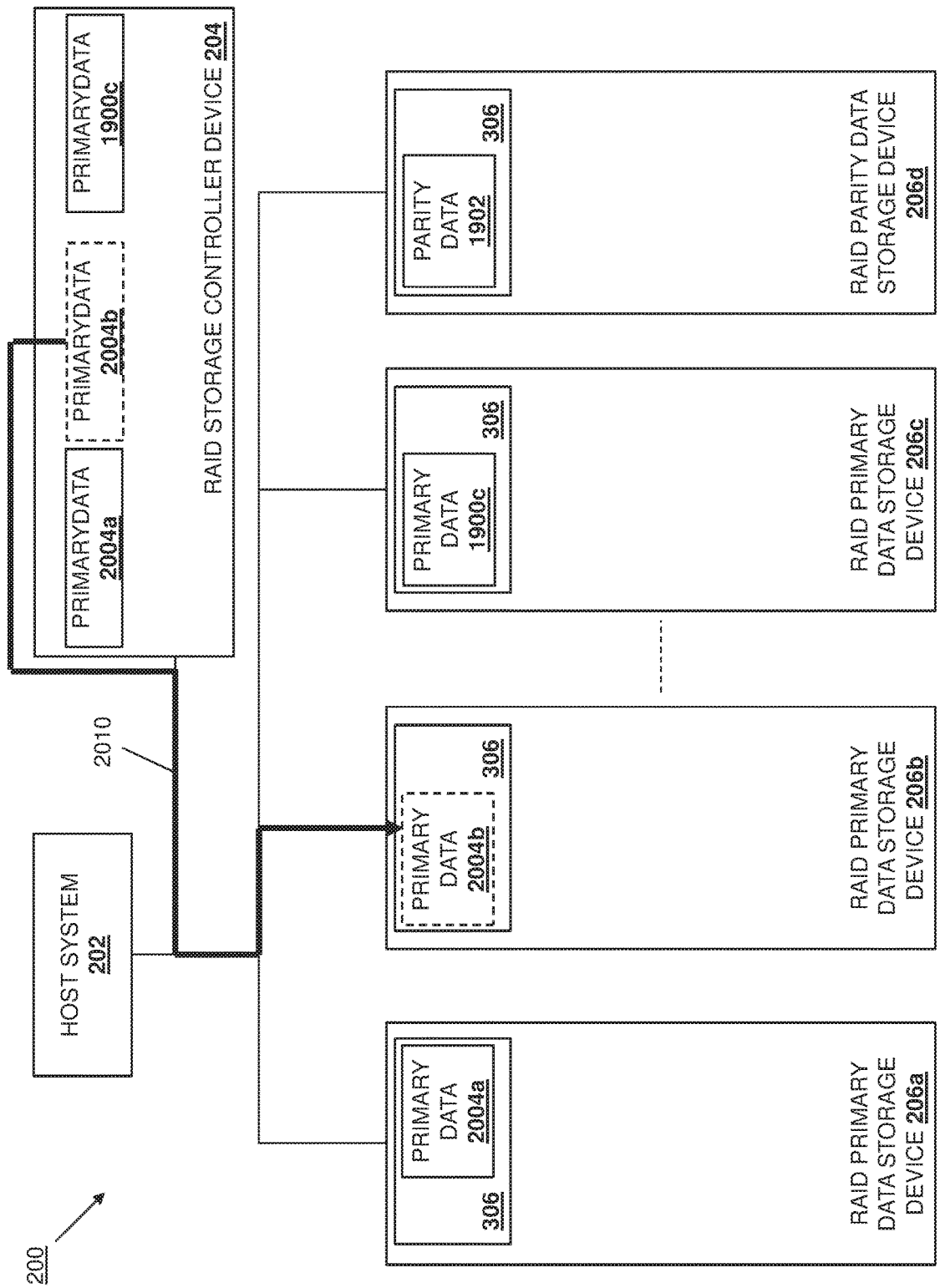
FIG. 20E is a schematic view illustrating an embodiment of the RAID storage system of FIG. 2 operating during the method of FIG. 18.

With reference to FIG. 20D, at block 1808 the RAID storage controller device 204 is illustrated performing a DMA operation 2008 that writes the primary data 2004a to the storage subsystem 306 in the RAID primary data storage device 206a. Similarly, with reference to FIG. 20E, at block 1808 the RAID storage controller device 204 is illustrated performing a DMA operation 2010 that writes the primary data 2004b to the storage subsystem 306 in the RAID primary data storage device 206b. While only two RAID primary data storage device are illustrated as receiving updated primary data, one of skill in the art in possession of the present disclosure will recognize that any number of RAID primary data storage devices may receive updated primary data at block 1808 while remaining within the scope of the present disclosure as well.

Figure 20F:
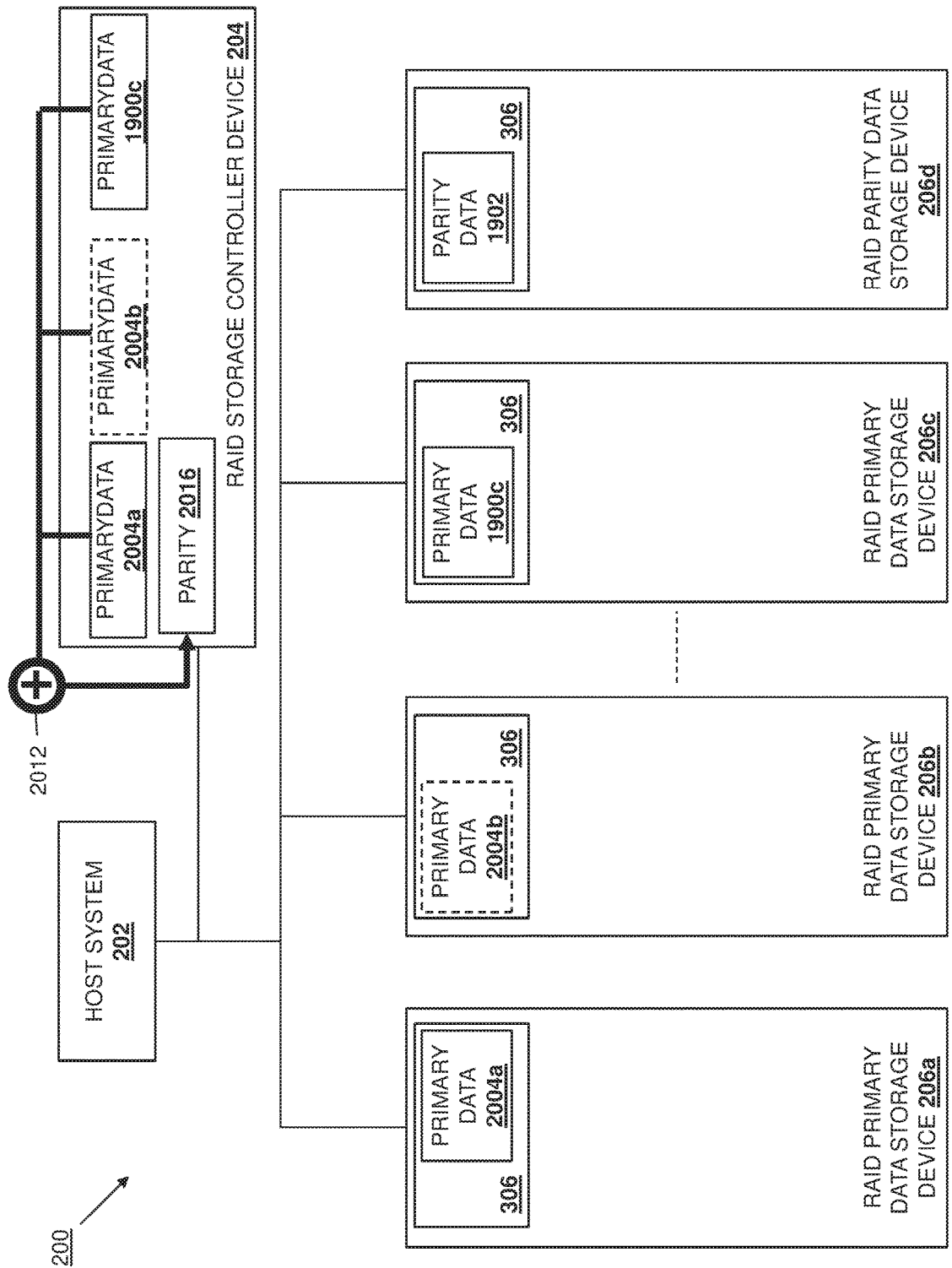
FIG. 20F is a schematic view illustrating an embodiment of the RAID storage system of FIG. 2 operating during the method of FIG. 18.
Figure 20G:
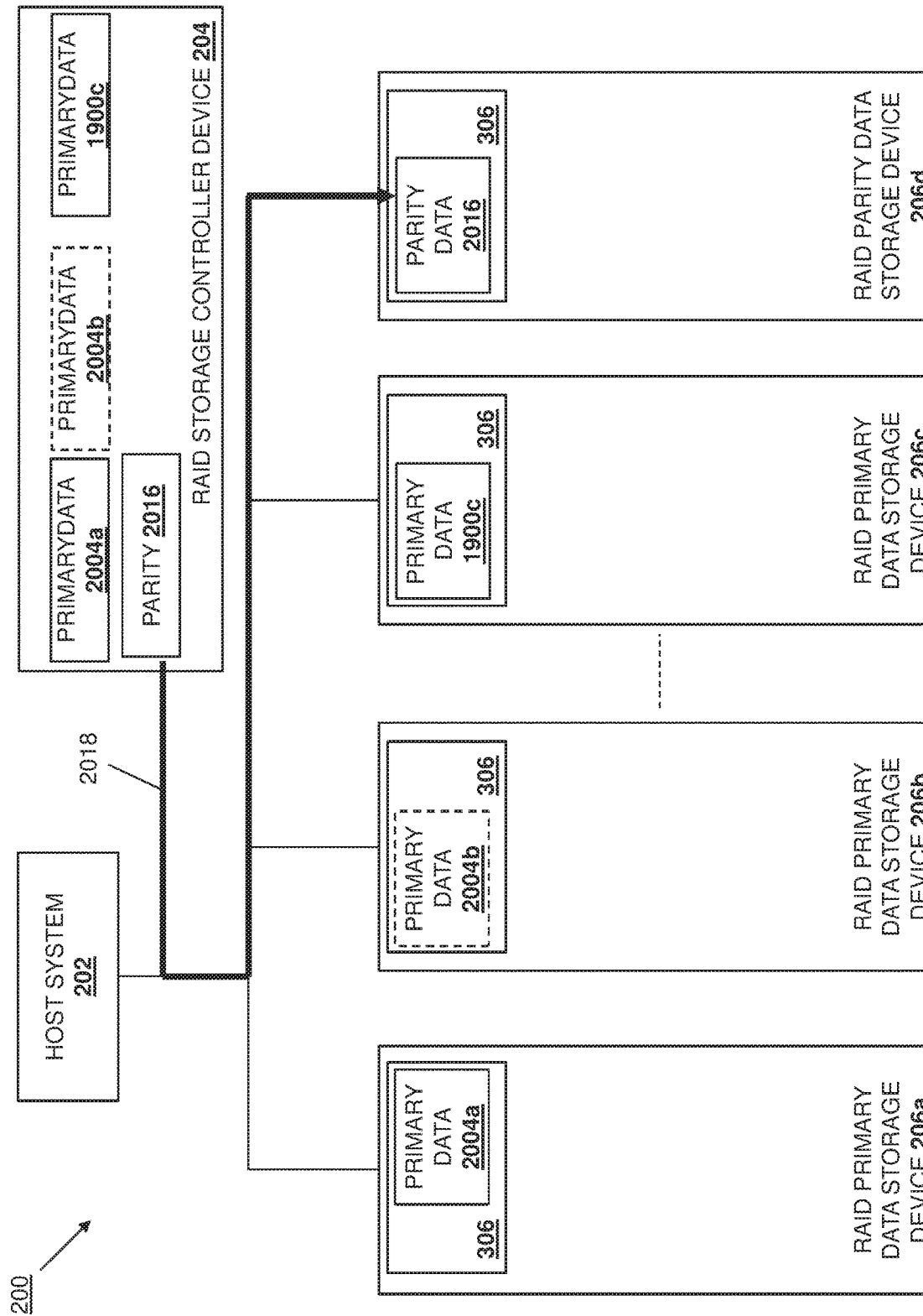
FIG. 20G is a schematic view illustrating an embodiment of the RAID storage system of FIG. 2 operating during the method of FIG. 18.
Figure 20H:
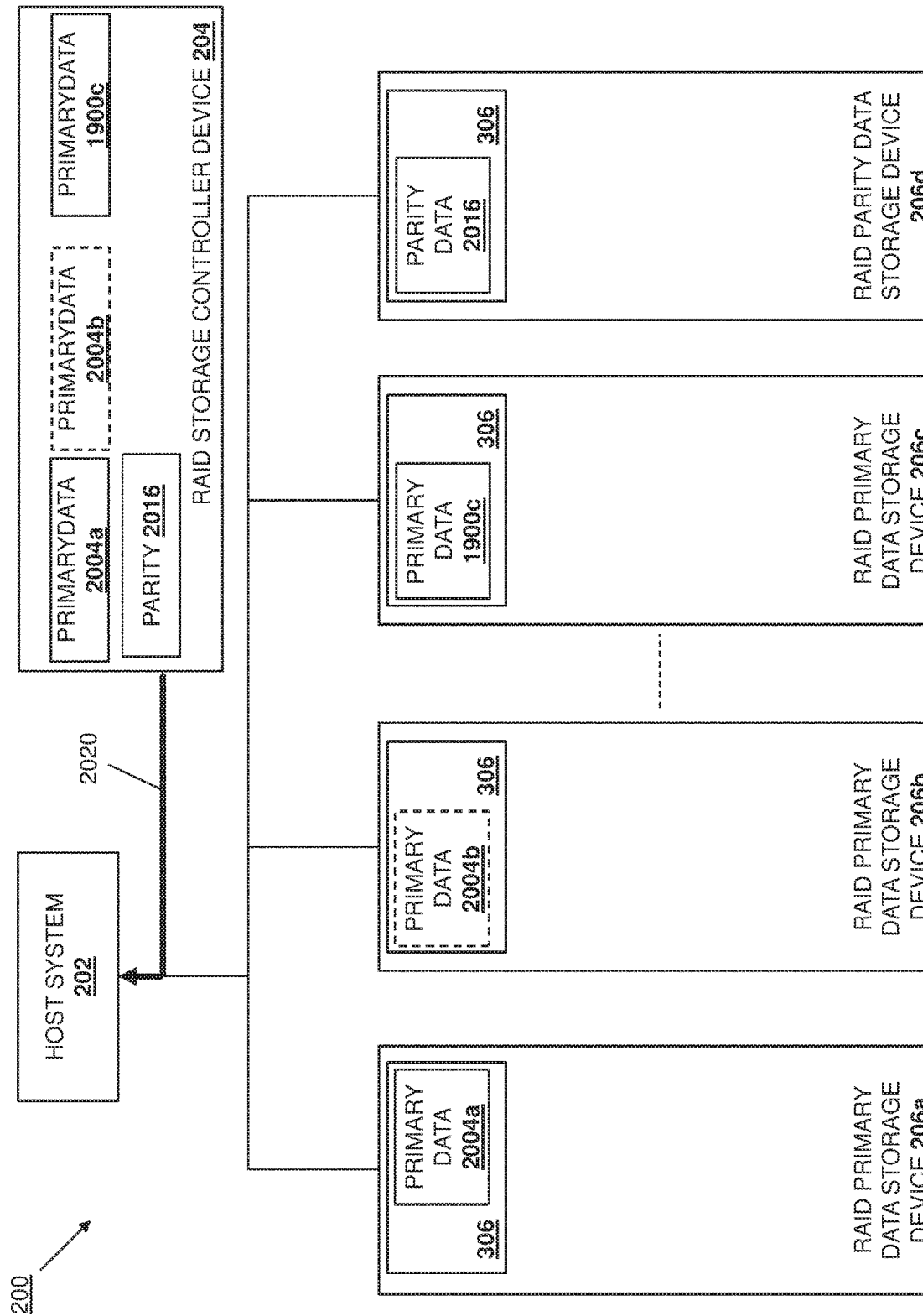
FIG. 20H is a schematic view illustrating an embodiment of the RAID storage system of FIG. 2 operating during the method of FIG. 18.

The method 1800 then proceeds to block 1810 where the RAID storage controller device performs an XOR operation on current primary data and updated primary data in order to produce updated parity data, and writes the updated parity data to the RAID parity data storage device. With reference to FIG. 20F, at block 1810 the RAID storage controller device 204 is illustrated performing an XOR operation 2012 on the primary data 2004a, the primary data 2004b, and the primary data 1900c in order to produce parity data 2016. Furthermore, with reference to FIG. 20G, at block 1810 the RAID storage controller device 204 is illustrated performing a DMA operation 2018 that overwrites the parity data 1902 in the storage subsystem 306 in the RAID parity data storage device 206d with the parity data 2016. As such, following block 1810, the primary data 1900a in the RAID primary data storage device 206a has been updated with the primary data 2004a, the primary data 1900b in the RAID primary data storage device 206b has been updated with the primary data 2004b, and the parity data 1902 in the RAID parity data storage device 206d has been updated with the parity data 2016, thus allowing for the recovery of any one of the primary data 2004a, 2004b, and 1900c in the event that primary data becomes unavailable. FIG. 20H illustrates the RAID storage controller device 204 generating and transmitting a completion message 2020 to the host system 202 to indicate that the write command 2000 has been completed.

Thus, systems and methods have been described that provide for the performance of partial stripe data update operations to store and backup data in a RAID storage system using a RAID storage controller device. As will be appreciated by one of skill in the art in possession of the present disclosure, the number of data transfers involved in a data update according to the method 1800 will be (the number of RAID storage devices in the RAID storage system)+1). For example, if only the RAID primary data storage device 206a is having its primary data updated, then the number of data transfers will be (4 RAID storage devices+1=) 5 data transfers, which include the transfer of the updated primary data from the host system 202 to the RAID storage controller device 204, the transfer of the current primary data from the RAID primary data storage device 206b to the RAID storage controller device 204, the transfer of the current primary data from the RAID primary data storage device 206c to the RAID storage controller device 204, the transfer of the updated primary data from the RAID storage controller device 204 to the RAID primary data storage device 206a, and the transfer of the updated parity data from the RAID storage controller device 204 to the RAID parity data storage device 206d. Similarly, if the RAID primary data storage devices 206a and 206b are having their primary data updated, then the number of data transfers will still be (4 RAID storage devices+1=) 5 data transfers, which include the transfer of the updated primary data from the host system 202 to the RAID storage controller device 204, the transfer of the current primary data from the RAID primary data storage device 206c to the RAID storage controller device 204, the transfer of the updated primary data from the RAID storage controller device 204 to the RAID primary data storage device 206a, the transfer of the updated primary data from the RAID storage controller device 204 to the RAID primary data storage device 206b, and the transfer of the updated parity data from the RAID storage controller device 204 to the RAID parity data storage device 206d. One of skill in the art in possession of the present disclosure will recognize that the (the number of RAID storage devices in the RAID storage system)+1) number of data transfers will hold for any number of RAID storage devices experiencing a data update.

With reference to FIG. 21, an embodiment of a method 2100 for performing data-transfer-based RAID data updates is illustrated. As discussed above, different data update techniques for updating data in the RAID storage system will produce different numbers of data transfers depending on the number of RAID storage devices experiencing a primary data update and/or on the number of RAID storage devices in the RAID storage system. As such, a RAID storage controller device provided according to the teachings of the present disclosure may receive a command from a host system that is associated with a data update operation and, in response, determine a data update technique that is associated with the fewest number of data transfers. Subsequently, the RAID storage controller device may cause that data update technique associated with the fewest number of data transfers to be performed to execute the command received from the host system. Thus, data-transfer-based RAID data updates are provided.

The method 2100 begins at block 2102 where the RAID storage controller device receives a command from a host system. In some embodiments, at block 2102, the RAID storage controller device 204 may receive any of the commands 600, 1200, 1700, and/or 2000 discussed above that provide write commands that may instruct the writing of primary data that is located on the host system 200 to one or more of the RAID primary data storage devices 206a-206c. However, while specific examples of commands are provided above, one of skill in the art in possession of the present disclosure will appreciate that a variety of primary data update scenarios will fall within the scope of the present disclosure as well.

The method 2100 then proceeds to block 2104 where the RAID storage controller device determines a data update technique associated with the fewest number of data transfers. In an embodiment, at block 2104, the RAID storage controller device 204 may operate to use the command received from the host device 220 at block 2102 to determine which of a plurality of data update techniques will result in the fewest number of data transfers in executing that command. For example, as discussed above, the RAID storage controller device 204 may operate to determine a number of the RAID primary data storage devices 206a-206c that will have their primary data updated according to the command received from the host system 202 at block 2102, a number of RAID storage devices in the RAID storage system, as well as any other information that would be apparent to one of skill in the art in possession of the present disclosure.

Thus, continuing with the examples above, the RAID storage controller device 204 may determine that the number of RAID storage devices in the RAID storage system 200 (e.g., the RAID primary data storage devices 206a, 206b, and up to 206c and the RAID parity data storage device 206d), and may then identify a number of the RAID primary data storage devices 206a, 206b, and up to 206c that will experience a primary data update according to the command received from the host system 202 at block 2102. As discussed above, in some embodiments the command received from the host system 202 at block 2102 may request a full stripe write that operates to update the primary data on all the RAID primary data storage devices 206a-206c. However, as also discussed above, the command received from the host system 202 at block 2102 may request a partial stripe write that operates to update the primary data on only a subset of the RAID primary data storage devices 206a-206c.

If, at block 2104, the RAID storage controller device determines that the command received from the host system 202 at block 2102 requests a full stripe write that provides for an update of the primary data on all of the RAID primary data storage devices 206a-206c, the RAID storage controller device 204 may determine that the data update technique described according to the method 1500 will result in the fewest number of data transfers. As discussed above, the method 1500 provides for full stripe data update operations to be performed by the RAID storage controller device 204 and is associated with a number of data transfers equal to (the number of RAID storage devices in the RAID storage system)+1). As such, in an 8 RAID storage device RAID storage system (e.g., 7 RAID primary data storage devices and 1 RAID parity data storage device), the method 1500 will result in (8+1=) 9 data transfers, as compared to the method 400 that is associated with a number of data transfers equal to 2n and that results in ((2*7)=) 14 data transfers in performing the full stripe write provided in the 8 RAID storage device scenario of this example (with the other methods 1000 and 1800 not considered because they only applying to partial stripe writes.)

If, at block 2104, the RAID storage controller device determines that the command received from the host system 202 at block 2102 requests a partial stripe write that provides for an update of the primary data on a subset of the RAID primary data storage devices 206a-206c, the RAID storage controller device 204 may determine how many of the RAID primary data storage devices 206a-206c will experience a primary data update based on the execution of that command to determine which of the data update techniques described according to the methods 400 and 1800 will result in the fewest number of data transfers. As discussed above, the method 400 provides for partial stripe data update operations to be performed with the assistance of the RAID primary data storage devices 206a-206c, and is associated with a number of data transfers equal to 2n, while the method 1800 provides for partial stripe data update operations to be performed by the RAID storage controller device 204, and is associated with a number of data transfers equal to (the number of RAID storage devices in the RAID storage system)+1). As will be appreciated by one of skill in the art in possession of the present disclosure, and as detailed below, the method 1800 may result in fewer data transfers than the method 400 when the number of RAID primary data storage devices experiencing a primary data update is greater than half the number of RAID storage devices in the RAID storage system 200.

As such, continuing with the example of the 8 RAID storage device RAID storage system above (e.g., 7 RAID primary data storage devices and 1 RAID parity data storage device), when the number of RAID primary data storage devices experiencing a primary data update is between 1 and 4, the method 400 will result in between (2*1 RAID storage device=) 2 and (2*4 RAID storage devices=) 8 data transfers, while the method 1800 will result in (8+1=) 9 data transfers. However, when the number of RAID primary data storage devices experiencing a primary data update is between 5 and 7, the method 400 will result in between (2*5 RAID storage device=) 10 and (2*7 RAID storage devices=) 14 data transfers, while the method 1800 will result in (8+1=) 9 data transfers. As discussed above, the method 1500 will always result in more data transfers than the methods 400 and 1800, with the examples above of 1 to 7 RAID primary data storage devices experiencing a data update producing between ((2*1 RAID storage device)+3=) 5 and ((2*7 RAID storage device)+3=) 17 data transfers. As such, as block 2104 and in response to a command from the host system 202 that requests a partial stripe data write, the RAID storage controller device 204 may select the method 400 for executing the command if the number of RAID primary data storage devices experiencing a primary data update is less than or equal to half the number of RAID storage devices in the RAID storage system 200, and may select the method 1800 for executing the command if the number of RAID primary data storage devices experiencing a primary data update is greater than half the number of RAID storage devices in the RAID storage system 200.

The method 2100 may then proceed to block 2106 where the RAID storage controller device then causes the data update technique associated with the fewest number of data transfers to be performed to execute the command received from the host system. As such, in embodiments in which the command received from the host system 202 at block 2102 is associated with a full stripe write, at block 2106 the RAID storage controller device 204 may cause the method 1500 to be performed in substantially the same manner as discussed above. Furthermore, in embodiments in which the command received from the host system 202 at block 2102 is associated with a partial stripe write and the number of RAID primary data storage devices experiencing a primary data update is less than or equal to half the number of RAID storage devices in the RAID storage system 200, at block 2106 the RAID storage controller device 204 may cause the method 400 to be performed in substantially the same manner as discussed above. Further still, in embodiments in which the command received from the host system 202 at block 2102 is associated with a partial stripe write and the number of RAID primary data storage devices experiencing a primary data update is greater than half the number of RAID storage devices in the RAID storage system 200, at block 2106 the RAID storage controller device 204 may cause the method 1800 to be performed in substantially the same manner as discussed above.

Thus, systems and methods have been described that provide a RAID storage controller device that, in response to receiving a command from a host system that is associated with a data update operation, determines a data update technique that is associated with the fewest number of data transfers, and causes that data update technique associated with the fewest number of data transfers to be performed to execute the command received from the host system. Thus, data update operations may be offloaded from the RAID storage controller device when doing so is data-transfer-efficient, thus providing for data-transfer-based data update operations that may also enable RAID storage controller devices to scale with high performance RAID storage devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A data-transfer-based Redundant Array of Inexpensive Disks (RAID) data update system, comprising:
 a host system;
 a plurality of Redundant Array Of Inexpensive Disks (RAID) storage device that are each coupled to the host system; and
 a RAID storage controller device that is coupled to the host system and the plurality of RAID storage devices, wherein the RAID storage controller device is configured to:
  receive, from the host system, a command that is associated with a data update on at least one of the plurality of RAID storage devices;
  determine a first RAID data update technique from a plurality of RAID data update techniques that are available to execute the command and perform the data update on the at least one of the plurality of RAID storage devices based on:

a number of the at least one of the plurality of RAID storage devices that are to receive the data update identified in the command; and the first RAID data update technique requiring fewer data transfers to execute the command and perform the data update on the at least one of the plurality of RAID storage devices relative to the number of data transfers required by others of the plurality of RAID data update techniques to execute the command and perform the data update on the at least one of the plurality of RAID storage devices; and cause the command to be performed using the first RAID data update technique to provide the data update on the at least one of the plurality of RAID storage devices.

2. The system of claim 1, wherein the determining the first RAID data update technique requires fewer data transfers to execute the command and perform the data update on the at least one of the plurality of RAID storage devices includes:

identifying that the command is a full stripe write command that provides for respective data updates on each of the plurality of RAID storage devices and, in response, determining the first RAID data update technique that provides for the data updates on each of the plurality of RAID storage devices by the RAID storage controller device.

3. The system of claim 1, wherein the determining the first RAID data update technique requires fewer data transfers to execute the command and perform the data update on the at least one of the plurality of RAID storage devices includes:

identifying that the command is a partial stripe write command that provides for respective data updates on a subset of the plurality of RAID storage devices; and determining that a number of the subset of the plurality of RAID storage devices that will have their respective data updated based on the command is less than or equal to a total number of the plurality of the RAID storage devices and, in response, determining the first RAID data update technique that provides for the respective data updates on each of the subset of the plurality of RAID storage devices with the assistance of the subset of the plurality of RAID storage devices.

4. The system of claim 1, wherein the determining the first RAID data update technique requires fewer data transfers to execute the command and perform the data update on the at least one of the plurality of RAID storage devices includes:

identifying that the command is a partial stripe write command that provides for respective data updates on a subset of the plurality of RAID storage devices; and determining that a number of the subset of the plurality of RAID storage devices that will have their respective data updated based on the command is greater than a total number of the plurality of the RAID storage devices and, in response, determining the first RAID data update technique that provides for the respective data updates on each of the subset of the plurality of RAID storage devices by the RAID storage controller device.

5. The system of claim 4, wherein the first RAID data update technique that provides for the respective data updates on each of the subset of the plurality of RAID storage devices by the RAID storage controller device includes the RAID storage controller device performing operations including:

retrieving current primary data from at least one of the plurality of RAID storage devices that is not experiencing a primary data update based on the command;

performing an XOR operation on the current primary data and updated primary data for at least one of the plurality of RAID storage devices to produce updated parity data; and writing the updated parity data to a RAID parity data storage device that is included in the plurality of RAID storage devices.

6. The system of claim 1, wherein the plurality of RAID storage devices are provided by Non-Volatile Memory express (NVMe) storage devices.

7. An Information Handling System (IHS), comprising:

a processing system; and a memory system that is coupled to the processing system and that includes instructions that, when executed by the processing system, cause the processing system to provide a Redundant Array Of Inexpensive Disks (RAID) storage controller engine that is configured to:

receive, from a host system, a command that is associated with a data update on at least one of a plurality of RAID storage devices;

determine a first RAID data update technique from a plurality of RAID data update techniques that are available to execute the command and perform the data update on the at least one of the plurality of RAID storage devices based on:

a number of the at least one of the plurality of RAID storage devices that are to receive the data update identified in the command; and the first RAID data update technique requiring fewer data transfers to execute the command and perform the data update on the at least one of the plurality of RAID storage devices relative to the number of data transfers required by others of the plurality of RAID data update techniques require to execute the command and perform the data update on the at least one of the plurality of RAID storage devices; and cause the command to be performed using the first RAID data update technique to provide the data update on the at least one of the plurality of RAID storage devices.

8. The IHS of claim 7, wherein the determining the first RAID data update technique requires fewer data transfers to execute the command and perform the data update on the at least one of the plurality of RAID storage devices includes:

identifying that the command is a full stripe write command that provides for respective data updates on each of the plurality of RAID storage devices and, in response, determining the first RAID data update technique that provides for the data updates on each of the plurality of RAID storage devices by the RAID storage controller engine.

9. The IHS of claim 7, wherein the determining the first RAID data update technique requires fewer data transfers to execute the command and perform the data update on the at least one of the plurality of RAID storage devices includes:

identifying that the command is a partial stripe write command that provides for respective data updates on a subset of the plurality of RAID storage devices; and determining that a number of the subset of the plurality of RAID storage devices that will have their respective data updated based on the command is less than or equal to a total number of the plurality of the RAID storage devices and, in response, determining the first RAID data update technique that provides for the respective data updates on each of the subset of the plurality of RAID storage devices with the assistance of the subset of the plurality of RAID storage devices.

10. The IHS of claim 7, wherein the determining the first RAID data update technique requires fewer data transfers to execute the command and perform the data update on the at least one of the plurality of RAID storage devices includes:
identifying that the command is a partial stripe write command that provides for respective data updates on a subset of the plurality of RAID storage devices; and
determining that a number of the subset of the plurality of RAID storage devices that will have their respective data updated based on the command is greater than a total number of the plurality of the RAID storage devices and, in response, determining the first RAID data update technique that provides for the respective data updates on each of the subset of the plurality of RAID storage devices by the RAID storage controller engine.

11. The IHS of claim 10, wherein the first RAID data update technique that provides for the respective data updates on each of the subset of the plurality of RAID storage devices by the RAID storage controller engine includes the RAID storage controller engine performing operations including:
retrieving current primary data from at least one of the plurality of RAID storage devices that is not experiencing a primary data update based on the command;
performing an XOR operation on the current primary data and updated primary data for at least one of the plurality of RAID storage devices to produce updated parity data; and
writing the updated parity data to a RAID parity data storage device that is included in the plurality of RAID storage devices.

12. The IHS of claim 7, wherein the plurality of RAID storage devices are provided by Non-Volatile Memory express (NVMe) storage devices.

13. The IHS of claim 7, wherein the RAID storage controller engine is configured to:
transmit, to the host system in response to causing the command to be performed using the first RAID data update technique to provide the data update on the at least one of the plurality of RAID storage devices, a completion message.

14. A method for providing data-transfer-based Redundant Array of Independent Disk (RAID) data updates, comprising:
receiving, by a Redundant Array of Independent Disk (RAID) storage controller device from a host system, a command that is associated with a data update on at least one of a plurality of RAID storage devices;
determining, by the RAID storage controller device, a first RAID data update technique from a plurality of RAID data update techniques that are available to execute the command and perform the data update on the at least one of the plurality of RAID storage devices based on:
a number of the at least one of the plurality of RAID storage devices that are to receive the data update identified in the command; and
the first RAID data update technique requiring fewer data transfers to execute the command and perform the data update on the at least one of the plurality of RAID storage devices relative to the number of data transfers required by others of the plurality of RAID data update techniques require to execute the command and perform the data update on the at least one of the plurality of RAID storage devices; and
causing, by the RAID storage controller device, the command to be performed using the first RAID data update technique to provide the data update on the at least one of the plurality of RAID storage devices.

15. The method of claim 14, wherein the determining the first RAID data update technique requires fewer data transfers to execute the command and perform the data update on the at least one of the plurality of RAID storage devices includes:
identifying that the command is a partial stripe write command that provides for respective data updates on a subset of the plurality of RAID storage devices; and
determining that a number of the subset of the plurality of RAID storage devices that will have their respective data updated based on the command is less than or equal to a total number of the plurality of the RAID storage devices and, in response, determining the first RAID data update technique that provides for the respective data updates on each of the subset of the plurality of RAID storage devices with the assistance of the subset of the plurality of RAID storage devices.

16. The method of claim 14, wherein the determining first RAID data update technique requires fewer data transfers to execute the command and perform the data update on the at least one of the plurality of RAID storage devices includes:
identifying that the command is a partial stripe write command that provides for respective data updates on a subset of the plurality of RAID storage devices; and
determining that a number of the subset of the plurality of RAID storage devices that will have their respective data updated based on the command is less than or equal to a total number of the plurality of the RAID storage devices and, in response, determining the first RAID data update technique that provides for the respective data updates on each of the subset of the plurality of RAID storage devices with the assistance of the subset of the plurality of RAID storage devices.

17. The method of claim 14, wherein the determining the first RAID data update technique requires fewer data transfers to execute the command and perform the data update on the at least one of the plurality of RAID storage devices includes:
identifying that the command is a partial stripe write command that provides for respective data updates on a subset of the plurality of RAID storage devices; and
determining that a number of the subset of the plurality of RAID storage devices that will have their respective data updated based on the command is greater than a total number of the plurality of the RAID storage devices and, in response, determining the first RAID data update technique that provides for the respective data updates on each of the subset of the plurality of RAID storage devices by the RAID storage controller engine.

18. The method of claim 17, wherein the first RAID data update technique that provides for the respective data updates on each of the subset of the plurality of RAID storage devices by the RAID storage controller engine further comprises:
retrieving, by the RAID storage controller device, current primary data from at least one of the plurality of RAID storage devices that is not experiencing a primary data update based on the command;

performing, by the RAID storage controller device, an XOR operation on the current primary data and updated primary data for at least one of the plurality of RAID storage devices to produce updated parity data; and writing, by the RAID storage controller device, the updated parity data to a RAID parity data storage device that is included in the plurality of RAID storage devices.

19. The method of claim 14, wherein the plurality of RAID storage devices are provided by Non-Volatile Memory express (NVMe) storage devices.

20. The method of claim 14, further comprising:

transmitting, by the RAID storage controller device to the host system in response to causing the command to be performed using the first RAID data update technique to provide the data update on the at least one of the plurality of RAID storage devices, a completion message.

\* \* \* \* \*